(12) United States Patent     (10) Patent No.:   US 12,625,068 B2

Yamada     (45) Date of Patent:     May 12, 2026

(54) OPTICAL DEVICE, SPECTROSCOPIC DEVICE, AND SPECTROSCOPIC METHOD

(71) Applicant: SEIKO EPSON CORPORATION, Tokyo (JP)

(72) Inventor: Kohei Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 98 days.

(21) Appl. No.: 18/611,916

(22) Filed: Mar. 21, 2024

(65) Prior Publication Data

US 2024/0319082 A1     Sep. 26, 2024

(30) Foreign Application Priority Data

Mar. 22, 2023    (JP) ................................. 2023-045063

(51) Int. Cl.
| | |
|---|---|
| *G01N 21/31* | (2006.01) |
| *G01B 11/02* | (2006.01) |
| *G01J 3/45* | (2006.01) |

(52) U.S. Cl.
CPC ............. *G01N 21/31* (2013.01); *G01B 11/02* (2013.01); *G01J 3/45* (2013.01); *G01N 2201/06113* (2013.01); *G01N 2201/0636* (2013.01)

(58) Field of Classification Search
CPC ............ G01N 21/31; G01B 11/02; G01J 3/45
See application file for complete search history.

(56) References Cited

U.S. PATENT DOCUMENTS

| | | | |
|---|---|---|---|
| 2014/0125985 A1* | 5/2014 | Justice ..................... | G01J 3/06 |
| | | | 356/456 |
| 2015/0062586 A1* | 3/2015 | Zhu ......................... | G01J 3/453 |
| | | | 356/453 |
| 2020/0124472 A1 | 4/2020 | Suzuki et al. | |
| 2020/0124479 A1 | 4/2020 | Suzuki et al. | |
| 2021/0025760 A1* | 1/2021 | Wasserman .............. | G01J 5/06 |

FOREIGN PATENT DOCUMENTS

| | | | | |
|---|---|---|---|---|
| JP | 6496463 B1 | 4/2019 | | |
| JP | WO2020049620 A1 * | 5/2021 | ......... | G01B 9/02083 |
| WO | 2019-009404 A1 | 1/2019 | | |

* cited by examiner

*Primary Examiner* — Maurice C Smith
(74) *Attorney, Agent, or Firm* — Harness, Dickey & Pierce, P.L.C.

(57) ABSTRACT

An optical device includes: an analysis optical system; and a length measurement optical system. The analysis optical system includes a moving mirror configured to reflect analysis light to add a first modulation signal to the analysis light, a gas cell with a gas that absorbs light of a predetermined wavelength sealed therein and configured to add a light absorption signal to the analysis light, and a first light receiving element configured to receive the analysis light including a sample-derived signal, the first modulation signal, and the light absorption signal. The length measurement optical system includes a second light source and obtains a displacement signal corresponding to a position of the moving mirror using laser light.

11 Claims, 32 Drawing Sheets

INTENSITY OF INTERFERENCE LIGHT
IN FIRST LIGHT RECEIVING ELEMENT

F(t)

S2 →

INTENSITY OF INTERFERENCE LIGHT
IN SECOND LIGHT RECEIVING ELEMENT

TIME POINT t

F(x)

INTENSITY OF INTERFERENCE LIGHT

−5  −4  −3  −2  −1  0  1  2  3  4  5

OPTICAL PATH DIFFERENCE (μm)

*FIG. 10*

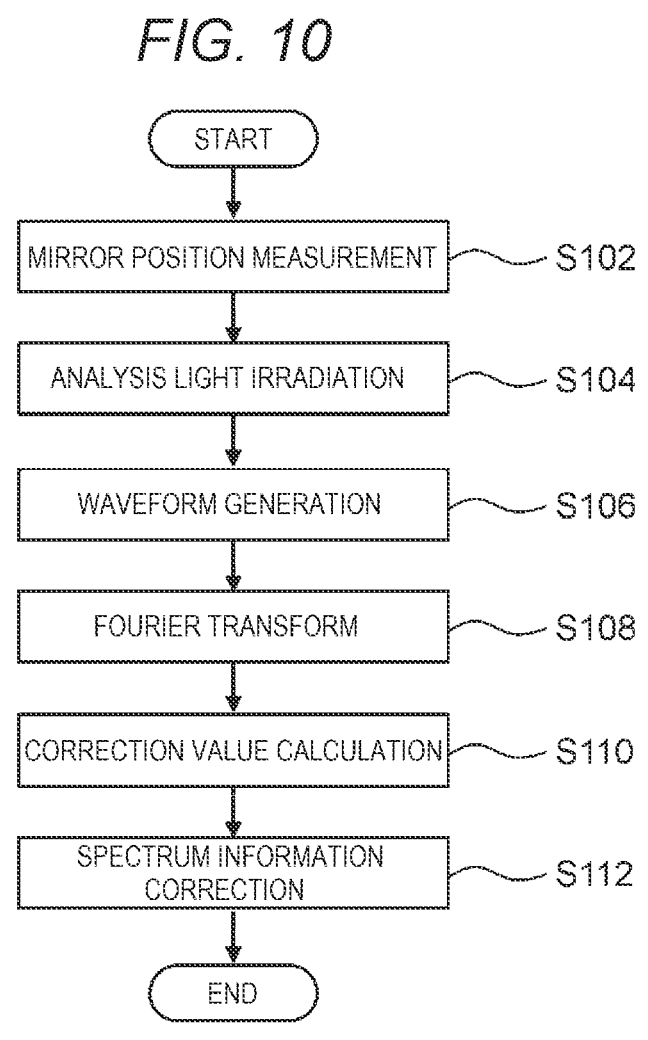

START

MIRROR POSITION MEASUREMENT — S102

ANALYSIS LIGHT IRRADIATION — S104

WAVEFORM GENERATION — S106

FOURIER TRANSFORM — S108

CORRECTION VALUE CALCULATION — S110

SPECTRUM INFORMATION CORRECTION — S112

END

START

GAS CELL ARRANGEMENT — S101

MIRROR POSITION MEASUREMENT — S102

ANALYSIS LIGHT IRRADIATION — S104

WAVEFORM GENERATION — S106

FOURIER TRANSFORM — S108

CORRECTION VALUE CALCULATION — S110

SAMPLE ARRANGEMENT — S114

MIRROR POSITION MEASUREMENT — S116

ANALYSIS LIGHT IRRADIATION — S118

WAVEFORM GENERATION — S120

FOURIER TRANSFORM — S122

END

OPTICAL DEVICE, SPECTROSCOPIC DEVICE, AND SPECTROSCOPIC METHOD

The present application is based on, and claims priority from JP Application Serial Number 2023-045063, filed Mar. 22, 2023, the disclosure of which is hereby incorporated by reference herein in its entirety.

BACKGROUND

1. Technical Field

The present disclosure relates to an optical device, a spectroscopic device, and a spectroscopic method.

2. Related Art

WO 2019/009404 discloses an optical module used for spectroscopy for obtaining spectrum information of light emitted or absorbed by a sample and analyzing components in the sample based on the spectrum information. The optical module includes a mirror unit, a beam splitter unit, a light incident unit, a first photodetector, a second light source, and a second photodetector. The mirror unit includes a movable mirror that moves in a predetermined direction and a fixed mirror whose position is fixed. In such an optical module, an interference optical system into which measurement light and laser light are incident is implemented by the beam splitter unit, the movable mirror, and the fixed mirror.

The measurement light incident from a first light source through a measurement target passes through the light incident unit and is split in the beam splitter unit. A part of the split measurement light is reflected by the movable mirror and is returned to the beam splitter unit. A remaining part of the split measurement light is reflected by the fixed mirror and is returned to the beam splitter unit. The part of measurement light and the remaining part returned to the beam splitter unit are detected by the first photodetector as interference light.

Further, laser light emitted from the second light source is split by the beam splitter unit. A part of the split laser light is reflected by the movable mirror and is returned to the beam splitter unit. A remaining part of the split laser light is reflected by the fixed mirror and is returned to the beam splitter unit. The part of laser light and the remaining part returned to the beam splitter unit are detected by the second photodetector as interference light.

In such an optical module, a position of the movable mirror is measured based on a detection result of the interference light of the laser light. Further, based on a measurement result of the position of the movable mirror and the detection result of the interference light of the measurement light, the spectroscopy of the measurement target is possible. Specifically, a waveform called an interferogram is obtained by determining an intensity of the measurement light at each position of the movable mirror. By performing Fourier transform on the interferogram, spectrum information about the measurement target can be determined. Therefore, the optical module described in WO 2019/009404 is used for a Fourier transform infrared spectrometer (FTIR).

WO 2019/009404 is an example of the related art.

SUMMARY

In a Fourier transform spectrometer, measurement accuracy of the position of the movable mirror (moving mirror)

is directly linked to accuracy on a wavenumber axis (wavelength axis) of a spectral pattern. In the optical module disclosed in WO 2019/009404, the second light source that emits the laser light is required to have sufficiently high wavelength stability. The second light source disclosed in WO 2019/009404 has semiconductor laser such as a VCSEL, whereas the semiconductor laser generally has low wavelength stability. Therefore, when the optical module disclosed in WO 2019/009404 is applied to a Fourier transform spectrometer, there is room for improvement in accuracy on the wavenumber axis (wavelength axis) of the obtained spectral pattern.

Meanwhile, in order to stabilize the wavelength of the semiconductor laser, there is also a method of providing additional equipment such as a light source thermostatic system. However, such additional equipment increases a size and power consumption of the optical module.

Therefore, an object is to provide an optical device capable of accurately measuring a position of a moving mirror and achieving size reduction and low power consumption.

An optical device according to an application example of the present disclosure includes:

an analysis optical system; and a length measurement optical system, the analysis optical system includes a moving mirror configured to reflect analysis light emitted from a first light source to add a first modulation signal to the analysis light, a gas cell with a gas that absorbs light of a predetermined wavelength sealed therein and configured to add a light absorption signal to the analysis light when the analysis light is incident thereon, and a first light receiving element configured to receive the analysis light including a sample-derived signal generated by an action between the analysis light and a sample, the first modulation signal, and the light absorption signal, and output a first light receiving signal, and the length measurement optical system includes a second light source configured to emit laser light, and a length measurement unit configured to obtain a displacement signal corresponding to a position of the moving mirror using the laser light.

A spectroscopic device according to an application example of the present disclosure includes:

the optical device according to the application example of the present disclosure;

a moving mirror position calculation unit configured to generate a moving mirror position signal based on the displacement signal;

a light intensity calculation unit configured to generate, based on the first light receiving signal and the moving mirror position signal, a waveform representing an intensity of the first light receiving signal at the position of the moving mirror;

a Fourier transform unit configured to perform Fourier transform on the waveform to generate a spectral pattern including a peak that is based on the light absorption signal; and a moving mirror position correction unit configured to calculate, based on a position of the peak, a correction value for correcting the moving mirror position signal.

According to an application example of the present disclosure, a spectroscopic method of performing spectroscopy on a sample includes:

measuring a position of the moving mirror based on the displacement signal obtained by the optical device according to the application example of the present disclosure;

disposing the gas cell and the sample on an optical path of the analysis light, causing the analysis light to be incident on the gas cell and the sample while changing the position of the moving mirror, causing the first light receiving element to receive the analysis light emitted from the gas cell and the sample, and outputting the first light receiving signal;

generating, based on the first light receiving signal and a measurement value of the position of the moving mirror, a waveform indicating an intensity of the first light receiving signal at the position of the moving mirror;

performing Fourier transform on the waveform to generate a spectral pattern including a peak, that is based on the light absorption signal, and information derived from the sample;

calculating, based on a difference between a wavelength of the peak and a fundamental wavelength of the gas cell, a correction value for correcting the measurement value of the position of the moving mirror; and correcting the spectral pattern based on the correction value.

According to an application example of the present disclosure, a spectroscopic method of performing spectroscopy on a sample includes:

disposing the gas cell in the optical device according to the application example of the present disclosure on an optical path of the analysis light;

measuring a position of the moving mirror based on the displacement signal obtained by the optical device;

causing the analysis light to be incident on the gas cell while changing the position of the moving mirror, causing the first light receiving element to receive the analysis light emitted from the gas cell, and outputting the first light receiving signal derived from the gas cell;

generating, based on the first light receiving signal derived from the gas cell and a measurement value of the position of the moving mirror, a waveform indicating an intensity of the first light receiving signal derived from the gas cell at the position of the moving mirror;

performing Fourier transform on the waveform derived from the gas cell to generate a spectral pattern including a peak that is based on the light absorption signal;

calculating, based on a difference between a wavelength of the peak and a fundamental wavelength of the gas cell, a correction value for correcting the measurement value of the position of the moving mirror;

disposing the sample on the optical path of the analysis light;

measuring the position of the moving mirror using the displacement signal obtained by the optical device;

causing the analysis light to be incident on the sample while changing the position of the moving mirror, causing the first light receiving element to receive the analysis light emitted from the sample, and outputting the first light receiving signal derived from the sample;

generating, based on the first light receiving signal derived from the sample, the measurement value of the position of the moving mirror, and the correction value, a waveform indicating an intensity of the first light receiving signal derived from the sample at the position of the moving mirror; and performing Fourier transform on the waveform derived from the sample to generate a spectral pattern including information derived from the sample.

BRIEF DESCRIPTION OF THE DRAWINGS

FIG. 10 is a flowchart showing a spectroscopic method according to a first embodiment.

FIG. 32 is a perspective view showing another configuration example of the resonator element shown in FIG. 29.

FIG. 38 is a diagram showing details of the signal generation unit in the schematic diagram shown in FIG. 37.

DESCRIPTION OF EMBODIMENTS

Hereinafter, an optical device, a spectroscopic device, and a spectroscopic method according to the present disclosure will be described in detail based on embodiments shown in the accompanying drawings.

1. First Embodiment

Figure 1:
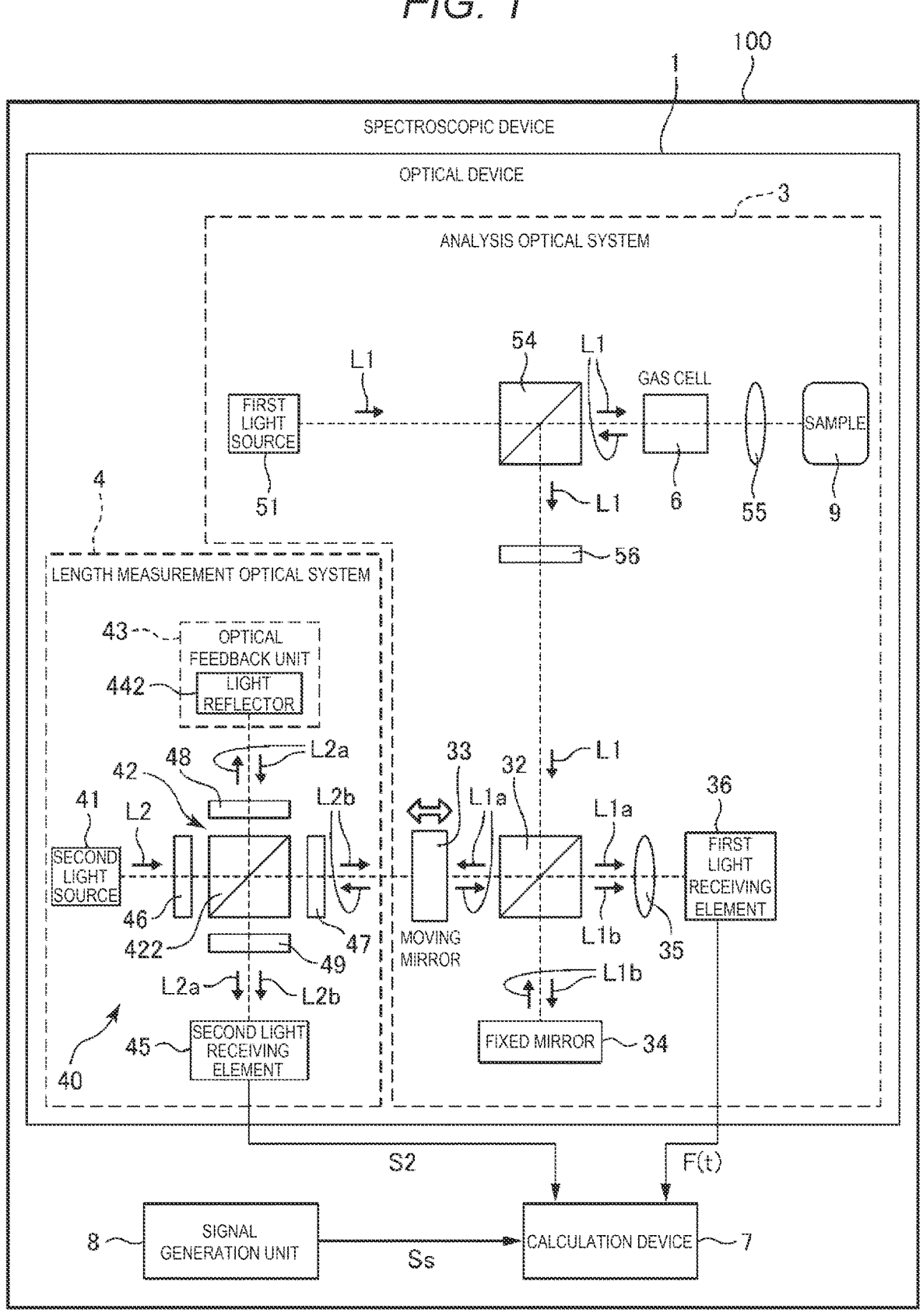
FIG. 1 is a schematic configuration diagram showing a spectroscopic device according to a first embodiment.

First, an optical device, a spectroscopic device, and a spectroscopic method according to a first embodiment will be described. FIG. 1 is a schematic configuration diagram showing a spectroscopic device 100 according to the first embodiment.

1.1. Spectroscopic Device

In the spectroscopic device 100 shown in FIG. 1, an interferogram is obtained by irradiating a sample 9, which is an object to be detected, with incident analysis light L1, making the analysis light L1 emitted from the sample 9 to pass through a Michelson interference optical system, detecting a change in an intensity of obtained interference light, and performing calculation to be described later. By performing Fourier transform on the obtained interferogram, a spectral pattern including information derived from the sample 9 is generated. By selecting a wavelength of the analysis light L1, the spectroscopic device 100 shown in FIG. 1 can be applied to, for example, Fourier infrared spectroscopy (FT-IR), Fourier type near-infrared spectroscopy (FT-NIR), Fourier visible spectroscopy (FT-VIS), Fourier ultraviolet spectroscopy (FT-UV) and Fourier terahertz spectroscopy (FT-THz) for the sample 9.

The spectroscopic device 100 includes an optical device 1, a signal generation unit 8, and a calculation device 7.

As shown in FIG. 1, the optical device 1 includes an analysis optical system 3 and a length measurement optical system 4.

In order to extract a sample-derived signal derived from the sample 9 based on the analysis light L1 while irradiating the sample 9 with the analysis light L1, the analysis optical system 3 splits and mixes the analysis light L1 while changing an optical path length of the analysis light L1, thereby generating interference. In the length measurement optical system 4, a change in the optical path length of the analysis light L1 is measured using length measurement light L2 which is laser light.

The signal generation unit 8 has a function of outputting a reference signal Ss toward the calculation device 7. The calculation device 7 has a function of determining a waveform indicating an intensity of the interference light with respect to the optical path length, that is, the interferogram described above, based on a signal indicating the intensity of the interference light output from the analysis optical system 3 and a signal indicating the change in the optical path length output from the length measurement optical system 4. The calculation device 7 has a function of performing Fourier transform on the interferogram to obtain a spectral pattern.

1.2. Optical Device

Next, the optical device 1 according to the first embodiment will be described.

As described above, the optical device 1 includes the analysis optical system 3 and the length measurement optical system 4.

1.2.1. Analysis Optical System

The analysis optical system 3 includes a first light source 51, a beam splitter 54, a gas cell 6, a condensing lens 55, and a neutral density filter 56. In the analysis optical system 3, a part of these optical elements described above may be omitted, optical elements other than these may be provided, or these optical elements may be replaced by other optical elements having equivalent functions.

The first light source 51 is a light source that emits, for example, white light, that is, light obtained by gathering light of a wide wavelength as the analysis light L1. A wavelength range of the analysis light L1, that is, a type of the first light source 51 is appropriately selected according to the purpose of spectroscopy performed on the sample 9. When infrared spectroscopy is performed, examples of the first light source 51 include a halogen lamp, an infrared lamp, and a tungsten lamp. When visible light spectroscopy is performed, examples of the first light source 51 include a halogen lamp. When ultraviolet spectroscopy is performed, examples of the first light source 51 include a deuterium lamp, and an ultraviolet light emitting diode (UV-LED).

By selecting a wavelength of 100 nm or more and less than 760 nm as the wavelength of the analysis light L1, it is possible to implement the spectroscopic device 100 capable of performing the ultraviolet spectroscopy or the visible light spectroscopy. In addition, by selecting a wavelength of 760 nm or more and 20 μm or less as the wavelength of the analysis light L1, it is possible to implement the spectroscopic device 100 capable of performing the infrared spectroscopy or the near-infrared spectroscopy. Further, by selecting a wavelength of 30 μm or more and 3 mm or less as the wavelength of the analysis light L1, it is possible to implement the spectroscopic device 100 capable of performing terahertz wave spectroscopy.

The first light source 51 may not be provided in the optical device 1 and may be provided outside. In this case, the analysis light L1 emitted from the first light source 51 provided outside may be introduced into the optical device 1. Meanwhile, by providing the first light source 51 in the optical device 1 as in the embodiment, alignment accuracy between the first light source 51 and the beam splitter 54 can be particularly enhanced, and loss of the analysis light L1 caused by alignment failure can be reduced to the minimum.

The analysis light L1 is transmitted through the beam splitter 54 and is incident on the gas cell 6. The analysis light L1 transmitted through the gas cell 6 is condensed by the condensing lens 55 and is emitted to the sample 9.

For example, a non-polarizing beam splitter is used as the beam splitter 54, but a polarizing beam splitter may also be used. In this case, a necessary wavelength plate may be appropriately added. A part of the analysis light L1 emitted from the first light source 51 is reflected by the beam splitter 54, whereas in the embodiment, the reflected analysis light L1 is left unused.

The condensing lens 55 condenses the analysis light L1 and reduces a spot size of the analysis light L1 with which the sample 9 is irradiated. Accordingly, local analysis is possible.

In the gas cell 6, a gas that absorbs light of a predetermined wavelength is sealed. When the analysis light L1 is incident on the gas cell 6, a light absorption signal is added to the analysis light L1. The light absorption signal is light absorption of a specific wavelength determined by the gas. The gas cell 6 will be described in detail later.

The analysis light L1 emitted from the sample 9 includes a sample-derived signal generated by an action between the analysis light L1 and the sample 9. Examples of the sample-derived signal include light absorption of a specific wavelength by the sample 9 when the analysis light L1 acts on the sample 9. The analysis light L1 passes through the condensing lens 55 and the gas cell 6, is reflected by the beam splitter 54, and passes through the neutral density filter 56. The neutral density filter 56 selectively attenuates light of a predetermined wavelength. Accordingly, an S/N ratio (signal-to-noise ratio) of the sample-derived signal can be increased, and the spectroscopy can be performed with higher accuracy. Examples of the neutral density filter 56 include a notch filter having an optical density (OD value) of 6.0 or more.

The analysis optical system 3 includes a beam splitter 32, a moving mirror 33, a fixed mirror 34, a condensing lens 35, and a first light receiving element 36, which constitute a Michelson interference optical system. In the analysis optical system 3, a part of these optical elements described above may be omitted, optical elements other than these may be provided, or these optical elements may be replaced by other optical elements having equivalent functions.

The beam splitter 32 is a non-polarizing beam splitter that splits the analysis light L1 into two parts including analysis light L1a and analysis light L1b. Specifically, the beam splitter 32 has a function of splitting the analysis light L1 into two parts by reflecting a part of the analysis light L1 toward the moving mirror 33 as the analysis light L1a and transmitting the other part of the analysis light L1 toward the fixed mirror 34 as the analysis light L1b.

Examples of types of the beam splitter 32 include a plate-type element and a stacked-type element in addition to a prism-type element (cube-type element) shown in FIG. 1. Since wavelength dispersion occurs between the analysis light L1a and the analysis light L1b when the plate-type beam splitter 32 is used, a wavelength dispersion compensator may be disposed between the beam splitter 32 and the fixed mirror 34 if necessary. The wavelength dispersion compensator is an optical element that compensates for wavelength dispersion caused by an optical path length difference between glass materials. In the embodiment, since a prism-type element is used as the beam splitter 32, the wavelength dispersion compensator is unnecessary. The prism-type element is an element in which an optical thin film is sandwiched between prisms. In addition, the stacked-type element is an element in which an optical thin film is sandwiched between two transparent flat plates. Similarly to the prism-type element, the stacked-type element can also eliminate the need for the wavelength dispersion compensator. In addition, in the prism-type element and the stacked-type element, long-term reliability of the beam splitter 32 can be enhanced since the optical thin film is not exposed.

In addition, the beam splitter 32 transmits the analysis light L1a reflected by the moving mirror 33 toward the first light receiving element 36, and reflects the analysis light L1b reflected by the fixed mirror 34 toward the first light receiving element 36. Therefore, the beam splitter 32 has a function of mixing the split analysis light L1a and L1b.

The moving mirror 33 is a mirror that moves in an incident direction of the analysis light L1a toward the beam splitter 32 and reflects the analysis light L1a. A phase of the analysis light L1a reflected by the moving mirror 33 changes according to a position of the moving mirror 33. Accordingly, the moving mirror 33 adds a first modulation signal to the analysis light L1a. The first modulation signal is a change in phase added to the analysis light L1a according to the position of the moving mirror 33.

A moving mechanism (not shown) for moving the moving mirror 33 is not particularly limited, and includes, for example, a uniaxial linear stage, a piezo drive device, a microactuator using a micro electro mechanical system (MEMS) technique. Among these, the uniaxial linear stage can implement good translational performance in moving the moving mirror 33 when being provided with, for example, a voice coil motor (VCM) or a ball screw drive unit and a linear guide mechanism.

The fixed mirror 34 is a mirror whose position is fixed relative to the beam splitter 32 and reflects the analysis light L1b. The analysis light L1b reflected by the fixed mirror 34 is mixed with the analysis light L1a by the beam splitter 32, and is received by the first light receiving element 36 as the interference light. In the analysis optical system 3, an optical path difference occurs between an optical path of the analysis light L1a and an optical path of the analysis light L1b according to the position of the moving mirror 33. Therefore, an intensity of the interference light changes according to the position of the moving mirror 33.

The moving mirror 33 and the fixed mirror 34 may each be a flat mirror or a corner cube mirror. A metal coat using a metal such as Al, Au, or Ag, a dielectric multilayer film, or the like may be formed at a reflective surface of each mirror. Regarding the moving mirror 33, "moving in the incident direction of the analysis light" includes moving in a direction in which a component of the analysis light in the incident direction is contained. Therefore, the moving mirror 33 may move in a direction obliquely inclined with respect to the incident direction (non-parallel direction). In this case, the calculation device 7 only needs to have a function of removing the influence of the moving mirror 33 obliquely inclined with respect to the incident direction of the analysis light. Further, the fixed mirror 34 may also move. In this case, the calculation device 7 only needs to have a function of removing the influence of the movement of the fixed mirror 34.

The condensing lens 35 condenses the interference light, that is, the mixed analysis light L1a and L1b, onto the first light receiving element 36.

The first light receiving element 36 receives the interference light and obtains an intensity thereof. A signal indicating a temporal change in intensity is output as a first light receiving signal F(t). The first light receiving signal F(t) includes the sample-derived signal generated by an interaction between the analysis light L1 and the sample 9, the above-described first modulation signal, and the above-described light absorption signal.

Examples of the first light receiving element 36 include a photodiode and a phototransistor. Among these, examples of the photodiode include an InGaAs-based photodiode, a Si-based photodiode, and an avalanche type photodiode.

1.2.2. Length Measurement Optical System

The length measurement optical system 4 is a Michelson interference optical system and includes a second light source 41 and a length measurement unit 40. The length measurement unit 40 includes a second light splitting element 42, an optical feedback unit 43, and a second light receiving element 45. In the length measurement optical system 4, a part of these optical elements described above may be omitted, optical elements other than these may be provided, or these optical elements may be replaced by other optical elements having equivalent functions.

The second light source 41 is preferably a light source that emits light having a narrow spectral line width. Examples of the second light source 41 include gas lasers such as a He—Ne laser and an Ar laser; semiconductor laser elements such as a distributed feedback-laser diode (DFB-LD), a fiber Bragg grating-laser diode (FBG-LD), a vertical cavity surface emitting laser (VCSEL) and a Fabry-Perot laser diode (FP-LD); and crystal lasers such as yttrium aluminum garnet (YAG).

The second light source 41 is particularly preferably a semiconductor laser element. Accordingly, it is possible to reduce a size and a weight of the optical device 1 and the spectroscopic device 100.

The second light splitting element 42 includes a beam splitter 422, a ½ wavelength plate 46, a ¼ wavelength plate 47, a ¼ wavelength plate 48, and an analyzer 49.

The beam splitter 422 is a polarizing beam splitter that transmits P-polarized light and reflects S-polarized light. The ½ wavelength plate 46 is disposed with an optical axis thereof rotated with respect to a polarization axis of the length measurement light L2. Accordingly, the length measurement light L2 passes through the ½ wavelength plate 46, becomes linearly polarized light including the P-polarized light and the S-polarized light, and is split into two parts including the P-polarized light and the S-polarized light by the beam splitter 422.

Length measurement light L2a, which is the S-polarized light, is converted into circularly polarized light by the ¼ wavelength plate 48 and is incident on the optical feedback unit 43. The optical feedback unit 43 returns the light to the beam splitter 422 by reflecting the length measurement light L2a. At this time, the length measurement light L2a is converted into the P-polarized light by the ¼ wavelength plate 48.

Meanwhile, length measurement light L2b, which is the P-polarized light, is converted into circularly polarized light by the ¼ wavelength plate 47, and is incident on the moving mirror 33. The moving mirror 33 reflects the length measurement light L2b. Accordingly, a phase of the length measurement light L2b changes according to the position of the moving mirror 33. Accordingly, the moving mirror 33 adds a displacement signal to the length measurement light L2b. The length measurement light L2b reflected by the moving mirror 33 is returned to the beam splitter 422. At this time, the length measurement light L2b is converted into the S-polarized light by the ¼ wavelength plate 47.

The length measurement optical system 4 shown in FIG. 1 has a configuration in which the length measurement light L2b is incident on a surface different from a surface of the moving mirror 33 on which the analysis light L1a in the above-described analysis optical system 3 is incident, but the length measurement light L2b may be incident on a surface the same as the surface on which the analysis light L1a is incident.

In addition, the beam splitter 422 transmits the length measurement light L2a fed back from the optical feedback unit 43 toward the second light receiving element 45, and reflects the length measurement light L2b reflected by the moving mirror 33 toward the second light receiving element 45. Therefore, the beam splitter 422 has a function of mixing the split length measurement light L2a and L2b. The mixed length measurement light L2a and L2b is transmitted through the analyzer 49 and is incident on the second light receiving element 45.

A non-polarizing beam splitter may be used as the beam splitter 422 instead of the polarizing beam splitter. In this case, since the wavelength plate or the like is unnecessary, the size of the optical device 1 can be reduced by reducing the number of components.

The optical feedback unit 43 includes a light reflector 442, reflects the light reflected and incident on the beam splitter 422, and returns the light to the beam splitter 422. The light reflector 442 is, for example, a mirror. Accordingly, the configuration of the optical feedback unit 43 can be simplified, and the size of the optical device 1 can be reduced.

The second light receiving element 45 receives the mixed length measurement light L2a and L2b as the interference light, and obtains an intensity thereof. A signal indicating a temporal change in intensity is output as a second light receiving signal S2. The second light receiving signal S2 is a signal including a displacement signal of the moving mirror 33. The displacement signal is a change in phase added to the length measurement light L2b according to the position of the moving mirror 33. As described above, the length measurement unit 40 obtains the displacement signal indicating the position of the moving mirror 33.

Examples of the second light receiving element 45 include a photodiode and a phototransistor.

Although the analysis optical system 3 and the length measurement optical system 4 are described above, it is preferable that an anti-reflection treatment is applied to an optical element that requires light to be incident thereon among the optical elements provided in the analysis optical system 3 and the length measurement optical system 4. Accordingly, S/N ratios of the first light receiving signal F(t) and the second light receiving signal S2 can be increased.

1.3. Signal Generation Unit

Figure 2:
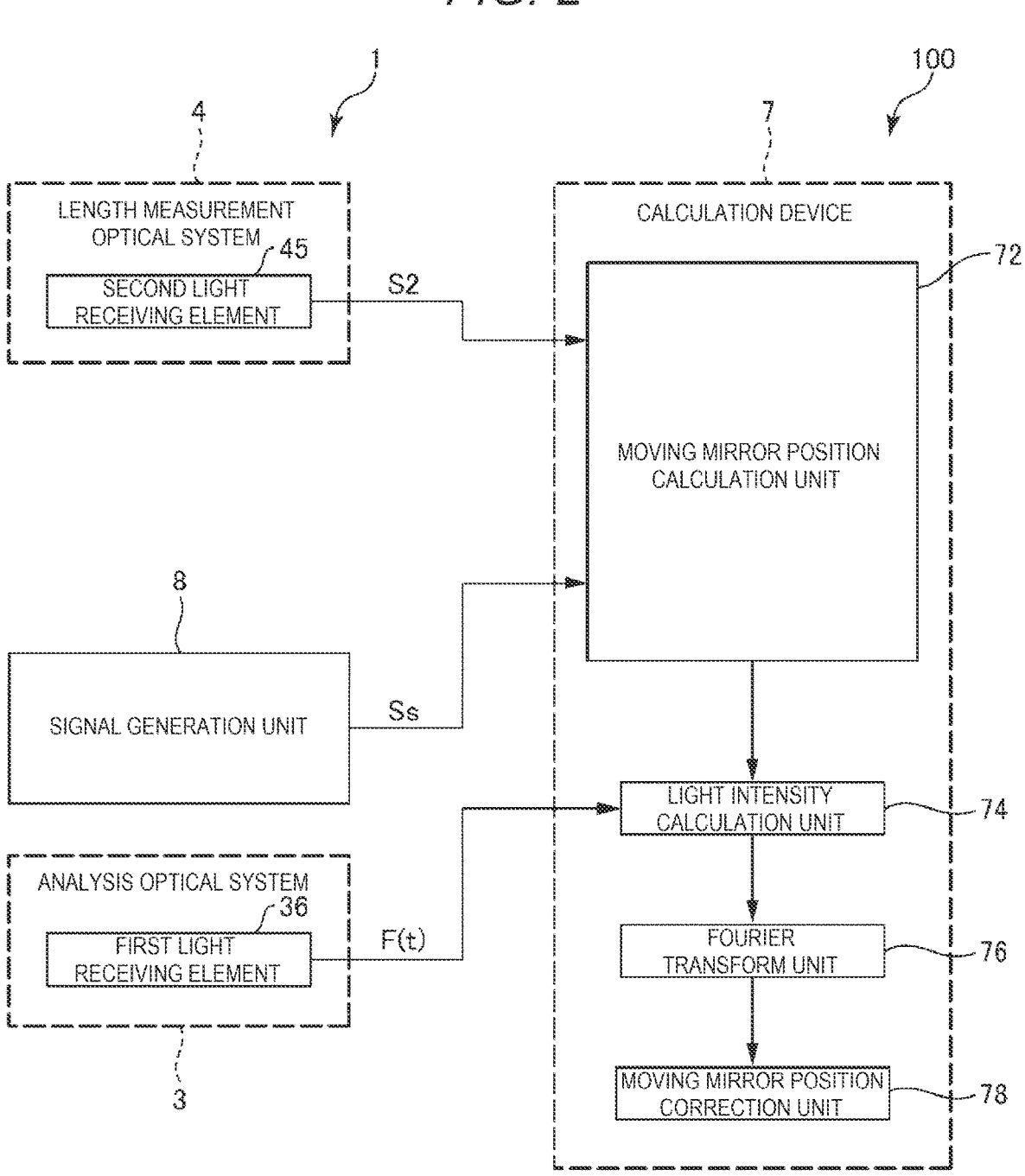
FIG. 2 is a schematic diagram showing main parts of an analysis optical system, a length measurement optical system, a signal generation unit, and a calculation device in FIG. 1.

FIG. 2 is a schematic diagram showing main parts of the analysis optical system 3, the length measurement optical system 4, the signal generation unit 8, and the calculation device 7 in FIG. 1.

The signal generation unit 8 shown in FIG. 2 generates a periodic signal and outputs the periodic signal as the reference signal Ss. Examples of the signal generation unit 8 include a function generator, a signal generator, and a numerically controlled signal generator. The calculation device 7 to be described later generates, based on the reference signal Ss and the displacement signal described above, a moving mirror position signal X(t).

1.4. Calculation Device

The calculation device 7 shown in FIG. 2 includes a moving mirror position calculation unit 72, a light intensity calculation unit 74, and a Fourier transform unit 76, and a moving mirror position correction unit 78. Functions exhibited by these functional units are implemented by hardware including, for example, a processor, a memory, an external interface, an input unit, and a display unit. Specifically, the functions are implemented by a processor reading and executing a program stored in a memory. These components can communicate with one another by an external bus.

Examples of the processor include a central processing unit (CPU) and a digital signal processor (DSP). Instead of a method in which the processor executes software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB) and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel. The input unit and the display unit may be provided as necessary, and may be omitted.

1.4.1. Moving Mirror Position Calculation Unit

The moving mirror position calculation unit 72 generates, based on the reference signal Ss output from the signal generation unit 8, the moving mirror position signal X (t) from the second light receiving signal S2 including the displacement signal of the moving mirror 33. When the moving mirror 33 moves, the intensity of the interference light in the length measurement optical system 4 changes accordingly. In this case, the second light receiving signal S2 is, for example, a signal whose amplitude periodically changes according to an interference condition. The displacement of the moving mirror 33 can be calculated based on the change in the amplitude of the second light receiving signal S2, and the moving mirror position signal X(t) is determined.

1.4.2. Light Intensity Calculation Unit

The light intensity calculation unit 74 generates, based on the first light receiving signal F(t) and the moving mirror position signal X(t), a waveform (interferogram F(x)) representing the intensity of the interference light with respect to the position of the moving mirror 33.

As described above, the first light receiving signal F(t) includes the sample-derived signal, the first modulation signal, and the light absorption signal. The light intensity calculation unit 74 extracts an intensity of the first light receiving signal F(t) based on the moving mirror position signal X(t). Further, the light intensity calculation unit 74 generates the interferogram F(x) based on the position of the moving mirror 33 and the intensity of the first light receiving signal F(t) which are determined based on the moving mirror position signal X(t). The interferogram F(x) is represented by a function of an optical path difference between reflected light from the moving mirror 33 and reflected light from the fixed mirror 34 in the analysis optical system 3 and the intensity of the interference light received by the first light receiving element 36 (intensity of the first light receiving signal F(t)).

Figures 3, 4:
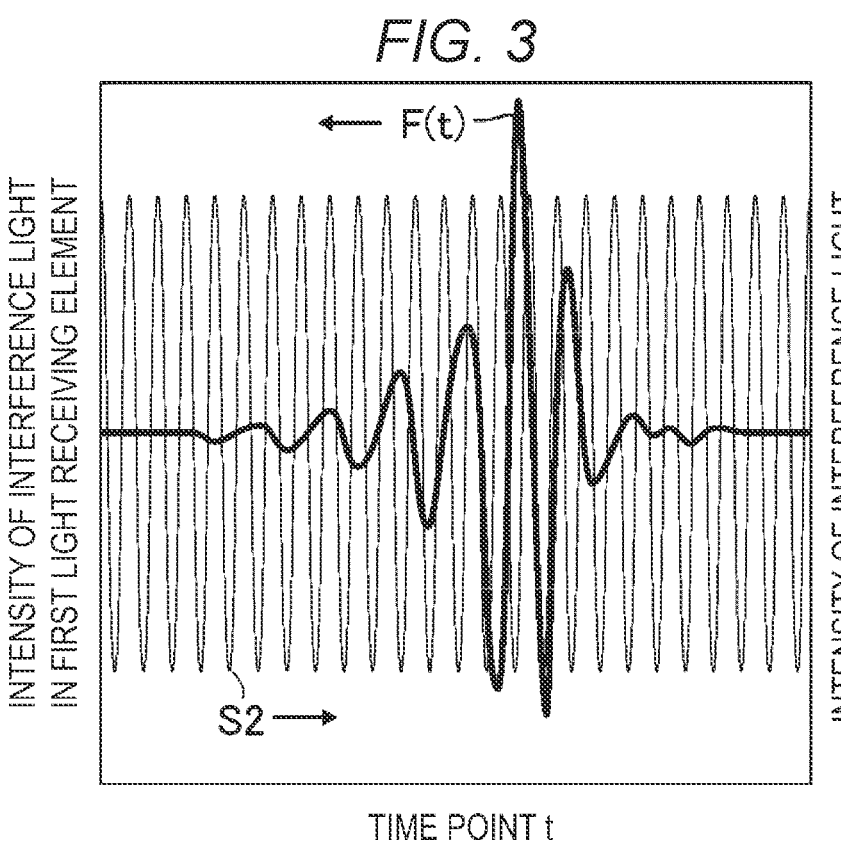
FIG. 3 is a diagram showing an example of a first light receiving signal F(t) and a second light receiving signal S2 obtained by the optical device shown in FIG. 1.
FIG. 4 is a diagram showing an example of an interferogram F(x).

FIG. 3 is a diagram showing an example of the first light receiving signal F(t) and the second light receiving signal S2 obtained by the optical device 1 shown in FIG. 1. A horizontal axis in FIG. 3 indicates a time point, and a vertical axis indicates an intensity of the interference light incident on the first light receiving element 36 or an intensity of the interference light incident on the second light receiving element 45.

FIG. 4 is a diagram showing an example of the interferogram F(x). A horizontal axis of FIG. 4 indicates the optical path difference in the analysis optical system 3, and a vertical axis indicates the intensity of the interference light. The optical path difference in the analysis optical system 3 is a difference between an optical path length between the beam splitter 32 and the moving mirror 33 and an optical path length between the beam splitter 32 and the fixed mirror 34. In FIG. 4, a zero optical path difference is taken as an origin of the horizontal axis.

Figure 5:
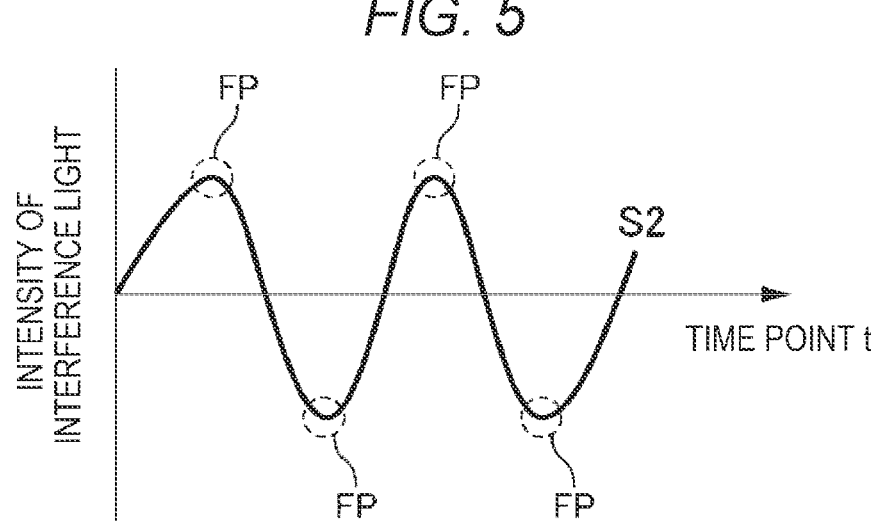
FIG. 5 is a partially enlarged view of the second light receiving signal S2 shown in FIG. 3.

FIG. 5 is a partially enlarged view of the second light receiving signal S2 shown in FIG. 3. The second light receiving signal S2 shown in FIG. 5 is a signal that vibrates at a predetermined cycle, and a point at which an amplitude is maximum is a feature point FP. The light intensity calculation unit 74 can associate the position of the moving mirror 33 with the intensity of the first light receiving signal F(t) by extracting the intensity of the first light receiving signal F(t) shown in FIG. 3 at the time points of the feature points FP. Accordingly, digital data of the interferogram F(x) can be obtained.

1.4.3. Fourier Transform Unit

The Fourier transform unit 76 performs the Fourier transform on the interferogram F(x). Accordingly, a spectral pattern unique to the sample 9 is obtained.

Figure 6:
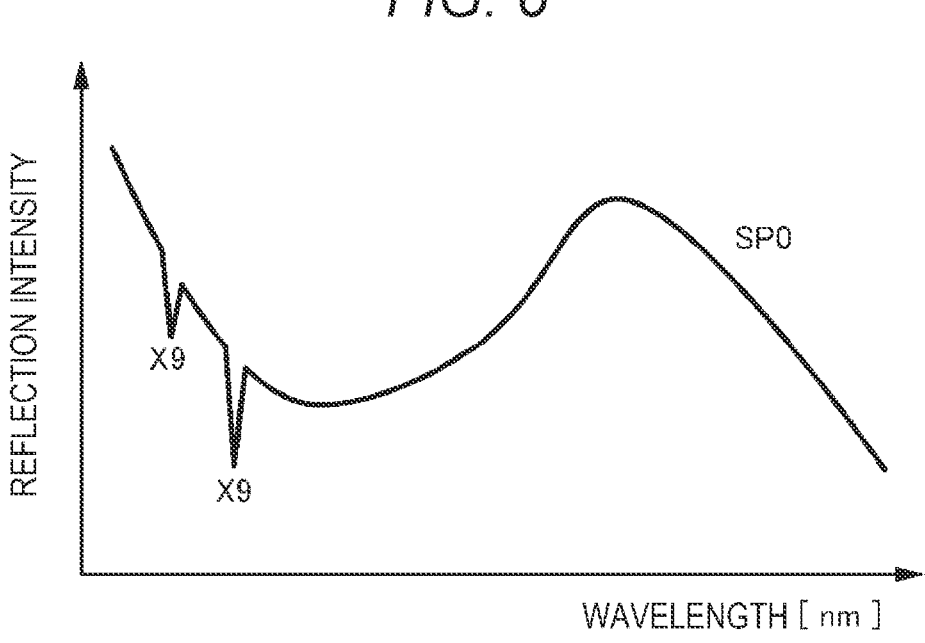
FIG. 6 is an example of a spectral pattern SP0 obtained by performing spectroscopy on a sample.

FIG. 6 is an example of a spectral pattern SP0 obtained by performing spectroscopy on the sample 9. The spectral pattern SP0 is an example of a reflection spectrum of the sample 9.

In the spectral pattern SP0 shown in FIG. 6, the sample-derived signal generated by the analysis light L1 acting on the sample 9 is reflected as an absorption peak X9. According to the spectroscopic device 100 including the optical device 1 described above, characteristics of the sample 9, for example, a material, a structure, and a component, can be analyzed based on the spectral pattern SP0.

1.4.4. Moving Mirror Position Correction Unit

The moving mirror position correction unit 78 calculates, by a method to be described later, a correction value for correcting a measurement value of the position of the moving mirror. Accordingly, the displacement of the moving mirror 33 contained in the moving mirror position signal X (t) can be brought close to a true value. As a result, accuracy on a wavenumber axis (wavelength axis) of the finally obtained spectral pattern can be enhanced.

1.5. Gas Cell

Next, the gas cell 6 provided in the analysis optical system 3 will be described.

In the gas cell 6, a gas that absorbs light of a predetermined wavelength is sealed. Examples of the sealed gas include gaseous alkali metals such as cesium and rubidium, halogens such as gaseous iodine, rare gases such as krypton, and also hydrogen cyanide and acetylene. These atoms or molecules absorb or emit light of a predetermined wavelength. The gas cell 6 may be provided with a temperature adjustment mechanism (not shown). Accordingly, a vapor pressure of the gas can be sufficiently enhanced even when a size of the gas cell 6 is further reduced. As a result, the size of the gas cell 6 can be reduced.

Table 1 below shows examples of combinations of gases (atoms or molecules) sealed in the gas cell 6 and wavelengths of light with which the gases are irradiated.

TABLE 1

| Wavelength | Atoms/molecules sealed in gas cell |
|---|---|
| 633 nm | Iodine |
| 780 nm | $^{85}$Rb (D2 line) , $^{87}$Rb (D2 line) |
| 795 nm | $^{85}$Rb (D1 line) , $^{87}$Rb (D1 line) |
| 852 nm | Cs (D2 line) |
| 895 nm | Cs (D1 line) |
| 1550 nm | HCN, $C_2H_2$, Kr |

As shown in Table 1, the wavelength to be absorbed can be changed by selecting the gas sealed in the gas cell 6. In order to select the gas, a gas whose absorption wavelength overlaps an emission spectrum of the first light source 51 is selected.

When the analysis light L1 emitted from the beam splitter 54 is incident on the gas cell 6, the gas sealed in the gas cell 6 is irradiated with the analysis light L1. Accordingly, the atoms and molecules constituting the gas transition from a ground state to a state having higher energy (excited state) according to energy of the analysis light L1.

Figure 7:
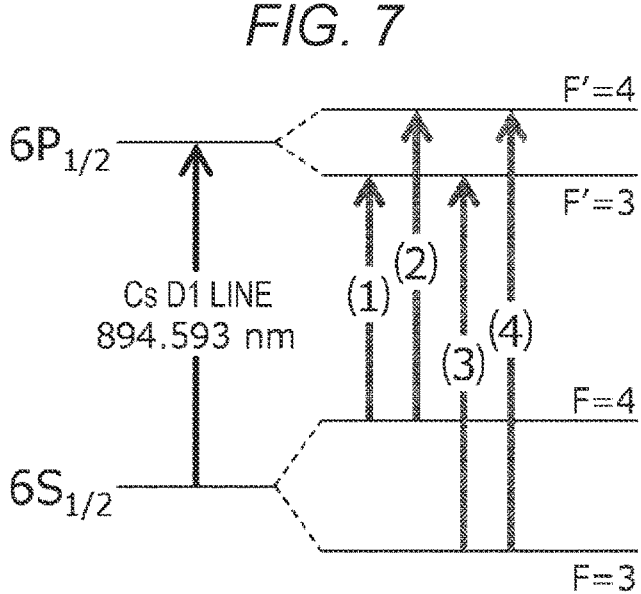
FIG. 7 is an energy level diagram showing an ultrafine structure in a ground state of cesium atoms.

FIG. 7 is an energy level diagram showing an ultrafine structure in a ground state of cesium atoms.

As shown in FIG. 7, it is known that the cesium atoms have an energy level represented by $6S_{1/2}$ as a ground level and an energy level represented by $6P_{1/2}$ as an excitation level. Each energy level of $6S_{1/2}$ and $6P_{1/2}$ has an ultrafine structure split into a plurality of energy levels. Specifically, $6S_{1/2}$ has two ground levels represented by F=3 and F=4. Further, $6P_{1/2}$ has two excitation levels represented by F'=3 and F'=4.

The cesium atoms at the ground level transition to the excitation level by absorbing, for example, Cs (D1 line) shown in FIG. 7.

For example, the cesium atoms at the ground level of F=4 transition to the excitation level of F'=3 by absorbing energy between levels indicated by an arrow (1) in FIG. 7. Further, the cesium atoms transition to the excitation level of F'=4 by absorbing energy between levels indicated by an arrow (2) in FIG. 7.

Further, the cesium atoms at the ground level of F=3 transition to the excitation level of F'=3 by absorbing energy between levels indicated by an arrow (3) in FIG. 7. Further, the cesium atoms transition to the excitation level of F'=4 by absorbing energy between levels indicated by an arrow (4) in FIG. 7.

Resonance wavelengths corresponding to the transitions of the arrows (1) to (4) in FIG. 7 are shown in Table 2 below.

TABLE 2

| Level | Transition | Resonance wavelength [nm] |
|---|---|---|
| (1) | $6S_{1/2}$ F = 4 → $6P_{1/2}$ F' = 3 | 894.6054 |
| (2) | $6S_{1/2}$ F = 4 → $6P_{1/2}$ F' = 4 | 894.6023 |
| (3) | $6S_{1/2}$ F = 3 → $6P_{1/2}$ F' = 3 | 894.5809 |
| (4) | $6S_{1/2}$ F = 3 → $6P_{1/2}$ F' = 4 | 894.5779 |

Figure 8:
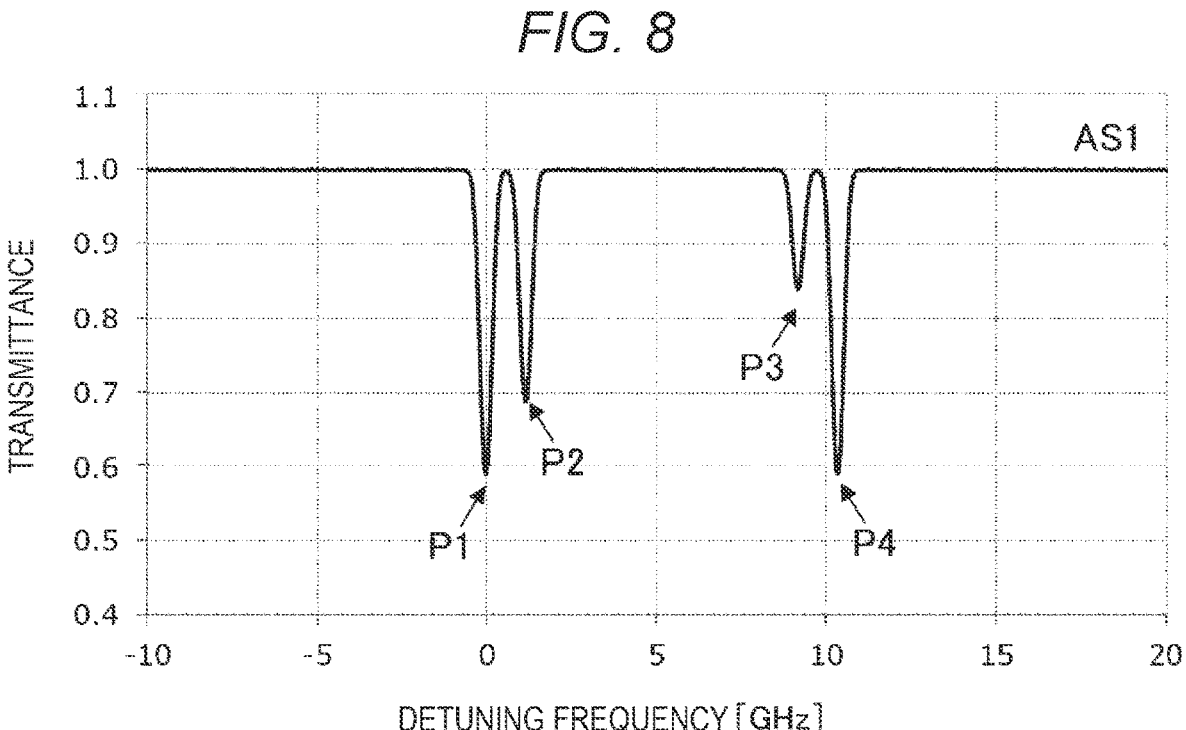
FIG. 8 is an absorption spectrum AS1 of Cs (D1 line) shown in FIG. 7.

FIG. 8 is an absorption spectrum AS1 of the Cs (D1 line) shown in FIG. 7. Four absorption peaks P1 to P4 are observed in the absorption spectrum AS1 shown in FIG. 8. Frequencies of the absorption peaks P1 to P4 correspond to four transition frequencies represented by the arrows (1) to (4) in FIG. 7.

For example, when the analysis light L1 is incident on the gas cell 6 in which the cesium atoms are sealed, the spectral pattern output from the Fourier transform unit 76 of the calculation device 7 shown in FIG. 2 is obtained by superimposing the absorption spectrum AS1 shown in FIG. 8 on the spectral pattern SP0 shown in FIG. 6.

Figure 9:
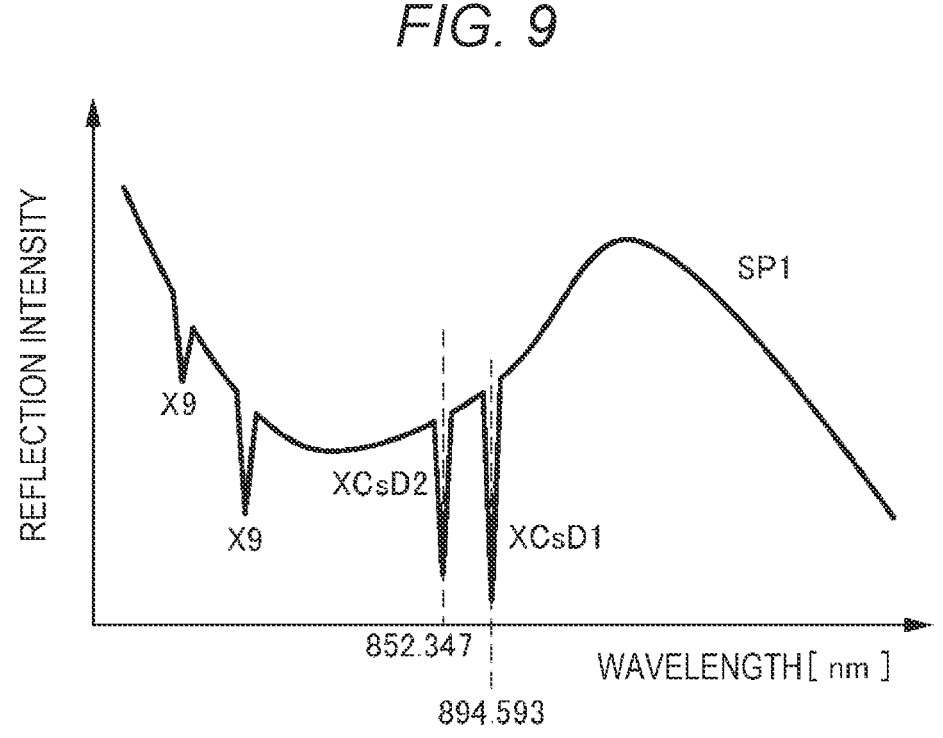
FIG. 9 is an example of a spectral pattern SP1 obtained by the spectroscopic device shown in FIG. 2.

FIG. 9 is an example of the spectral pattern SP1 obtained by the spectroscopic device 100 shown in FIG. 2.

The spectral pattern SP1 shown in FIG. 9 includes the absorption peaks X9 derived from the sample 9 and absorption peaks XCsD1 and XCsD2 derived from the cesium atoms. The absorption peak X9 corresponds to the sample-derived signal described above. The absorption peak XCsD1 is a peak due to absorption of the Cs (D1 line) described above. The absorption peak XCsD1 shown in FIG. 9 shows a state in which four fine peaks shown in Table 2 appear as one peak without being decomposed. The absorption peak XCsD2 is a peak due to absorption of the Cs (D2 line) shown in Table 1, and also shows a state in which a plurality of fine peaks appear as one peak without being decomposed. The absorption peaks XCsD1 and XCsD2 correspond to the light absorption signal described above.

Since the wavelengths of the absorption peaks XCsD1 and XCsD2 in the spectral pattern SP1 correspond to the energy between the levels described above, accuracy and stability are extremely high. A fluctuation due to a temperature change is less than pm order. Therefore, "true values (fundamental wavelengths)" of the wavelengths of the absorption peaks XCsD1 and XCsD2 are known. In this way, when there is a "wavelength shift $\Delta\lambda$" between actual measurement values of the wavelengths of the absorption peaks XCsD1 and XCsD2 in the spectral pattern SP1 as an analysis result and true values (fundamental wavelengths), the wavelength shift $\Delta\lambda$ is considered to be caused by various errors of the spectroscopic device 100.

Here, when there is a measurement error in a measurement value of a moving distance of the moving mirror 33 measured by the above-described length measurement optical system 4, the influence of the measurement error is considered. For example, it is assumed that when a true value L [mm] of the moving distance of the moving mirror 33 is measured, a measurement value L (1+σ) [mm] including an error σ is obtained. In this case, the error σ causes a shift of the wavelength from a true value λ on the spectral pattern SP1. The shift can be represented as σλ using the error σ. Therefore, it can be said that the wavelength shift Δλ on the spectral pattern SP1 is caused by the measurement error in a displacement amount of the moving mirror 33 regardless of the moving distance of the moving mirror 33. In this way, the moving mirror position signal X(t) can be corrected based on the wavelength shift Δλ on the spectral pattern SP1. Specifically, when a calculated moving distance of the moving mirror 33 before correction is L' and a calculated moving distance after correction is L0, the calculated moving distance L0 after correction can be represented as L0=L'/(1+σ). Since the measurement error is offset by correcting the moving mirror position signal X(t) based on the relational expression, the corrected moving mirror position signal X(t) reflecting a measurement result close to the true value can be obtained. As a result, it is possible to obtain the spectral pattern SP1 with high accuracy on the wavenumber axis (wavelength axis). In the example, the error σ is a correction value for obtaining the moving mirror position signal X(t) after correction.

As an example, it is considered that the actual measurement value of the wavelength of the absorption peak XCsD1 is 892.000 nm in FIG. 9. Since the true value of the wavelength of the absorption peak XCsD1 is 894.593 nm, the wavelength shift Δλ is Δλ=894.593−892.000=2.593 [nm]. In this way, since Δλ=σλ, σ=2.593/894.593=0.002899. By substituting σ thus calculated into L0=L'/(1+σ), the calculated moving distance L0 after correction can be calculated.

The absorption peak used for the correction may be the absorption peak XCsD2 instead of the absorption peak XCsD1, or may be one of the fine peaks in the absorption peak XCsD1. In addition, after calculating the errors σ from the plurality of absorption peaks, the correction may be performed based on an average value of the errors σ or other calculation.

The moving mirror position correction unit 78 of the calculation device 7 may have a function of calculating, based on a difference between the actual measurement value of the wavelength of the absorption peak XCsD1 (the actual measurement value of the wavelength of the peak based on the light absorption signal) and the true value of the wavelength of the absorption peak XCsD1 (the fundamental wavelength of the gas cell 6), a correction value for correcting the measurement value of the position of the moving mirror 33, and correcting the moving mirror position signal X(t) based on the correction.

In the embodiment, the gas cell 6 is disposed between the beam splitter 54 and the sample 9. Therefore, when the sample 9 is irradiated with the analysis light L1, the gas cell 6 is also always irradiated with the analysis light L1. Therefore, in the embodiment, the absorption peak XCsD1 can be obtained together with the absorption peak X9 derived from the sample 9. As a result, since the wavenumber axis (wavelength axis) can be corrected simultaneously with the acquisition of the spectral pattern SP1, the correction can be performed in real time, and particularly highly accurate spectroscopy can be performed.

In the embodiment, the analysis light L1 transmitted through the gas cell 6 is reflected by the sample 9 and transmitted through the gas cell 6 again. Therefore, the spectral pattern SP1 obtained in the embodiment is a reflection spectrum. In addition, since the analysis light L1 is absorbed twice by the gas cell 6, an intensity of the absorption peak XCsD1 increases accordingly. Accordingly, since an S/N ratio (signal-to-noise ratio) of the absorption peak XCsD1 can be increased, accuracy of the correction value can be enhanced, and particularly highly accurate spectroscopy can be performed.

In addition, since the energy between levels of atoms and molecules sealed in the gas cell 6 is extremely high in accuracy and stability, the above effect can be obtained even when wavelength stability of the length measurement light L2 emitted from the second light source 41 is low. Therefore, even when a small and inexpensive element such as a semiconductor laser element is adopted as the second light source 41, it is not necessary to provide additional equipment such as a light source thermostatic system. Accordingly, it is possible to reduce a size, a weight, power consumption, and cost of the optical device 1.

The arrangement of the gas cell 6 is not limited to the above-described arrangement as long as the gas cell 6 is disposed at a position where the analysis light L1 can be incident.

1.6. Spectroscopic Method

Next, a spectroscopic method according to the first embodiment will be described.

FIG. 10 is a flowchart showing the spectroscopic method according to the first embodiment.

The spectroscopic method shown in FIG. 10 includes a mirror position measurement step S102, an analysis light irradiation step S104, a waveform generation step S106, a Fourier transform step S108, a correction value calculation step S110, and a spectrum information correction step S112.

In the mirror position measurement step S102, the length measurement light L2 (laser light) is made incident on the length measurement unit 40 of the optical device 1, and measurement of the position of the moving mirror 33 is started. Accordingly, acquisition of a displacement signal corresponding to the position of the moving mirror 33 is started.

In the analysis light irradiation step S104, the gas cell 6 and the sample 9 are disposed on the optical path of the analysis light L1, and the analysis light is incident on the gas cell 6 and the sample 9 while changing the position of the moving mirror 33. Further, the analysis light L1 emitted from the gas cell 6 and the sample 9 is received by the first light receiving element 36, and the first light receiving signal F(t) is output. The incidence of the analysis light L1 on the gas cell 6 and the incidence of the analysis light L1 on the sample 9 may be performed simultaneously or at different times. When the optical device 1 shown in FIG. 2 is used, the incidence of the analysis light L1 on the gas cell 6 and the incidence of the analysis light L1 on the sample 9 can be simultaneously performed.

In the waveform generation step S106, the moving mirror position signal X(t) is generated based on the displacement signal corresponding to the position of the moving mirror 33. Further, based on the first light receiving signal F(t) and the moving mirror position signal X(t) (the position of the moving mirror 33), the interferogram F(x) (a waveform indicating an intensity of the first light receiving signal F(t) at each position of the moving mirror 33) derived from both the gas cell 6 and the sample 9 is generated.

In the Fourier transform step S108, Fourier transform is performed on the interferogram F(x) to generate a spectral pattern including the absorption peak X9 (the peak based on the sample-derived signal) and the absorption peak XCsD1 (the peak based on the light absorption signal).

In the correction value calculation step S110, a correction value for correcting the measurement value of the position of the moving mirror 33 is calculated based on the difference between the wavelength of the absorption peak XCsD1 and the fundamental wavelength of the gas cell 6. That is, the correction value is calculated based on the position of the absorption peak XCsD1.

In the spectrum information correction step S112, the spectral pattern is corrected based on the correction value.

According to the spectroscopic method described above, even when wavelength stability of the length measurement light L2 emitted from the second light source 41 is low, a spectral pattern including the highly accurate absorption peak X9 can be obtained by correction. In addition, even when a small and inexpensive element such as a semiconductor laser element is adopted as the second light source 41, it is not necessary to provide additional equipment such as a light source thermostatic system. Accordingly, it is possible to reduce a size, a weight, power consumption, and cost of the optical device 1.

2. First Modification of First Embodiment

Next, an optical device and a spectroscopic device according to a first modification of the first embodiment will be described.

Figure 11:
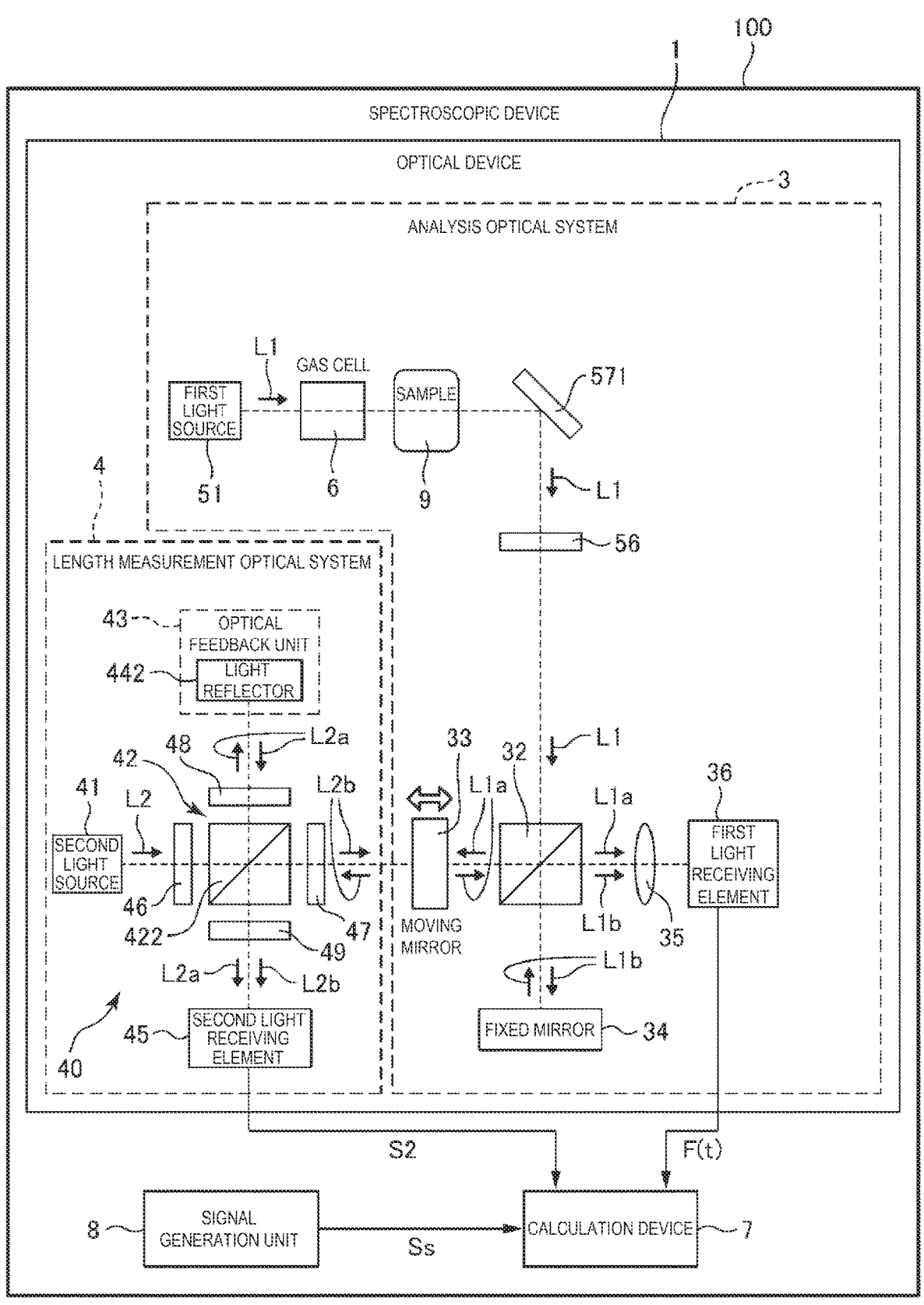
FIG. 11 is a schematic configuration diagram showing a spectroscopic device according to a first modification of the first embodiment.

FIG. 11 is a schematic configuration diagram showing the spectroscopic device 100 according to the first modification of the first embodiment. The spectroscopic device 100 shown in FIG. 11 is the same as the spectroscopic device 100 shown in FIG. 1 except that a configuration of the analysis optical system 3 of the optical device 1 is different.

The analysis optical system 3 shown in FIG. 11 includes a mirror 571 instead of the beam splitter 54. The mirror 571 changes an optical path of the analysis light L1 emitted from the first light source 51. The gas cell 6 and the sample 9 are disposed between the first light source 51 and the mirror 571. Accordingly, the analysis light L1 emitted from the first light source 51 passes through the gas cell 6 and the sample 9 and is incident on the mirror 571. Therefore, the spectral pattern obtained in the first modification is a transmission spectrum. In the first modification described above, effects the same as those of the first embodiment can also be obtained. The mirror 571 may be provided as necessary, and may be omitted depending on the arrangement of the first light source 51 and the sample 9.

Figure 12:
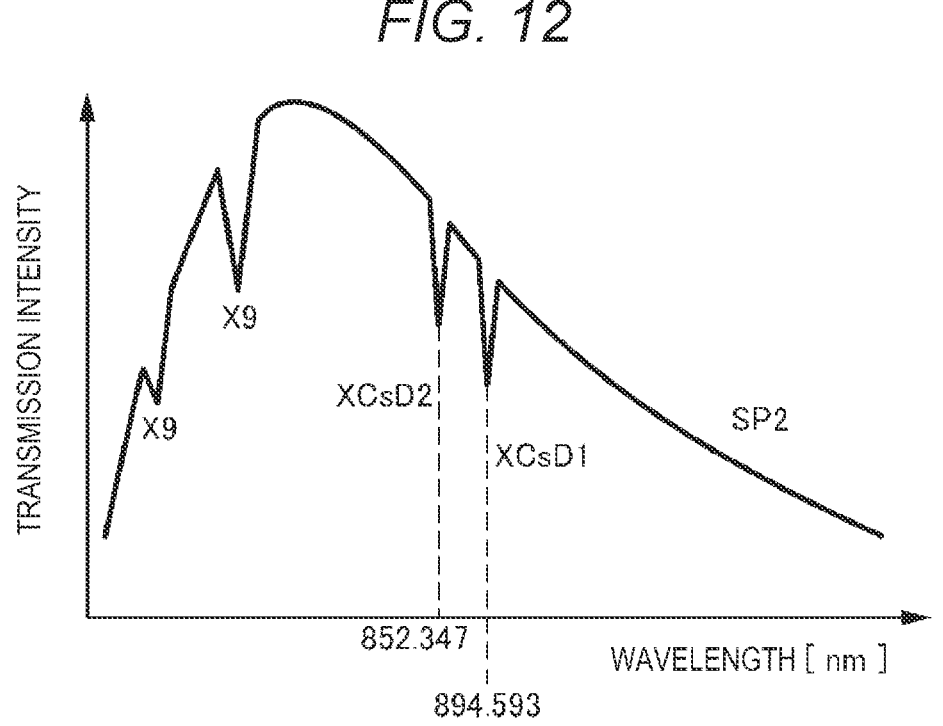
FIG. 12 is an example of a spectral pattern SP2 obtained by the spectroscopic device shown in FIG. 11.

FIG. 12 is an example of a spectral pattern SP2 obtained by the spectroscopic device 100 shown in FIG. 11. The spectral pattern SP2 is an example of a transmission spectrum of the sample 9.

The spectral pattern SP2 shown in FIG. 12 also includes the absorption peaks X9 derived from the sample 9 and the absorption peaks XCsD1 and XCsD2 derived from the cesium atoms.

In the first modification described above, effects the same as those of the first embodiment can also be obtained.

3. Second Modification of First Embodiment

Next, an optical device and a spectroscopic device according to a second modification of the first embodiment will be described.

Figure 13:
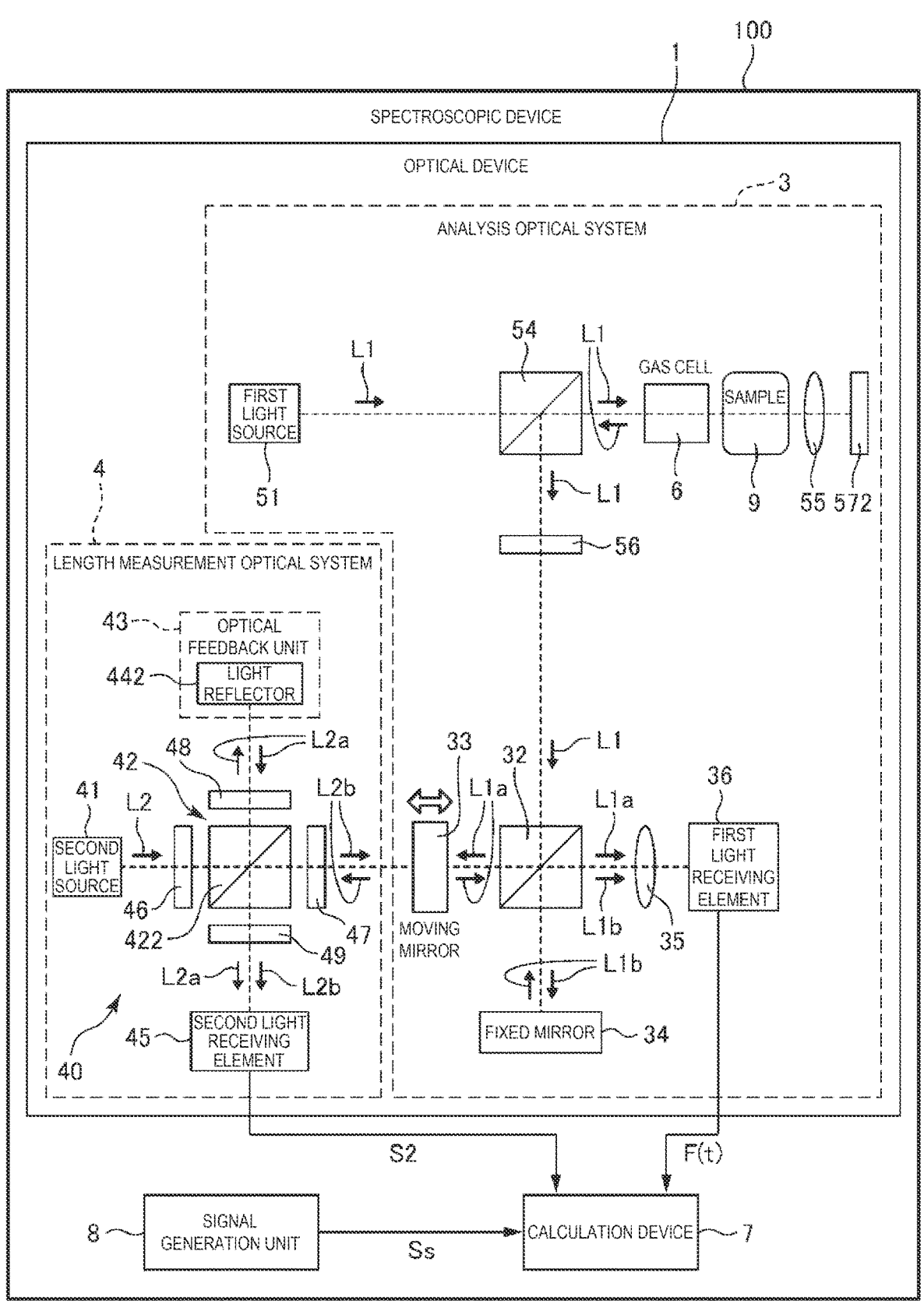
FIG. 13 is a schematic configuration diagram showing a spectroscopic device according to a second modification of the first embodiment.

FIG. 13 is a schematic configuration diagram showing the spectroscopic device 100 according to the second modification of the first embodiment. The spectroscopic device 100 shown in FIG. 13 is the same as the spectroscopic device 100 shown in FIG. 1 except that a configuration of the analysis optical system 3 of the optical device 1 is different.

The analysis optical system 3 shown in FIG. 13 includes a mirror 572 provided on an opposite side of the condensing lens 55 from the sample 9. The mirror 572 reflects the analysis light L1 transmitted through the sample 9 and causes the analysis light L1 to be incident on the sample 9 again. Therefore, the spectral pattern obtained in the second modification is a transmission spectrum.

Figure 14:
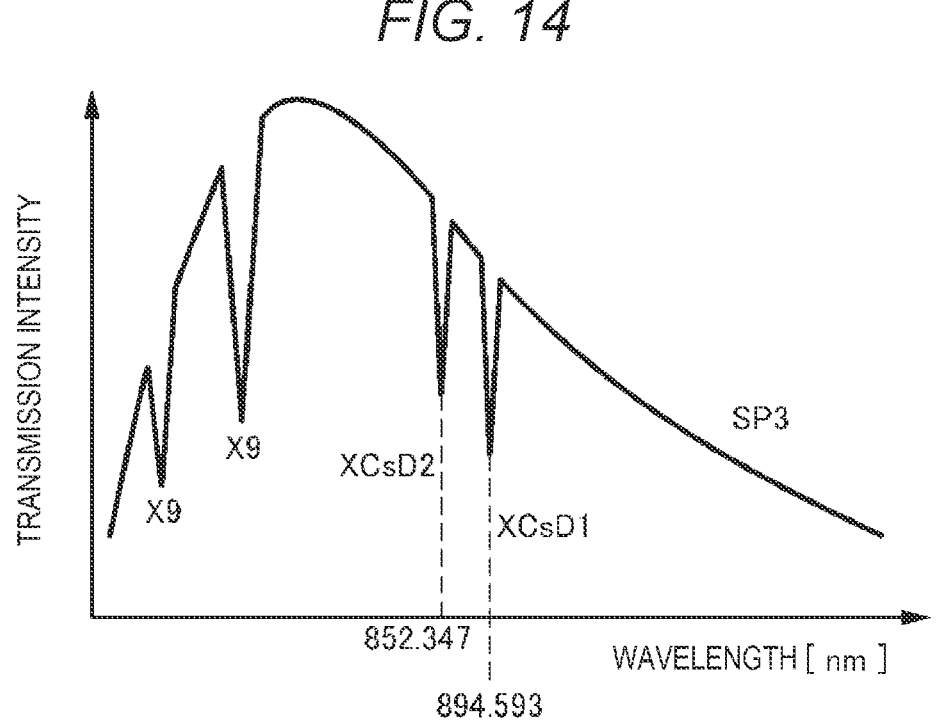
FIG. 14 is an example of a spectral pattern SP3 obtained by the spectroscopic device shown in FIG. 13.

FIG. 14 is an example of a spectral pattern SP3 obtained by the spectroscopic device 100 shown in FIG. 13.

The spectral pattern SP3 shown in FIG. 14 also includes the absorption peaks X9 derived from the sample 9 and the absorption peaks XCsD1 and XCsD2 derived from the cesium atoms.

In the analysis optical system 3 shown in FIG. 13, the analysis light L1 emitted from the beam splitter 54 reciprocates through the gas cell 6 and the sample 9 and is returned to the beam splitter 54. Therefore, the absorption peaks X9 and the absorption peaks XCsD1 and XCsD2 shown in FIG. 14 have intensities higher than those in the spectral pattern SP2 shown in FIG. 12. Accordingly, the S/N ratio of the absorption peaks XCsD1 and XCsD2 can be increased.

In the second modification described above, effects the same as those of the first embodiment can also be obtained.

4. Second Embodiment

Next, an optical device and a spectroscopic device according to a second embodiment will be described.

Figure 15:
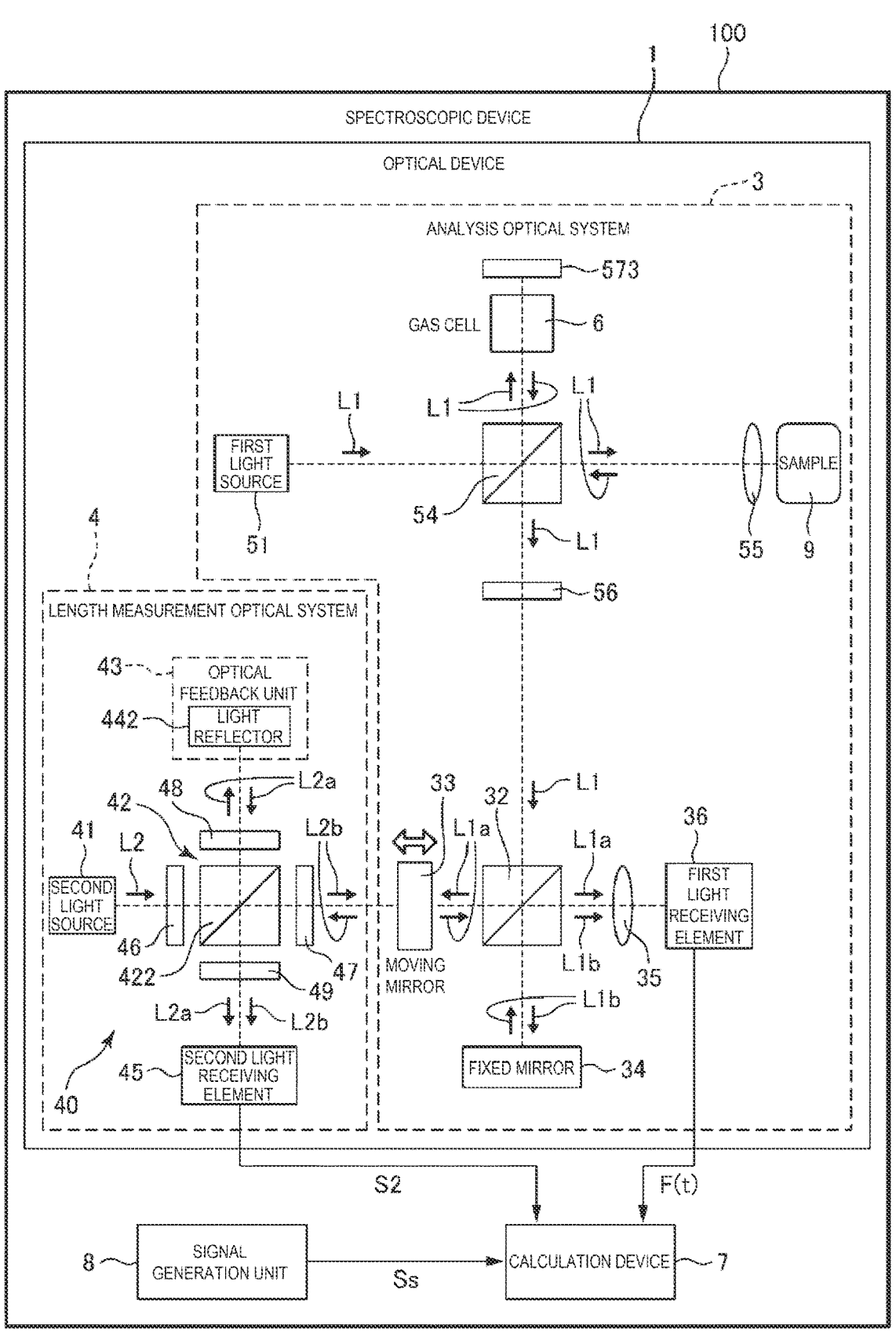
FIG. 15 is a schematic configuration diagram showing a spectroscopic device according to a second embodiment.

FIG. 15 is a schematic configuration diagram showing the spectroscopic device 100 according to the second embodiment.

The spectroscopic device 100 shown in FIG. 15 is the same as the spectroscopic device 100 shown in FIG. 1 except that a configuration of the analysis optical system 3 of the optical device 1 is different.

The analysis optical system 3 shown in FIG. 15 includes a mirror 573. In the analysis optical system 3 shown in FIG. 15, the gas cell 6 and the mirror 573 are disposed in a direction in which the analysis light L1 emitted from the first light source 51 is reflected by the beam splitter 54. The analysis light L1 emitted from the beam splitter 54 is transmitted through the gas cell 6 and reflected by the mirror 573. The analysis light L1 reflected by the mirror 573 is transmitted through the gas cell 6 again and returned to the beam splitter 54. Therefore, in the beam splitter 54, the analysis light L1 reflected by the sample 9 and the analysis light L1 passing through the gas cell 6 are mixed and emitted toward the neutral density filter 56.

In the second embodiment described above, effects the same as those of the first embodiment can also be obtained.

In the first embodiment described above, a part of the analysis light L1 is lost by the beam splitter 54, whereas in the second embodiment, the loss can be utilized. Therefore, light utilization efficiency of the analysis optical system 3 can be enhanced. As a result, a decrease in the intensity of the analysis light L1 can be prevented, and the S/N ratio can be increased.

Further, in the second embodiment, since the analysis light L1 reciprocates through the gas cell 6, the intensity of the absorption peak based on the gas cell 6 can be increased as compared with a case in which the analysis light L1 does not reciprocate.

5. First Modification of Second Embodiment

Next, an optical device and a spectroscopic device according to a first modification of the second embodiment will be described.

Figure 16:
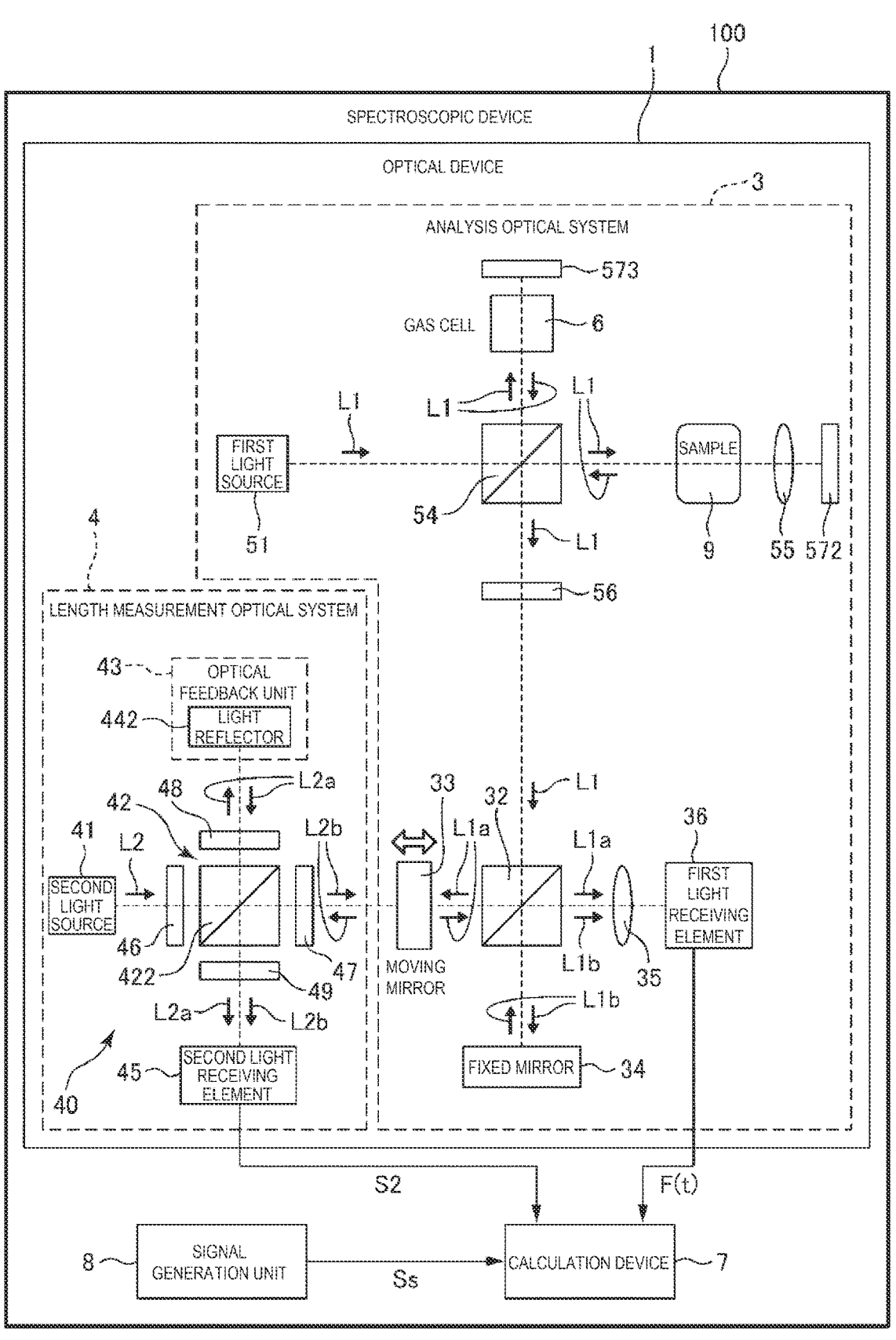
FIG. 16 is a schematic configuration diagram showing a spectroscopic device according to a first modification of the second embodiment.

FIG. 16 is a schematic configuration diagram showing the spectroscopic device 100 according to the first modification of the second embodiment. The spectroscopic device 100 shown in FIG. 16 is the same as the spectroscopic device 100 shown in FIG. 15 except that a configuration of the analysis optical system 3 of the optical device 1 is different.

The analysis optical system 3 shown in FIG. 16 includes the mirror 572 provided on an opposite side of the condensing lens 55 from the sample 9. The mirror 572 reflects the analysis light L1 transmitted through the sample 9 and causes the analysis light L1 to be incident on the sample 9 again. Therefore, the spectral pattern obtained in the first modification is a transmission spectrum.

In the first modification described above, effects the same as those of the second embodiment can also be obtained.

In the first modification, since the analysis light L1 reciprocates through the sample 9, the intensity of the absorption peak based on the sample 9 can be increased as compared with the case in which the analysis light L1 does not reciprocate.

6. Third Embodiment

Next, an optical device and a spectroscopic device according to a third embodiment will be described.

Figure 17:
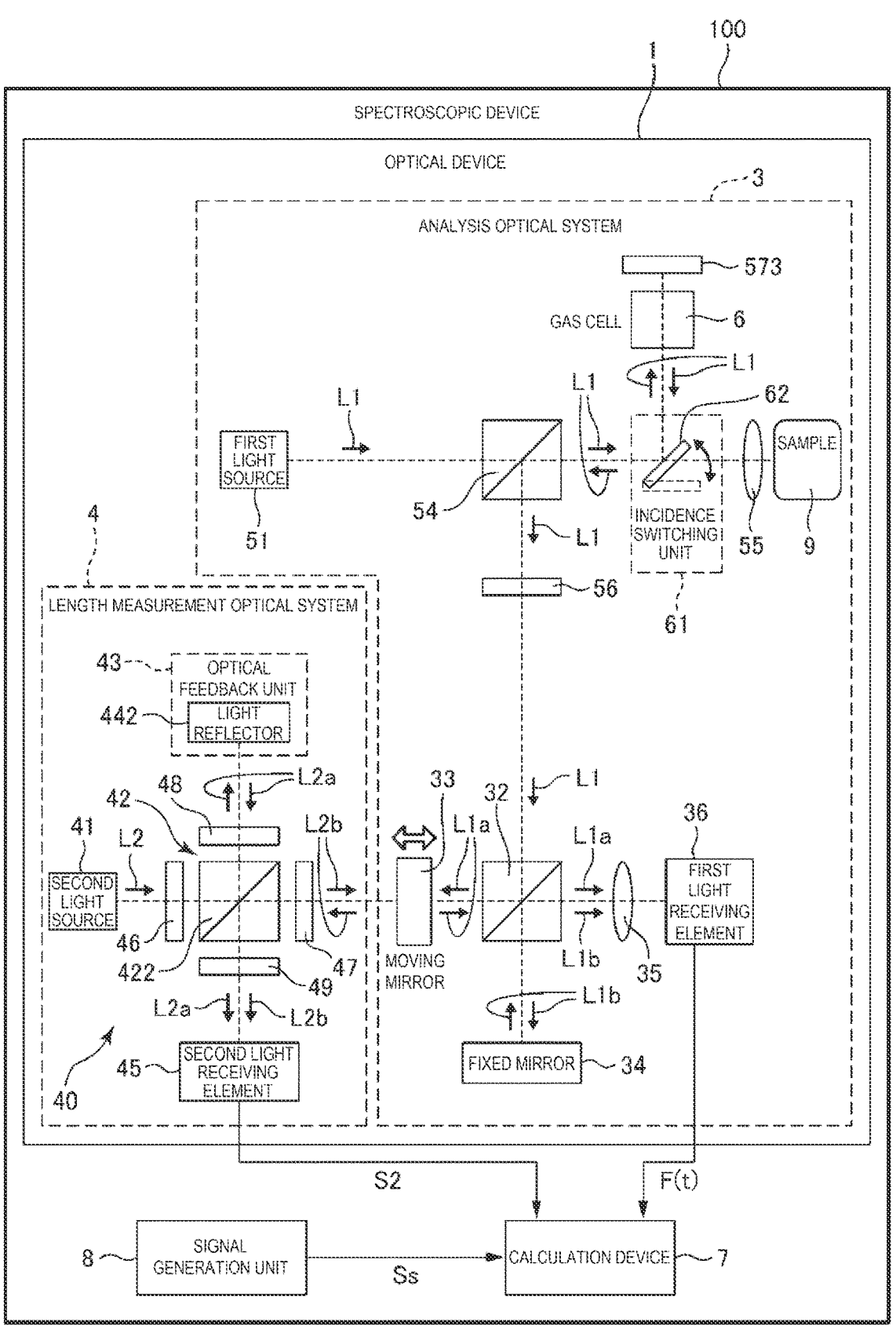
FIG. 17 is a schematic configuration diagram showing a spectroscopic device according to a third embodiment.

FIG. 17 is a schematic configuration diagram showing the spectroscopic device 100 according to the third embodiment.

The spectroscopic device 100 shown in FIG. 17 is the same as the spectroscopic device 100 shown in FIG. 1 except that a configuration of the analysis optical system 3 of the optical device 1 is different.

The analysis optical system 3 shown in FIG. 17 includes an incidence switching unit 61. The incidence switching unit 61 shown in FIG. 17 includes a movable mirror 62. The movable mirror 62 is inserted into an optical path between the beam splitter 54 and the condensing lens 55, and a posture thereof is changed to take an insertion state in which the optical path is changed and a non-insertion state in which the movable mirror 62 is taken out from the optical path.

When the movable mirror 62 is in the insertion state, the movable mirror 62 reflects the analysis light L1 emitted from the beam splitter 54 to change the optical path. The analysis light L1 whose optical path is changed is transmitted through the gas cell 6 and is reflected by the mirror 573. The analysis light L1 reflected by the mirror 573 is transmitted through the gas cell 6 again, then reflected by the movable mirror 62, and returned to the beam splitter 54. Therefore, in this case, since the analysis light L1 is not incident on the sample 9, the spectral pattern includes only the absorption peak based on the gas cell 6.

When the movable mirror 62 is in the non-insertion state, the analysis light L1 emitted from the beam splitter 54 is incident on the sample 9. In this case, since the analysis light L1 is not incident on the gas cell 6, the spectral pattern includes only the absorption peak based on the sample 9.

By providing the incidence switching unit 61 operating as described above, it is possible to correct the wavenumber axis (wavelength axis) using the gas cell 6 at a necessary timing. Meanwhile, when performing the spectroscopy on the sample 9, it is possible to avoid slight loss caused by irradiating the gas cell 6 with the analysis light L1.

In the third embodiment described above, effects the same as those of the first embodiment can also be obtained.

7. First Modification of Third Embodiment

Next, an optical device, a spectroscopic device, and a spectroscopic method according to a first modification of the third embodiment will be described.

Figure 18:
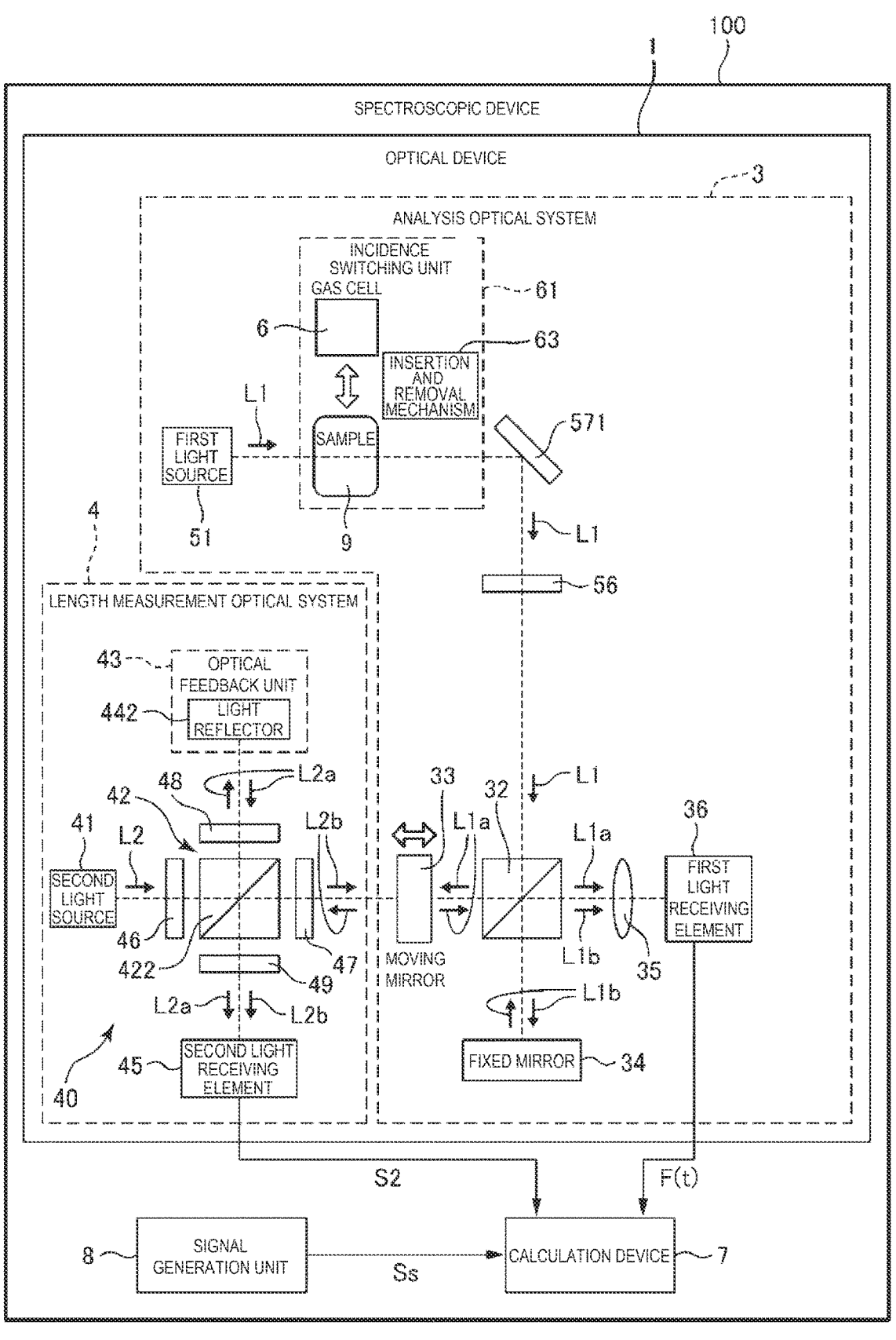
FIG. 18 is a schematic configuration diagram showing a spectroscopic device according to a first modification of the third embodiment.

FIG. 18 is a schematic configuration diagram showing the spectroscopic device 100 according to the first modification of the third embodiment. The spectroscopic device 100 shown in FIG. 18 is the same as the spectroscopic device 100 shown in FIG. 11 except that a configuration of the analysis optical system 3 of the optical device 1 is different.

The analysis optical system 3 shown in FIG. 18 includes the incidence switching unit 61. The incidence switching unit 61 shown in FIG. 18 includes an insertion and removal mechanism 63. The insertion and removal mechanism 63 switches between a gas cell insertion state in which the gas cell 6 is inserted into the optical path of the analysis light L1 and a sample insertion state in which the sample 9 is inserted into the optical path of the analysis light L1. That is, the insertion and removal mechanism 63 inserts and removes the gas cell 6 and the sample 9 with respect to the optical path.

By providing the incidence switching unit 61 operating as described above, it is possible to correct the wavenumber axis (wavelength axis) using the gas cell 6 at a necessary timing. Meanwhile, when performing the spectroscopy on the sample 9, it is possible to avoid slight loss caused by irradiating the gas cell 6 with the analysis light L1.

In the first modification described above, effects the same as those of the third embodiment can also be obtained.

The insertion and removal mechanism 63 may be omitted. In this case, an operator may manually perform an exchange operation of the gas cell 6 and the sample 9. A spectroscopic method according to the first modification of the third embodiment including such an operation is as follows.

Figure 19:
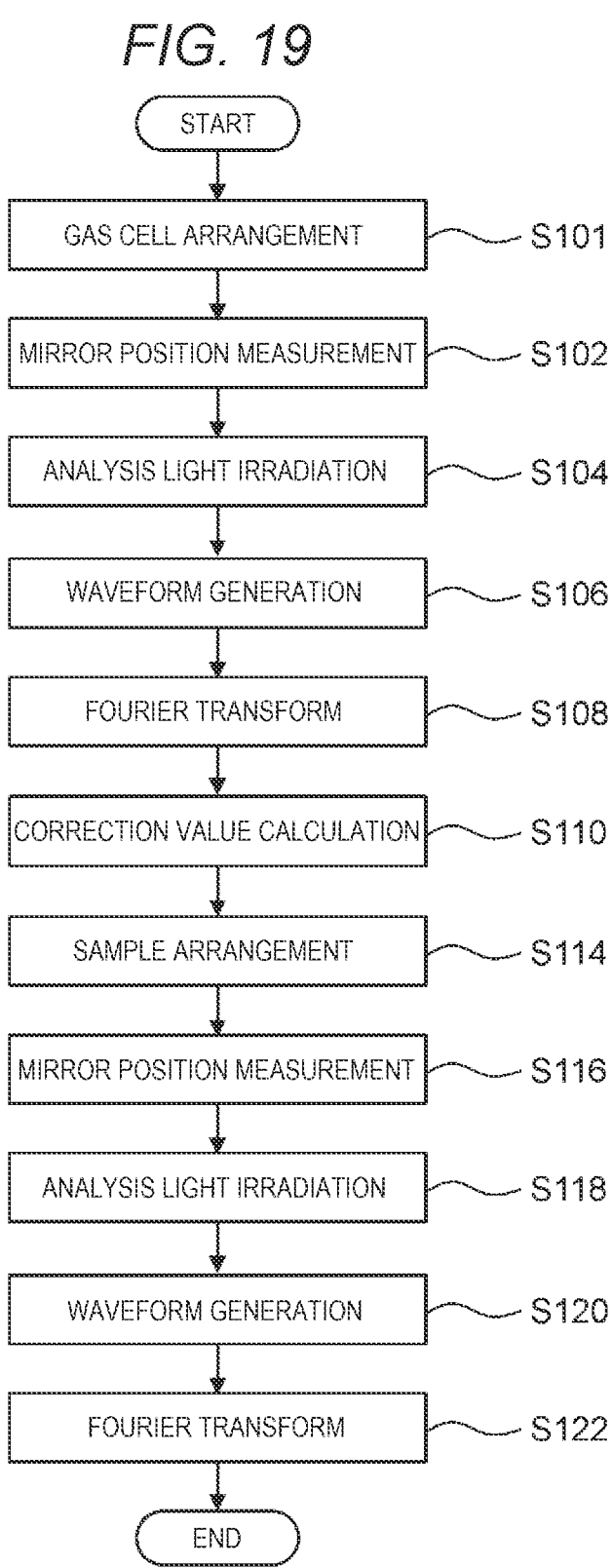
FIG. 19 is a flowchart showing a spectroscopic method according to the first modification of the third embodiment.

FIG. 19 is a flowchart showing the spectroscopic method according to the first modification of the third embodiment.

In the spectroscopic method shown in FIG. 10, both the gas cell 6 and the sample 9 are simultaneously irradiated with the analysis light L1. In contrast, in the spectroscopic method shown in FIG. 19, the emission of the analysis light L1 to the gas cell 6 and the emission of the analysis light L1 to the sample 9 are mutually exclusively performed. Hereinafter, only differences from the spectroscopic method shown in FIG. 10 will be described. Therefore, matters the same as those of the spectroscopic method shown in FIG. 10 will not be described.

The spectroscopic method shown in FIG. 19 includes a gas cell arrangement step S101, the mirror position measurement step S102, the analysis light irradiation step S104, the waveform generation step S106, the Fourier transform step S108, the correction value calculation step S110, a sample arrangement step S114, a mirror position measurement step S116, an analysis light irradiation step S118, a waveform generation step S120, and a Fourier transform step S122.

In the gas cell arrangement step S101, the gas cell 6 is disposed on the optical path of the analysis light L1, for example, manually by the operator or by operating the above-described incidence switching unit 61.

In the mirror position measurement step S102, the length measurement light L2 (laser light) is made incident on the length measurement unit 40 of the optical device 1, and measurement of the position of the moving mirror 33 is started. Accordingly, acquisition of a displacement signal corresponding to the position of the moving mirror 33 is started.

In the analysis light irradiation step S104, the analysis light L1 is incident on the gas cell 6 while changing the position of the moving mirror 33. Further, the analysis light L1 emitted from the gas cell 6 is received by the first light receiving element 36, and the first light receiving signal F(t) is output.

In the waveform generation step S106, the moving mirror position signal X(t) is generated based on the displacement signal corresponding to the position of the moving mirror 33. Further, the interferogram F(x) derived from the gas cell 6 is generated based on the first light receiving signal F(t) derived from the gas cell 6 and the moving mirror position signal X(t) when the gas cell 6 is disposed.

In the Fourier transform step S108, Fourier transform is performed on the interferogram F(x) derived from the gas cell 6 to generate a spectral pattern including the absorption peak XCsD1 (the peak based on the light absorption signal).

In the correction value calculation step S110, a correction value for correcting the measurement value of the position of the moving mirror 33 is calculated based on the difference between the wavelength of the absorption peak XCsD1 (light absorption signal) and the fundamental wavelength of the gas cell 6.

In the sample arrangement step S114, the sample 9 is disposed on the optical path of the analysis light L1, for example, manually by the operator or by operating the above-described incidence switching unit 61.

In the mirror position measurement step S116, the length measurement light L2 (laser light) is made incident on the length measurement unit 40 of the optical device 1, and measurement of the position of the moving mirror 33 is started. Accordingly, acquisition of a displacement signal corresponding to the position of the moving mirror 33 is started.

In the analysis light irradiation step S118, the analysis light L1 is incident on the sample 9 while changing the position of the moving mirror 33. Further, the analysis light L1 emitted from the sample 9 is received by the first light receiving element 36, and the first light receiving signal F(t) is output.

In the waveform generation step S120, the moving mirror position signal X(t) is generated based on the displacement signal corresponding to the position of the moving mirror 33. Further, the interferogram F(x) derived from the sample 9 is generated based on the first light receiving signal F(t) derived from the sample 9, the moving mirror position signal X (t) when the sample 9 is disposed, and the calculated correction value.

In the Fourier transform step S122, Fourier transform is performed on the interferogram F(x) derived from the sample 9 to obtain a spectral pattern including the absorption peak X9 (sample-derived signal).

According to the spectroscopic method described above, even when wavelength stability of the length measurement light L2 emitted from the second light source 41 is low, a spectral pattern including the highly accurate absorption peak X9 can be obtained by correction. In addition, even when a small and inexpensive element such as a semiconductor laser element is adopted as the second light source 41, it is not necessary to provide additional equipment such as a light source thermostatic system. Accordingly, it is possible to reduce a size, a weight, power consumption, and cost of the optical device 1.

In addition, a correction value necessary for correcting the wavenumber axis (wavelength axis) can be obtained at a necessary timing. Meanwhile, when performing the spectroscopy on the sample 9, it is possible to avoid slight loss caused by irradiating the gas cell 6 with the analysis light L1.

8. Fourth Embodiment

Next, an optical device and a spectroscopic device according to a fourth embodiment will be described.

Figure 20:
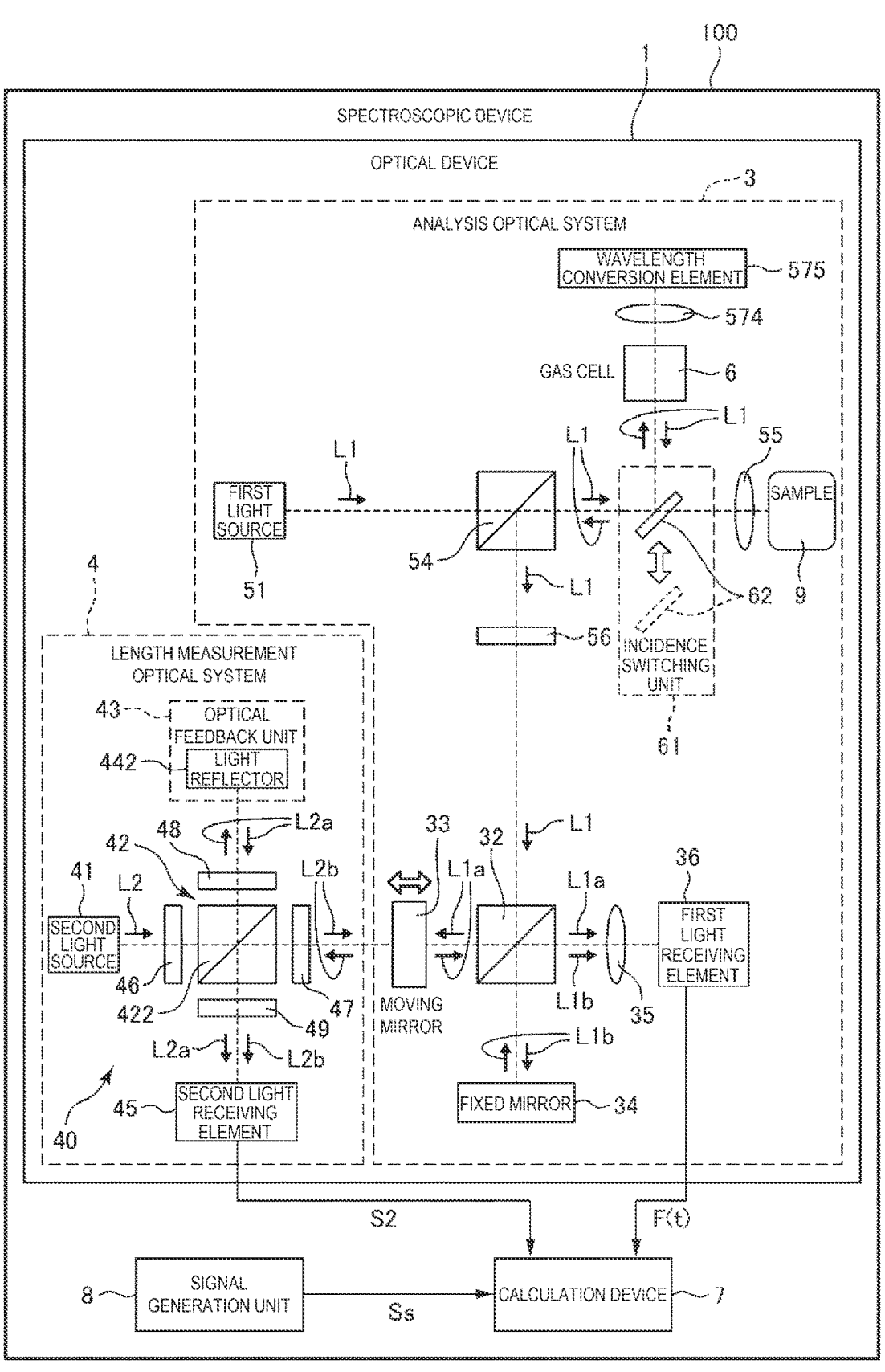
FIG. 20 is a schematic configuration diagram showing a spectroscopic device according to a fourth embodiment.

FIG. 20 is a schematic configuration diagram showing the spectroscopic device 100 according to the fourth embodiment.

The spectroscopic device 100 shown in FIG. 20 is the same as the spectroscopic device 100 shown in FIG. 1 except that a configuration of the analysis optical system 3 of the optical device 1 is different.

The analysis optical system 3 shown in FIG. 20 includes the incidence switching unit 61, a condensing lens 574, and a wavelength conversion element 575. The incidence switching unit 61 shown in FIG. 20 includes the movable mirror 62. The movable mirror 62 shown in FIG. 20 is inserted into an optical path between the beam splitter 54 and the condensing lens 55, and a position thereof is changed to take an insertion state in which the optical path is changed and a non-insertion state in which the movable mirror 62 is taken out from the optical path.

When the movable mirror 62 is in the insertion state, the movable mirror 62 reflects the analysis light L1 emitted from the beam splitter 54 to change the optical path. The analysis light L1 whose optical path is changed is transmitted through the gas cell 6 and the condensing lens 574, and is reflected by the wavelength conversion element 575. The analysis light L1 reflected by the wavelength conversion element 575 is transmitted through the condensing lens 574 and the gas cell 6 again, then reflected by the movable mirror 62, and returned to the beam splitter 54. Therefore, in this case, since the analysis light L1 is not incident on the sample 9, the spectral pattern includes only the absorption peak based on the gas cell 6. The wavelength conversion element 575 converts the wavelength of the analysis light L1 emitted therefrom with respect to the analysis light L1 incident thereon.

Examples of the wavelength conversion element 575 include phosphors. For example, the phosphor is excited by light having a wavelength of 405 nm and emits fluorescence having a wavelength of 450 nm to 650 nm. Therefore, even when narrow band light such as laser light is incident on the wavelength conversion element 575, wide band light, that is, white light is emitted. Therefore, by using the wavelength conversion element 575, even when a laser light source is used as the first light source 51, it is possible to obtain a spectral pattern including an absorption peak based on the gas cell 6. In this case, a type of the phosphor may be selected according to a wavelength absorbed by the gas cell 6. That is, a wavelength range of the emitted white light may overlap the wavelength absorbed by the gas cell 6. Examples of constituent materials of the phosphor include yttrium aluminum garnet (YAG)-based materials, terbium aluminum garnet (TAG)-based materials, sialon-based materials, and barium orthosilicate (BOS)-based materials.

When the movable mirror 62 is in the non-insertion state, the analysis light L1 emitted from the beam splitter 54 is incident on the sample 9. In this case, since the analysis light L1 is not incident on the gas cell 6, the spectral pattern includes only signals derived from the sample 9.

In the fourth embodiment described above, effects the same as those of the first embodiment can also be obtained.

In the fourth embodiment, a laser light source can be used as the first light source 51. Therefore, the sample 9 is irradiated with the analysis light L1 which is laser light. Therefore, the spectroscopic device 100 according to the fourth embodiment can be applied to, for example, laser excitation spectroscopy such as Fourier-type Raman spectroscopy and Fourier-type fluorescence spectroscopy for the sample 9.

9. First Modification of Fourth Embodiment

Next, an optical device and a spectroscopic device according to a first modification of the fourth embodiment will be described.

Figure 21:
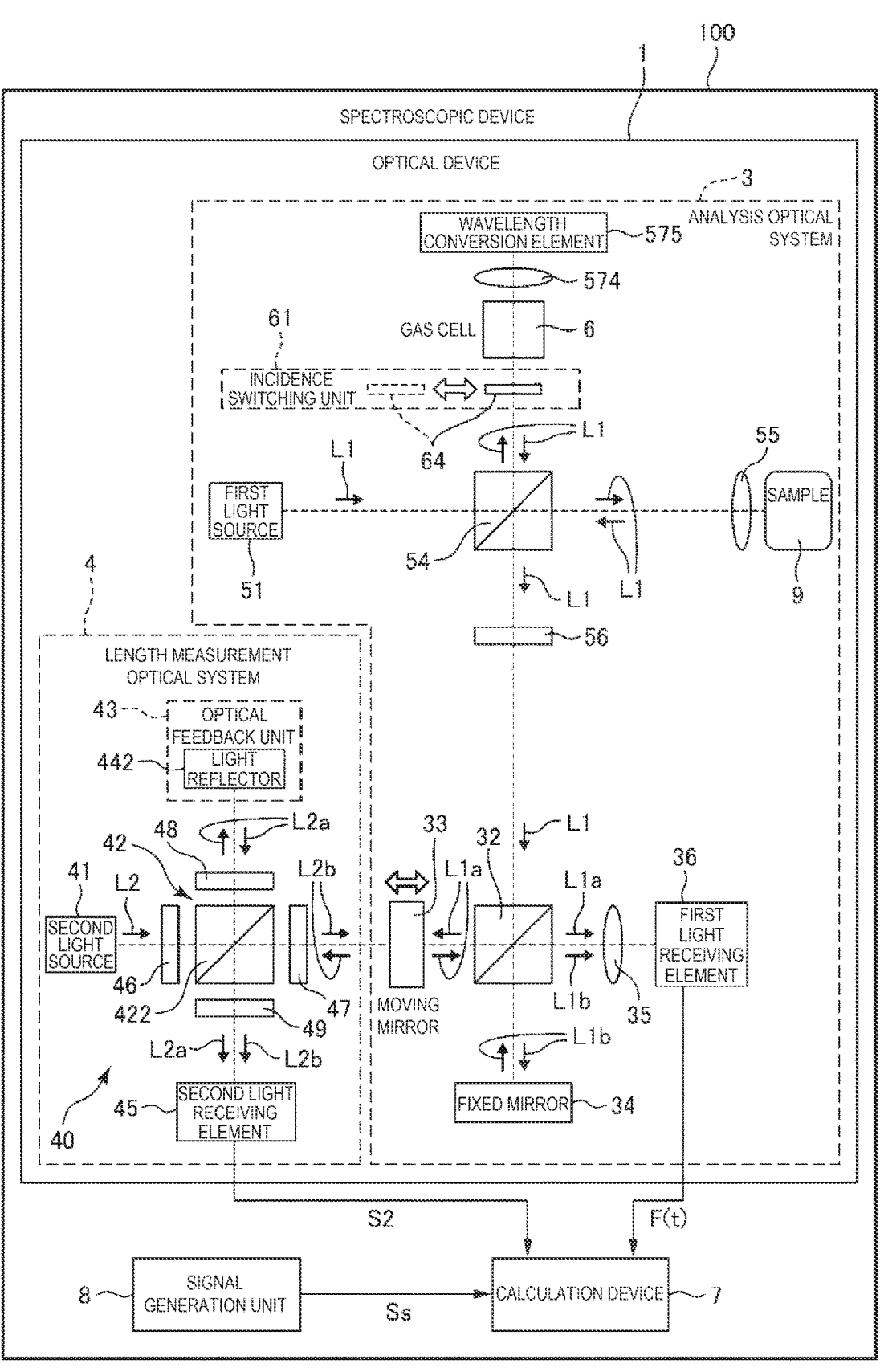
FIG. 21 is a schematic configuration diagram showing a spectroscopic device according to a first modification of the fourth embodiment.

FIG. 21 is a schematic configuration diagram showing the spectroscopic device 100 according to the first modification of the fourth embodiment. The spectroscopic device 100 shown in FIG. 21 is the same as the spectroscopic device 100 shown in FIG. 20 except that a configuration of the analysis optical system 3 of the optical device 1 is different.

The analysis optical system 3 shown in FIG. 21 includes the incidence switching unit 61. The incidence switching unit 61 shown in FIG. 21 includes a light shielding unit 64. A position of the light shielding unit 64 changes to take a shielding state in which the analysis light L1 to be incident on the gas cell 6 is shielded and a non-shielding state in which the analysis light L1 is not shielded.

In the analysis optical system 3 shown in FIG. 21, the gas cell 6, the condensing lens 574, and the wavelength conversion element 575 are disposed in a direction in which the analysis light L1 emitted from the first light source 51 is reflected by the beam splitter 54.

When the light shielding unit 64 is in the non-shielding state, the analysis light L1 reflected by the beam splitter 54 is transmitted through the gas cell 6 and the condensing lens 574, and reflected by the wavelength conversion element 575. The analysis light L1 reflected by the wavelength conversion element 575 is transmitted through the condensing lens 574 and the gas cell 6 again, and then returned to the beam splitter 54. Meanwhile, the analysis light L1 transmitted through the beam splitter 54 and emitted is incident on the sample 9 through the condensing lens 55. The analysis light L1 reflected by the sample 9 is transmitted through the condensing lens 55 again, and then returned to the beam splitter 54. Therefore, in this case, the spectral pattern includes both the absorption peak based on the gas cell 6 and the signals derived from the sample 9.

When the light shielding unit 64 is in the shielding state, the analysis light L1 reflected by the beam splitter 54 is shielded by the light shielding unit 64. Therefore, in this case, the spectral pattern includes only the signals derived from the sample 9.

In the first modification described above, effects the same as those of the fourth embodiment can also be obtained.

In addition, it is possible to obtain a correction value necessary for correcting the wavenumber axis (wavelength axis) at a necessary timing, and in this case, it is possible to simultaneously perform spectroscopy on the sample 9. Therefore, the wavenumber axis can be corrected in real time. Meanwhile, when performing the spectroscopy on the sample 9, by selecting the shielding state, it is possible to avoid the influence and the like caused by irradiating the gas cell 6 with the analysis light L1.

10. Fifth Embodiment

Next, an optical device and a spectroscopic device according to a fifth embodiment will be described.

Figure 22:
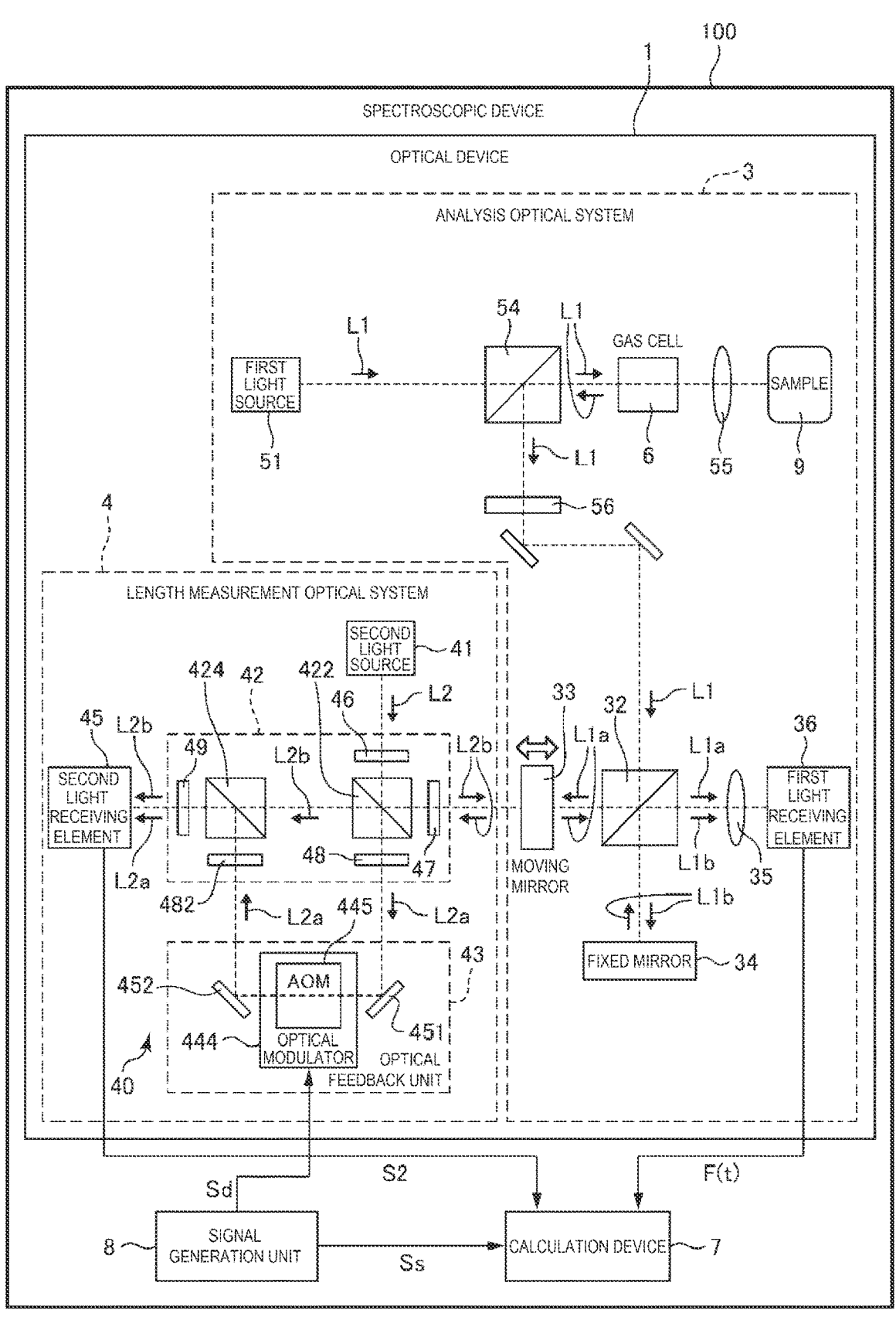
FIG. 22 is a schematic configuration diagram showing a spectroscopic device according to a fifth embodiment.
Figure 23:
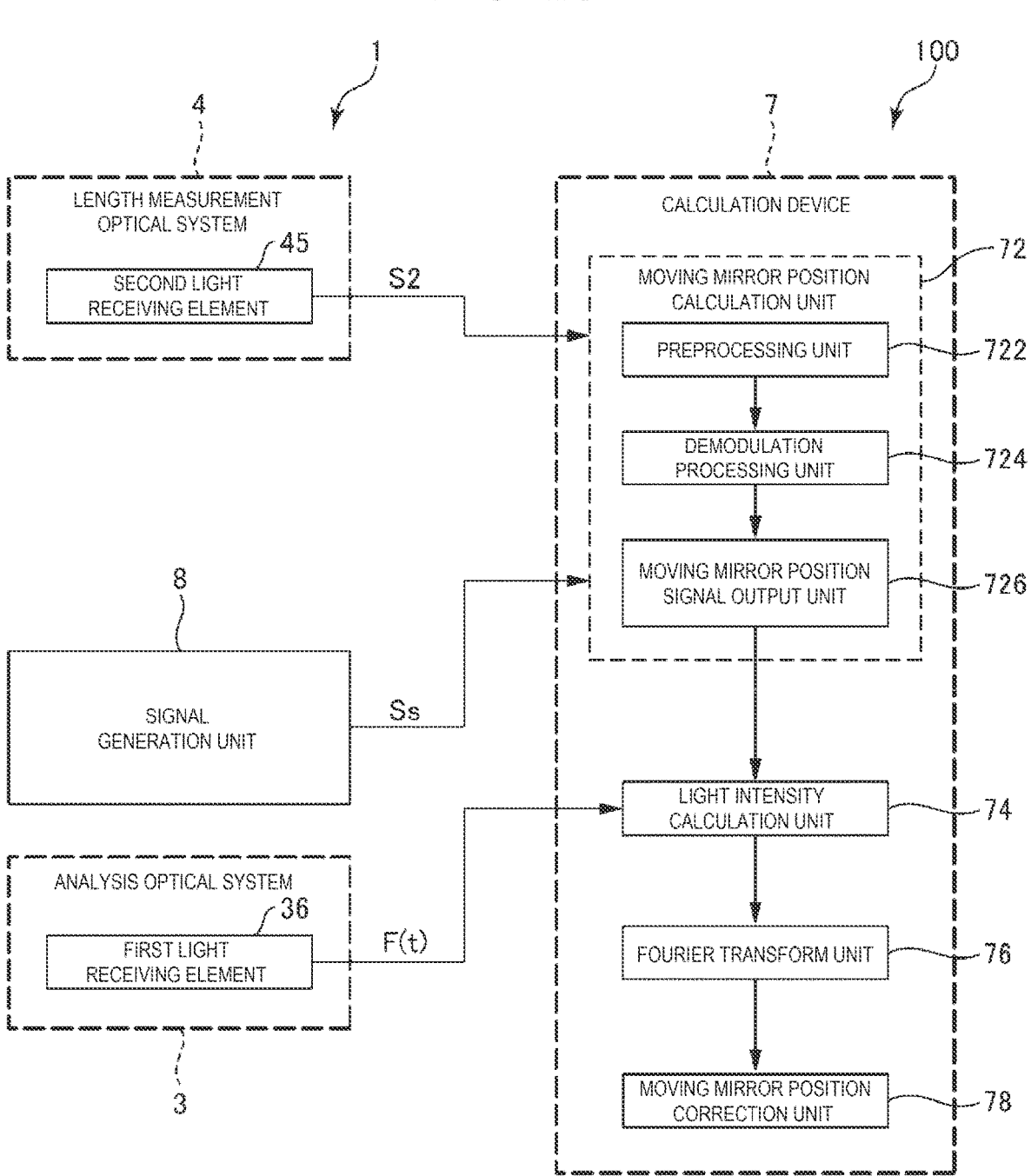
FIG. 23 is a schematic diagram showing main parts of an analysis optical system, a length measurement optical system, a signal generation unit, and a calculation device in FIG. 22.

FIG. 22 is a schematic configuration diagram showing the spectroscopic device 100 according to the fifth embodiment. FIG. 23 is a schematic diagram showing main parts of the analysis optical system 3, the length measurement optical system 4, the signal generation unit 8, and the calculation device 7 in FIG. 22.

Hereinafter, the fifth embodiment will be described. In the following description, differences from the first embodiment will be mainly described, and the description of similar matters will be omitted.

The spectroscopic device 100 shown in FIG. 22 is the same as the spectroscopic device 100 shown in FIG. 1 except that configurations of the optical feedback unit 43 and the second light splitting element 42 provided in the length measurement optical system 4 are different.

The second light splitting element 42 shown in FIG. 22 includes a beam splitter 424 and a ¼ wavelength plate 482 in addition to the configuration in the first embodiment. That is, the second light splitting element 42 shown in FIG. 22 includes two beam splitters 422 and 424. The length measurement light L2a split by the beam splitter 422 passes through the optical feedback unit 43, is returned to the beam splitter 424, is reflected by the beam splitter 424, and is incident on the second light receiving element 45. In addition, the length measurement light L2b split by the beam splitter 422 is reflected by the moving mirror 33, then passes through the beam splitter 422 again, is transmitted through the beam splitter 424, and is incident on the second light receiving element 45.

The optical feedback unit 43 shown in FIG. 22 includes mirrors 451 and 452 and an optical modulator 444. The mirrors 451 and 452 form an optical path connecting the beam splitter 422 and the beam splitter 424. The optical modulator 444 is provided on the optical path.

The optical modulator 444 shown in FIG. 22 includes an acousto-optics modulator (AOM) 445. The acousto-optics modulator 445 causes a periodic refractive index change in a medium due to a photoelastic effect, and shifts a frequency of transmitted light. The acousto-optics modulator 445 can be replaced with an electro-optic modulator (EOM). The optical modulator 444 superimposes a second modulation signal on the length measurement light L2a. The second modulation signal is a change in frequency that occurs when the length measurement light L2a is transmitted through the acousto-optics modulator 445.

The signal generation unit 8 shown in FIG. 22 has a function of generating a drive signal Sd. The acousto-optics modulator 445 is driven by the drive signal Sd. By appropriately setting the drive signal Sd, superimposition of the second modulation signal in the acousto-optics modulator 445 can be controlled.

The moving mirror position calculation unit 72 shown in FIG. 23 identifies the position of the moving mirror 33 based on an optical heterodyne interferometry, and generates the moving mirror position signal X(t) based on a result thereof. Specifically, since the length measurement optical system 4 includes the optical modulator 444, it is possible to add the second modulation signal to the length measurement light L2a. In this way, when the length measurement light L2a and L2b interfere with each other, phase information corresponding to the position of the moving mirror 33 can be obtained with higher accuracy based on the obtained interference light. The position of the moving mirror 33 is determined with high accuracy based on the phase information in the calculation device 7. According to the optical heterodyne interferometry, extraction of the phase information is less susceptible to the influence of disturbances, in particular, the influence of stray light having a frequency that becomes noise, and high robustness is given.

The moving mirror position calculation unit 72 shown in FIG. 23 includes a preprocessing unit 722, a demodulation processing unit 724, and a moving mirror position signal output unit 726. The preprocessing unit 722 and the demodulation processing unit 724 may be, for example, a preprocessing unit and a demodulation unit disclosed in JP-A-2022-38156.

The preprocessing unit 722 performs preprocessing on the second light receiving signal S2 based on the reference signal Ss. The demodulation processing unit 724 demodulates a displacement signal corresponding to the position of the moving mirror 33 based on the reference signal Ss from a preprocessed signal output from the preprocessing unit 722.

The moving mirror position signal output unit 726 generates and outputs the moving mirror position signal X(t) based on the displacement signal of the moving mirror 33 demodulated by the demodulation processing unit 724. The moving mirror position signal X(t) obtained by the method captures the displacement of the moving mirror 33 at an interval sufficiently narrower than a wavelength of the length measurement light L2. For example, when the wavelength of the length measurement light L2 is several hundred of nanometers, a position resolution of the moving mirror 33 indicated by the displacement signal can be less than 10 nm. In contrast, in the first embodiment, ¼ of the wavelength of the length measurement light L2 is a limit of the position resolution. Therefore, the light intensity calculation unit 74 can generate digital data of the interferogram F(x) at shorter intervals as compared with the first embodiment.

Figure 24:
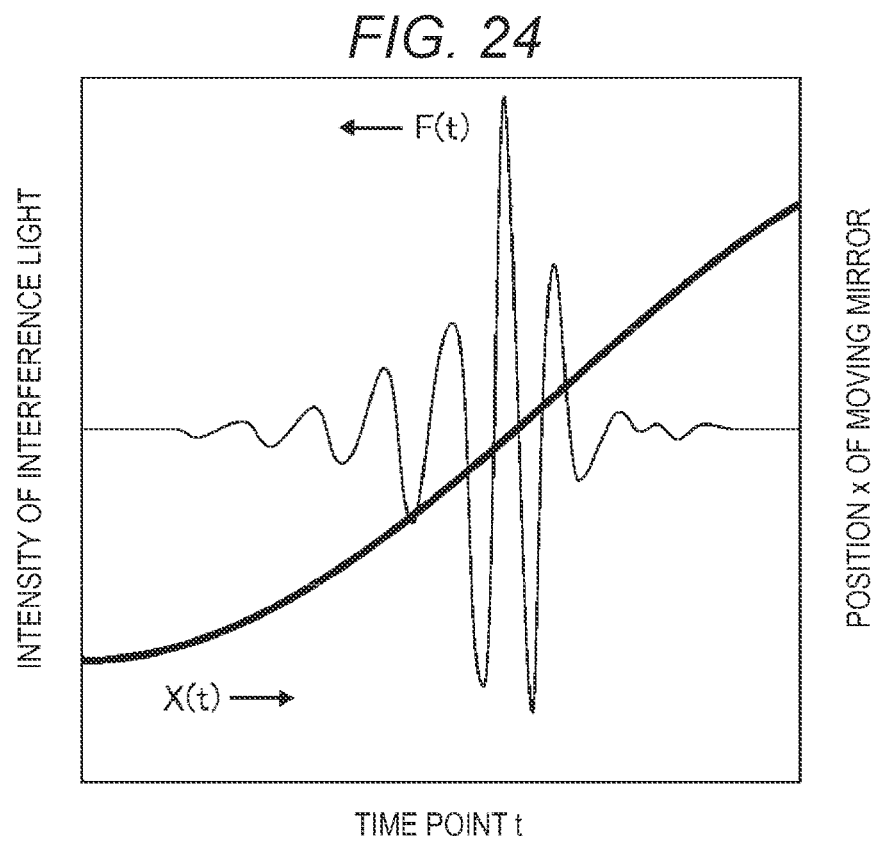
FIG. 24 is a diagram showing an example of a first light receiving signal F(t) and a moving mirror position signal X(t) obtained by the optical device shown in FIG. 22.

FIG. 24 is a diagram showing an example of the first light receiving signal F(t) and the moving mirror position signal X(t) obtained by the optical device 1 shown in FIG. 22. A horizontal axis in FIG. 24 indicates a time point, and a vertical axis indicates the intensity of the interference light incident on the first light receiving element 36 or the position of the moving mirror 33.

The moving mirror position signal X(t) shown in FIG. 24 is a signal in which changes in the position of the moving mirror 33 can be detected continuously, and can implement high position resolution. Therefore, by generating the interferogram F(x) based on the moving mirror position signal X(t), the interferogram F(x) having a larger number of data points is obtained. The number of data points means a short sampling interval of the interferogram F(x) and high accuracy. Therefore, by using the interferogram F(x) thus obtained, a spectral pattern having a high resolution can be finally obtained.

In addition, since the sampling interval can be shortened, the interferogram F(x) having a sufficient number of data points can be obtained even when the analysis light L1 having a shorter wavelength (having a larger wavenumber) is used. Accordingly, it is possible to obtain a spectral pattern in a wider wavelength range (wide wavenumber range), that is, a spectral pattern in a wider band.

In addition, accuracy of the moving mirror position signal X(t) can be further enhanced by making a difference between the physical distance between the beam splitter 422 and the optical modulator 444 in the length measurement optical system 4 and the physical distance between the beam splitter 422 and the moving mirror 33 close to zero.

When the position of the moving mirror 33 is measured by the length measurement optical system 4, a measurement error Δd is represented by the following formula (I).

$$\Delta d = \frac{\lambda \Delta \phi}{4\pi n} + WD\left(\frac{\Delta \lambda}{\lambda} + \frac{\Delta n}{n}\right) \tag{I}$$

λ: wavelength of length measurement light L2*b*

Δφ: phase of displacement signal reflecting movement of moving mirror 33 n: air refractive index

WD: difference between physical distance between beam splitter 422 and optical modulator 444 and physical distance between beam splitter 422 and moving mirror 33

Δλ: fluctuation in wavelength of length measurement light L2*b*

Δn: fluctuation in air refractive index

By making the difference WD of the physical distance close to zero in the above formula (I), a second term and a third term on the right side that can be a noise component in the measurement error Δd can be reduced. Accordingly, since the measurement error Δd is reduced, the accuracy of the moving mirror position signal X(t) can be further enhanced.

Specifically, when the optical path length between the beam splitter 422 and the optical modulator 444 in the length measurement optical system 4 is set as Lref and the optical path length between the beam splitter 422 and the moving mirror 33 is set as Ls, it is preferable that |Ls−Lref|≤100 mm. Accordingly, the difference WD between the physical distances in above the formula (I) can be sufficiently reduced, and the measurement error Δd of the order of 1 nm or less can be achieved.

Further, when a moving distance (amplitude) by which the moving mirror 33 reciprocates is set as Lm, based on the moving distance which is set as Lm, it is preferable that |Ls−Lref|≤Lm/2. Accordingly, it is possible to particularly reduce the measurement error Δd while considering the moving distance Lm of the moving mirror 33.

Considering that |Ls−Lref|≤100 mm as described above, a maximum value of the moving distance Lm of the moving mirror 33 can be considered to be 200 mm. Therefore, the moving distance Lm of the moving mirror 33 is preferably 200 mm or less. Accordingly, it is possible to particularly reduce the measurement error Δd of the moving mirror 33.

Figure 25:
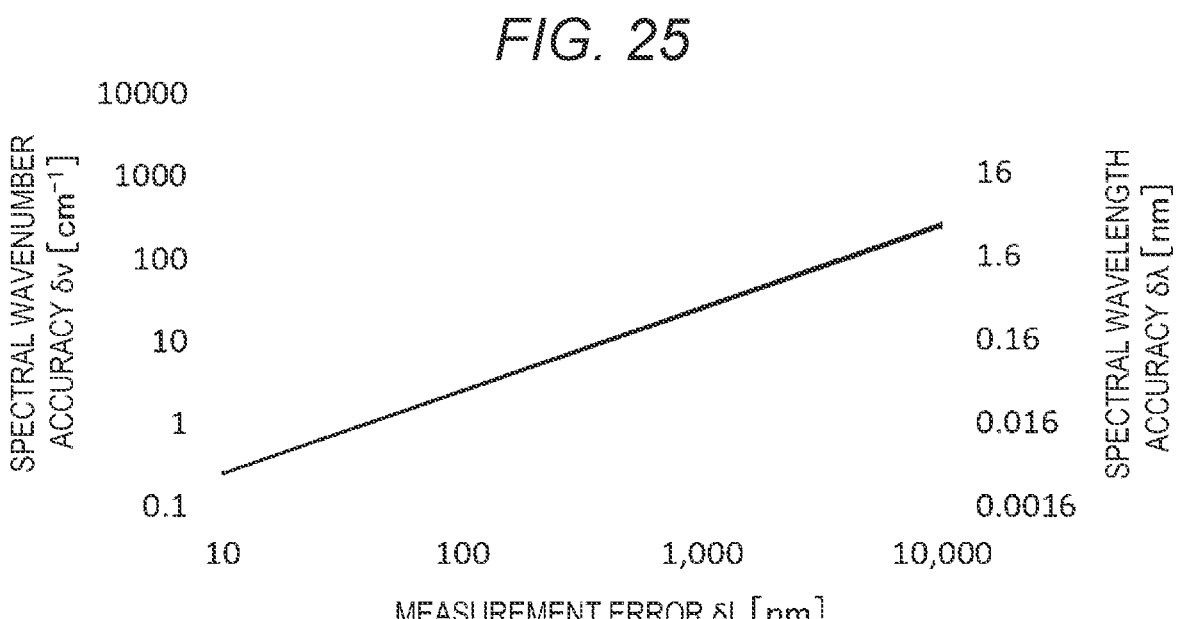
FIG. 25 is a graph showing a relationship between a measurement error in a position of a moving mirror and an error in a spectral wavenumber (spectral wavenumber accuracy) and an error in a spectral wavelength (spectral wavelength accuracy) in a spectral pattern when light (visible light) having a wavelength of 400 nm is used as analysis light.
Figure 26:
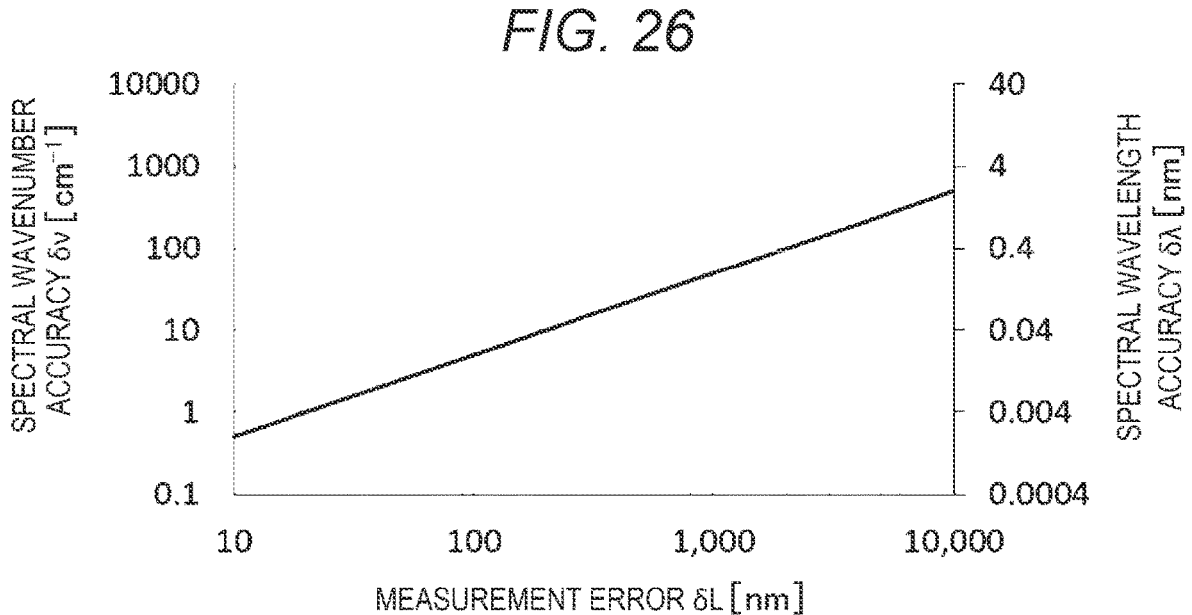
FIG. 26 is a graph showing a relationship between a measurement error in a position of a moving mirror and an error in a spectral wavenumber (spectral wavenumber accuracy) and an error in a spectral wavelength (spectral wavelength accuracy) in a spectral pattern when light (ultraviolet light) having a wavelength of 200 nm is used as the analysis light.

FIG. 25 is a graph showing a relationship between a measurement error δL in a position of the moving mirror 33 and an error in a spectral wavenumber (spectral wavenumber accuracy δν) and an error in a spectral wavelength (spectral wavelength accuracy δλ) in a spectral pattern when light (visible light) with a wavelength of 400 nm is used as the analysis light L1. FIG. 26 is a graph showing a relationship between the measurement error δL in a position of the moving mirror 33 and an error in a spectral wavenumber (spectral wavenumber accuracy δν) and an error in a spectral wavelength (spectral wavelength accuracy δλ) in a spectral pattern when light (ultraviolet light) with a wavelength of 200 nm is used as the analysis light L1. In the examples shown in FIGS. 25 and 26, the moving distance of the moving mirror 33 is set to 1 mm, and the measurement error thereof is set as θL.

In general, a wavenumber resolution Δν can be enhanced by increasing the moving distance of the moving mirror 33. For example, when the moving distance is 1 mm, the wavenumber resolution Δν is 5 cm⁻¹, which is calculated based on the spectral pattern obtained by sampling the interferogram by a method in the related art.

In the examples shown in FIGS. 25 and 26, the relationship between the measurement error δL and spectral wavenumber accuracy δν or spectral wavelength accuracy δλ when the moving distance of the moving mirror 33 is 1 mm is shown. In FIG. 25, for example, when the measurement error δL is set to 100 nm, the spectral wavenumber accuracy δv is about 2.5 cm$^{-1}$, and the spectral wavelength accuracy δλ is about 0.04 nm. In FIG. 26, for example, when the measurement error δL is set to 100 nm, the spectral wavenumber accuracy δv is about 5.0 cm$^{-1}$, and the spectral wavelength accuracy δλ is about 0.02 nm. The measurement error δL of 100 nm can be easily achieved by using the optical device 1 according to the embodiment. Then, based on the results of FIGS. 25 and 26, it can be seen that even when light of a shorter wavelength is used as the analysis light L1, the spectral wavenumber accuracy δv and spectral wavelength accuracy δλ at least equivalent to the wavenumber resolution Δv and a wavelength resolution calculated therefrom can be obtained. Therefore, by reducing the measurement error δL using the optical device 1 according to the embodiment, it is possible to maintain or improve the spectral wavenumber accuracy δv and the spectral wavelength accuracy δλ regardless of the wavelength of the analysis light L1, in other words, even when the analysis light L1 having various wavelengths is used.

Figure 27:
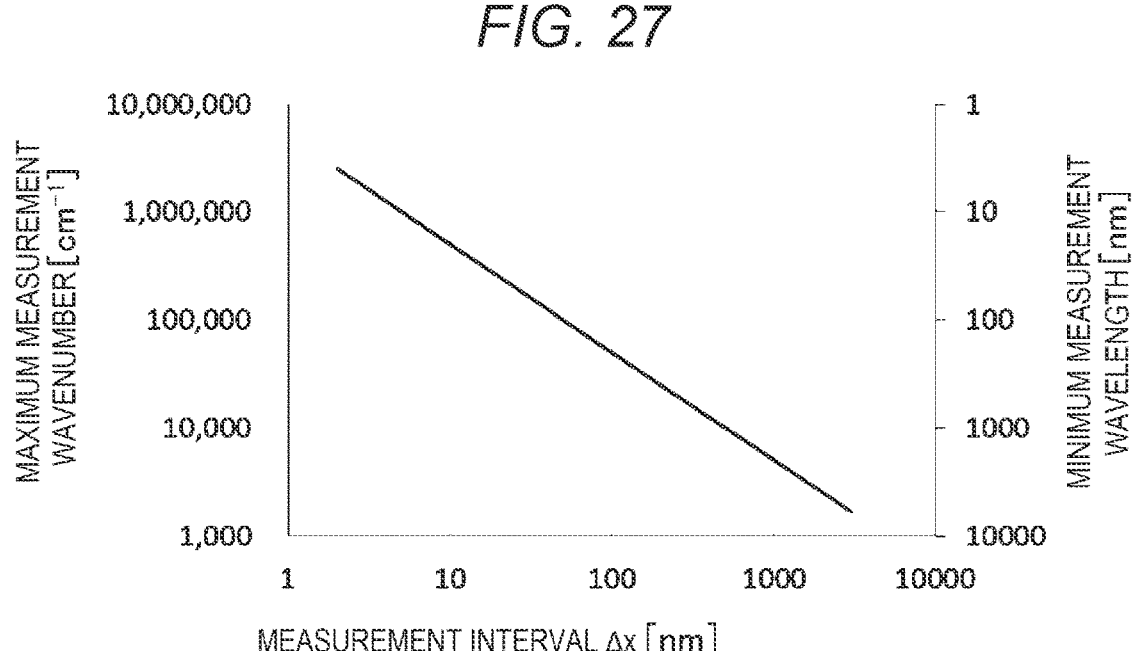
FIG. 27 is a graph showing a relationship between a measurement interval of the position of the moving mirror and a maximum measurement wavenumber and a minimum measurement wavelength in the spectral pattern.

FIG. 27 is a graph showing a relationship between a measurement interval Δx of the position of the moving mirror 33 and a maximum measurement wavenumber and a minimum measurement wavelength in the spectral pattern. As shown in FIG. 27, the smaller the measurement interval Δx, the larger the maximum measurement wavenumber and the shorter the minimum measurement wavelength. Therefore, the by reducing measurement interval Δx, it is possible to obtain a spectral pattern in a wider wavenumber range (wavelength range). In order to implement the stable measurement interval Δx, it is preferable that the measurement error Δd is $\frac{1}{10}$ or less of the measurement interval Δx. In this way, in light of FIG. 27, the above-described measurement error Δd on the order of 1 nm can be said to be measurement accuracy that can implement the measurement interval Δx=10 nm.

In the fifth embodiment as described above, effects the same as those of the first embodiment can also be obtained.

11. First Modification of Fifth Embodiment

Next, an optical device and a spectroscopic device according to a first modification of the fifth embodiment will be described.

Figure 28:
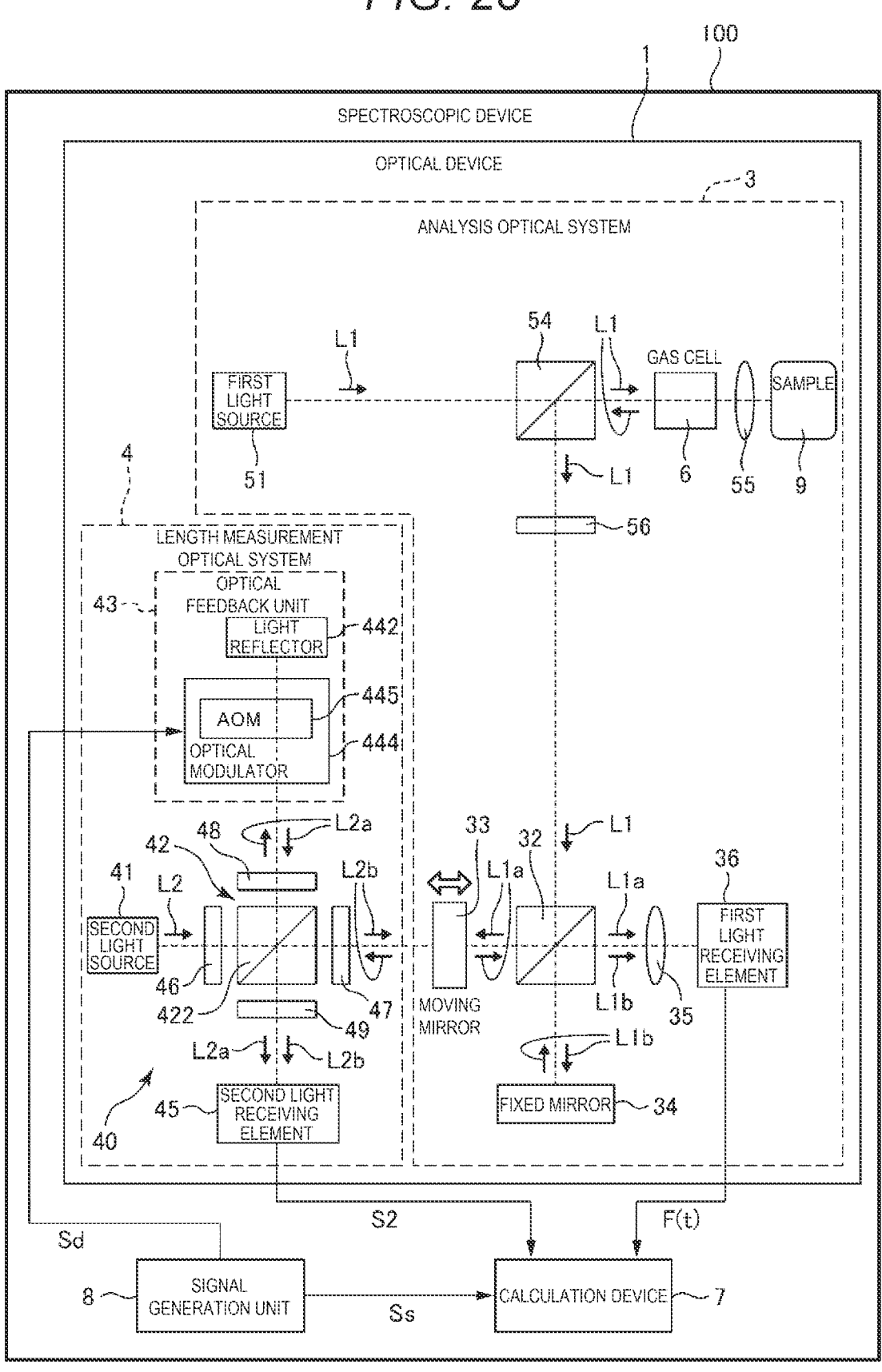
FIG. 28 is a schematic configuration diagram showing a spectroscopic device according to a first modification of the fifth embodiment.

FIG. 28 is a schematic configuration diagram showing the spectroscopic device 100 according to the first modification of the fifth embodiment. The spectroscopic device 100 shown in FIG. 28 is the same as the spectroscopic device 100 shown in FIG. 22 except that a configuration of the analysis optical system 3 of the optical device 1 is different.

The optical feedback unit 43 shown in FIG. 28 includes the light reflector 442 provided on an opposite side of the ¼ wavelength plate 48 from the optical modulator 444. The light reflector 442 reflects the length measurement light L2a transmitted through the optical modulator 444 and causes the length measurement light L2a to be incident on the optical modulator 444 again. Therefore, in the optical modulator 444 shown in FIG. 28, the second modulation signal can be superimposed twice on the length measurement light L2a. Accordingly, a frequency change amount based on the optical modulator 444 can be doubled as compared with that of the fifth embodiment. As a result, even when the moving mirror 33 is moved at a higher speed, the position of the moving mirror 33 can be measured.

In the first modification described above, effects the same as those of the fifth embodiment can also be obtained.

12. Sixth Embodiment

Next, an optical device and a spectroscopic device according to a sixth embodiment will be described.

Figure 29:
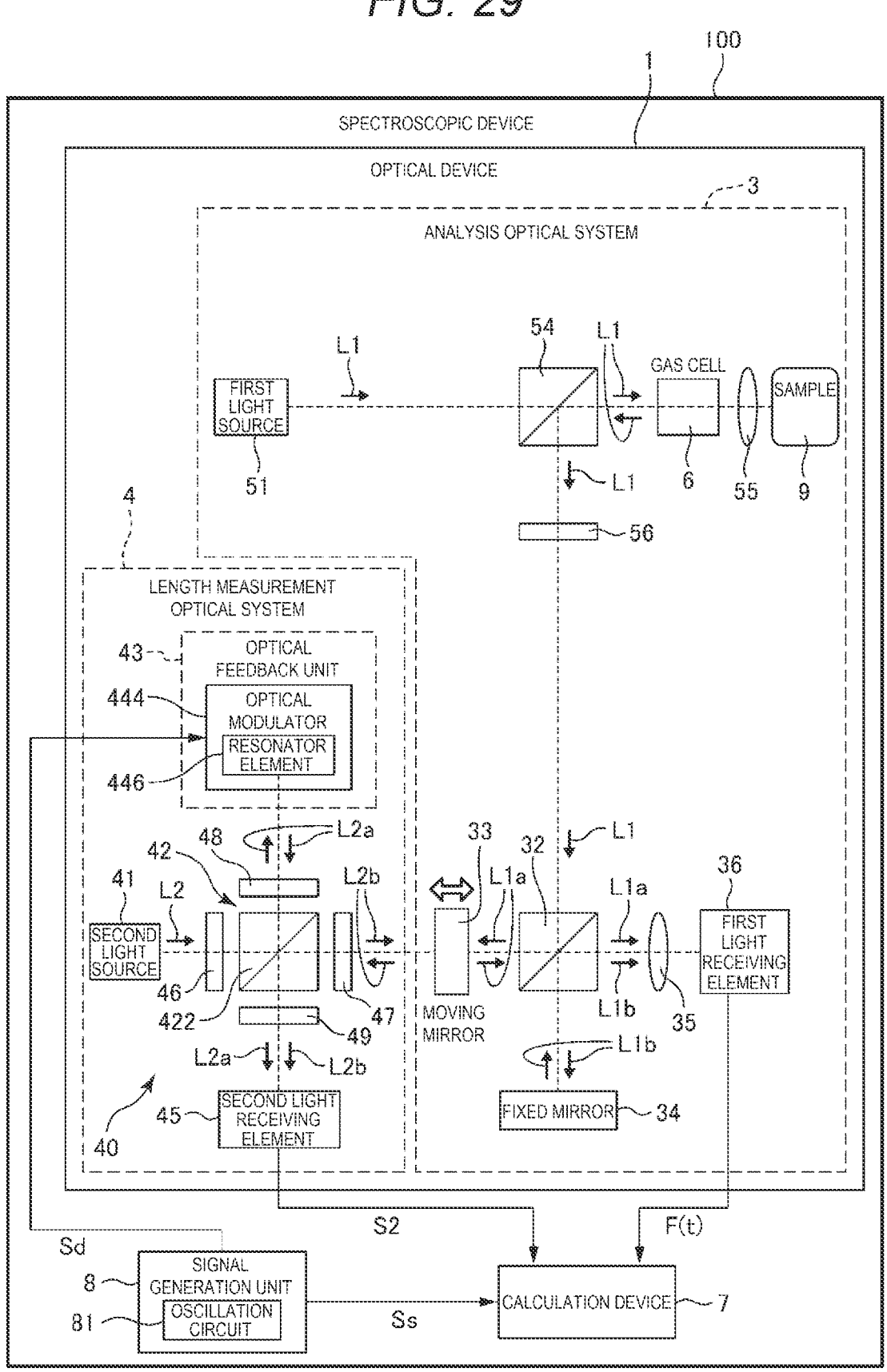
FIG. 29 is a schematic configuration diagram showing a spectroscopic device according to a sixth embodiment.
Figure 30:
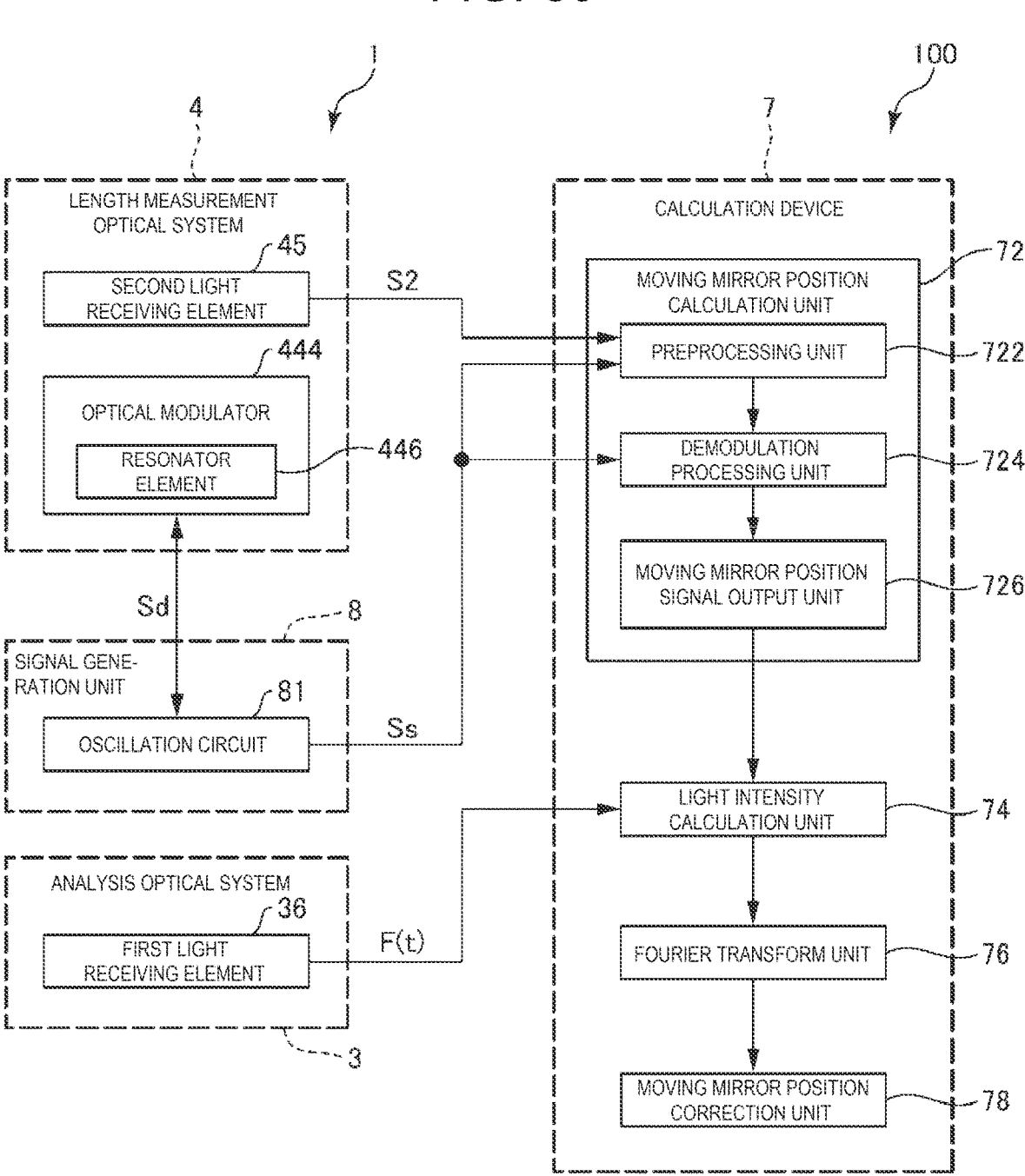
FIG. 30 is a schematic diagram showing main parts of an analysis optical system, a length measurement optical system, a signal generation unit, and a calculation device in FIG. 29.

FIG. 29 is a schematic configuration diagram showing the spectroscopic device 100 according to the sixth embodiment. FIG. 30 is a schematic diagram showing main parts of the analysis optical system 3, the length measurement optical system 4, the signal generation unit 8, and the calculation device 7 in FIG. 29.

Hereinafter, the sixth embodiment will be described. In the following description, differences from the fifth embodiment will be mainly described, and the description of similar matters will be omitted.

The length measurement optical system 4 shown in FIG. 29 is the same as the length measurement optical system 4 shown in FIG. 28 except that the length measurement optical system 4 includes a resonator element 446 instead of the acousto-optics modulator 445 and the configuration of the signal generation unit 8 is different.

The optical modulator 444 shown in FIG. 29 includes the resonator element 446. The resonator element 446 vibrates in response to the drive signal Sd. Examples of the resonator element 446 include a quartz crystal resonator, a silicon resonator, a ceramic resonator, and a piezo element. Among these, the resonator element 446 is preferably a quartz crystal resonator, a silicon resonator, or a ceramic resonator. Unlike other resonators such as piezo elements, these resonators are resonators that utilize a mechanical resonance phenomenon, and therefore have a high Q value and can easily stabilize a natural frequency.

In addition, the optical modulator 444 including the resonator element 446 can be significantly reduced in volume and weight as compared with an optical modulator including an AOM or an EOM. Therefore, it is possible to reduce a size, a weight, and power consumption of the optical device 1.

An example of the optical modulator 444 is an optical modulator disclosed in JP-A-2022-38156. In the publication, the resonator element is, for example, a quartz crystal AT resonator. In addition, as the resonator element 446, an SC-cut quartz crystal resonator, a tuning fork-type quartz crystal resonator, a quartz crystal surface acoustic wave element, or the like may be used.

A silicon resonator is a resonator including a single crystal silicon piece manufactured from a single crystal silicon substrate using a MEMS technique and a piezoelectric film. The MEMS is a micro electro mechanical system. Examples of a shape of the single crystal silicon piece include cantilever beam shapes such as a two-legged tuning fork type and a three-legged tuning fork type, and a fixed beam shape. An oscillation frequency of the silicon resonator is, for example, about 1 kHz to several hundreds of MHz.

A ceramic resonator is a resonator including an electrode and a piezoelectric ceramic piece manufactured by firing a piezoelectric ceramic. Examples of the piezoelectric ceramic include lead zirconate titanate (PZT) and barium titanate (BTO). An oscillation frequency of the ceramic resonator is, for example, about several 1 hundred kHz to several tens of MHz.

The signal generation unit 8 shown in FIGS. 29 and 30 includes an oscillation circuit 81. The oscillation circuit 81 operates with the resonator element 446 as a signal source and generates a periodic signal with high accuracy. In the signal generation unit 8 shown in FIGS. 29 and 30, the periodic signal generated by the oscillation circuit 81 is output as the drive signal Sd and the reference signal Ss. Accordingly, the drive signal Sd and the reference signal Ss are affected in the same way when subjected to a disturbance. Then, the second modulation signal added through the optical modulator 444 driven by the drive signal Sd and the reference signal Ss are also affected in the same way. Therefore, when the second light receiving signal S2 including the second modulation signal and the reference signal Ss are subjected to calculation in the calculation device 7, the influence of disturbances contained in both signals can be canceled out or reduced in the process of calculation. As a result, the calculation device 7 can determine the position of the moving mirror 33 with higher accuracy even when subjected to the disturbance. In addition, it is possible to reduce the size, the weight, and the power consumption of the spectroscopic device 100.

An example of the oscillation circuit 81 is an oscillation circuit disclosed in JP-A-2022-38156.

Figure 31:
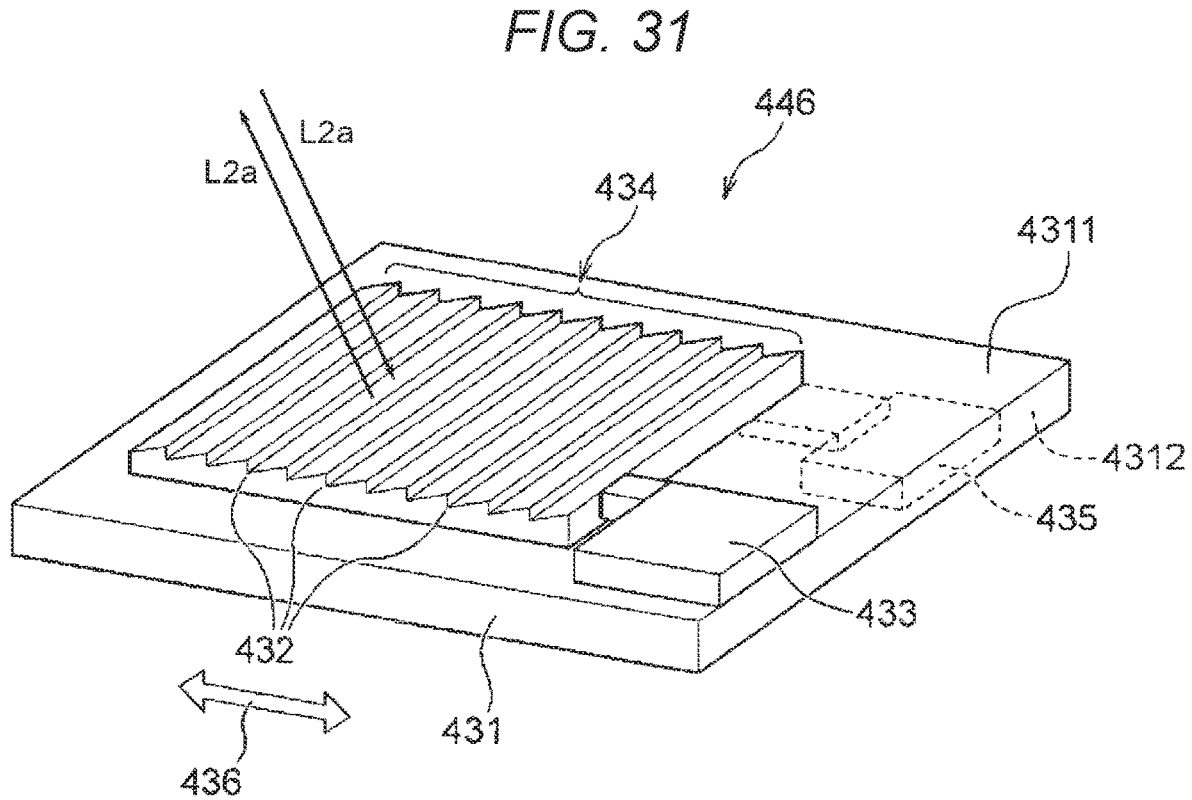
FIG. 31 is a perspective view showing a configuration example of a resonator element shown in FIG. 29.

FIG. 31 is a perspective view showing a configuration example of the resonator element 446 shown in FIG. 29.

The resonator element 446 shown in FIG. 31 includes a plate-shaped resonator element 431 and a diffraction grating 434 provided on the resonator element 431.

The resonator element 431 is made of a material that repeats a resonating mode to be distorted in a direction along a surface when a potential is applied thereto. The resonator element 431 shown in FIG. 31 is a quartz crystal AT resonator that vibrates through thickness shear along a vibration direction 436 in a high frequency range of a MHz band. The diffraction grating 434 is provided on a front surface of the resonator element 431. The diffraction grating 434 includes grooves 432 having a component intersecting the vibration direction 436, that is, a plurality of linear grooves 432 each extending in a direction intersecting the vibration direction 436.

The resonator element 431 has a front surface 4311 and a back surface 4312 which have a front and back relationship with each other. The diffraction grating 434 is disposed on the front surface 4311. In addition, the front surface 4311 is provided with a pad 433 for applying a potential to the resonator element 431. Further, a pad 435 for applying a potential to the resonator element 431 is also provided on the back surface 4312.

A size of the resonator element 431 is, for example, about 0.50 mm or more and 10.0 mm or less. A thickness of the resonator element 431 is, for example, about 0.10 mm or more and 2.0 mm or less. As an example, a shape of the resonator element 431 is a square with one side of 1.6 mm, and a thickness thereof is 0.35 mm.

A size of the diffraction grating 434 is, for example, about 0.20 mm or more and 3.0 mm or less. A thickness of the diffraction grating 434 is, for example, about 0.003 mm or more and 0.50 mm or less.

In the embodiment, although the resonator element 431 vibrates in a thickness-shear manner, since the vibration is an in-plane vibration, as shown as the vibration direction 436 in FIG. 31, even when light is perpendicularly incident to the front surface of the resonator element 431 alone, optical modulation cannot be performed. Therefore, in the resonator element 446, the optical modulation is enabled by providing the diffraction grating 434 in the resonator element 431.

The diffraction grating 434 shown in FIG. 31 is, for example, a blazed diffraction grating. The blazed diffraction grating refers to a grating in which a cross-sectional shape of the diffraction grating is stepped. The shape of the diffraction grating 434 is not limited thereto.

Figure 32:
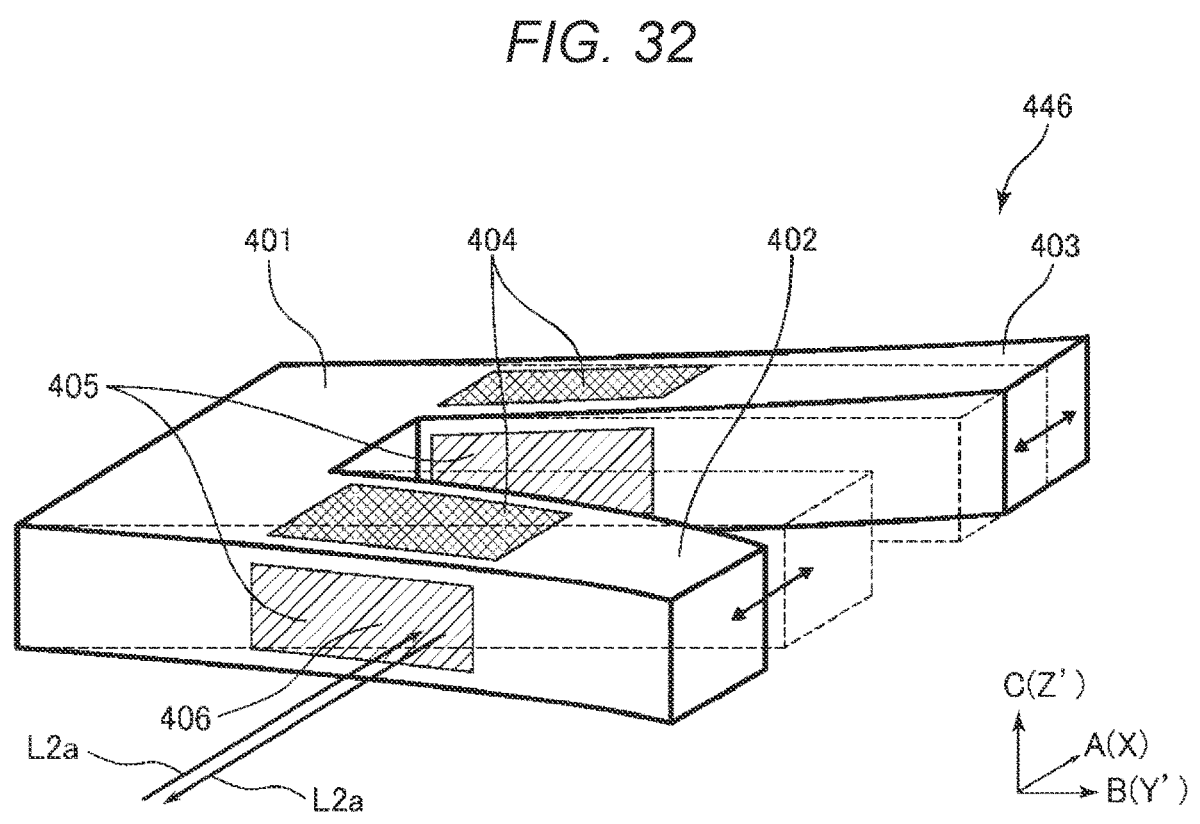

FIG. 32 is a perspective view showing another configuration example of the resonator element 446 shown in FIG. 29. In FIG. 32, an A-axis, a B-axis, and a C-axis are set as three axes orthogonal to one another, and are indicated by arrows. A tip end side of the arrow is defined as "plus", and a base end side of the arrow is defined as "minus". In addition, for example, both plus and minus directions of the A-axis are referred to as an "A-axis direction". The same applies to a B-axis direction and a C-axis direction.

The resonator element 446 shown in FIG. 32 is a tuning fork-type quartz crystal resonator. The resonator element 446 shown in FIG. 32 includes a vibration substrate including a base portion 401 and a first vibrating arm 402 and a second vibrating arm 403. Such a tuning fork-type quartz crystal resonator is easily available because a manufacturing technique is established, and oscillation is also stable. Therefore, the tuning fork-type quartz crystal resonator is suitable as the resonator element 446. The resonator element 446 includes electrodes 404 and 405 and a light reflective surface 406 which are provided on the vibration substrate.

The base portion 401 is a portion extending along the A-axis. The first vibrating arm 402 is a portion extending from an end of the base portion 401 on an A-axis minus side toward a B-axis plus side. The second vibrating arm 403 is a portion extending from a portion of the base portion 401 on an A-axis plus side toward the B-axis plus side.

The electrodes 404 are conductive films provided on side surfaces of the first vibrating arm 402 and the second vibrating arm 403 that are parallel to an A-B plane. Although not shown in FIG. 32, the electrodes 404 are provided on side surfaces facing each other, and the first vibrating arm 402 is driven by applying voltages with different polarities.

The electrodes 405 are conductive films provided on side surfaces of the first vibrating arm 402 and the second vibrating arm 403 that intersect the A-B plane. Although not shown in FIG. 32, the electrodes 405 are provided on side surfaces facing each other, and the second vibrating arm 403 is driven by applying voltages with different polarities.

The light reflective surfaces 406 are set on side surfaces of the first vibrating arm 402 and the second vibrating arm 403 that intersect the A-B plane, and have a function of reflecting the length measurement light L2a. The side surface refers to a surface spreading along the extending direction of the first vibrating arm 402 and the second vibrating arm 403. The light reflective surfaces 406 shown in FIG. 32 are set on side surfaces of the first vibrating arm 402, particularly on surfaces of the electrodes 405. The electrode 405 provided on the first vibrating arm 402 also has a function as the light reflective surface 406. A light reflection film (not shown) may be provided separately from the electrode 405.

In the tuning fork-type quartz crystal resonator, a quartz crystal piece cut out from a quartz crystal substrate is used. Examples of the quartz crystal substrate used for manufacturing the tuning fork-type quartz crystal resonator include a quartz crystal Z-cut flat plate. In FIG. 32, an X-axis parallel to the A-axis, a Y'-axis parallel to the B-axis, and a Z'-axis parallel to the C-axis are set. A quartz crystal Z-cut flat plate is, for example, a substrate cut out from a single crystal of quartz crystal such that the X-axis is an electrical axis, the Y'-axis is a mechanical axis, and the Z'-axis is an optical axis. Specifically, in an orthogonal coordinate system including the X-axis, Y'-axis and Z'-axis, a substrate having a main surface which is obtained by tilting an X-Y' plane including the X-axis and the Y'-axis by about 1° to 5° in a counterclockwise direction around the X-axis is preferably cut out from a single crystal of a quartz crystal and is preferably used as the quartz crystal substrate. By etching such a quartz crystal substrate, a quartz crystal piece used in the resonator element 446 shown in FIG. 32 is obtained. The etching may be wet etching or dry etching.

Further, the light reflective surface 406 may be set on the front surface of the electrode 404. In this case, in order to make the tuning fork-type quartz crystal resonator perform an out-of-plane vibration, a signal to be applied to each electrode may be adjusted to excite spurious waves that performs the out-of-plane vibration, for example.

13. First Modification of Sixth Embodiment

Next, an optical device and a spectroscopic device according to a first modification of the sixth embodiment will be described.

Figure 33:
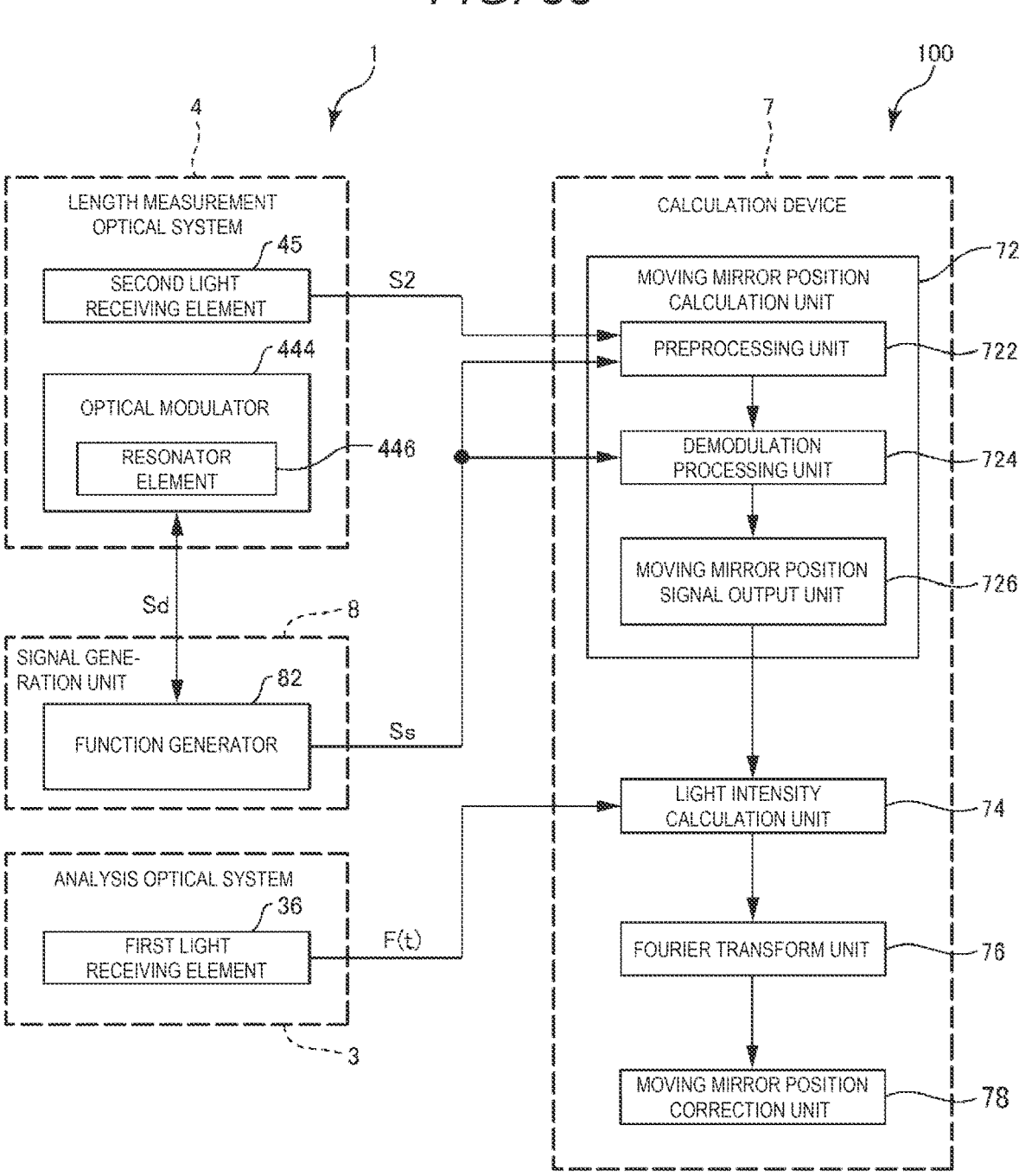
FIG. 33 is a schematic diagram showing main parts of an analysis optical system, a length measurement optical system, a signal generation unit, and a calculation device provided in a spectroscopic device according to a first modification of the sixth embodiment.

FIG. 33 is a schematic diagram showing main parts of the analysis optical system 3, the length measurement optical system 4, the signal generation unit 8, and the calculation device 7 provided in the spectroscopic device 100 according to the first modification of the sixth embodiment.

The spectroscopic device 100 shown in FIG. 33 is the same as the spectroscopic device 100 shown in FIG. 30 except that a configuration of the signal generation unit 8 is different.

The signal generation unit 8 shown in FIG. 33 includes a function generator 82. The function generator 82 is a signal generator that outputs a highly accurate waveform, that is, a signal with high stability and low jitter. Therefore, the signal generation unit 8 shown in FIG. 33 can output the drive signal Sd and the reference signal Ss with higher accuracy, and can finally determine the position of the moving mirror 33 in the calculation device 7 with higher accuracy. The function generator 82 may be a signal generator.

In the first modification described above, effects the same as those of the sixth embodiment can also be obtained.

14. Second Modification of Sixth Embodiment

Next, a spectroscopic device according to a second modification of the sixth embodiment will be described.

Figure 34:
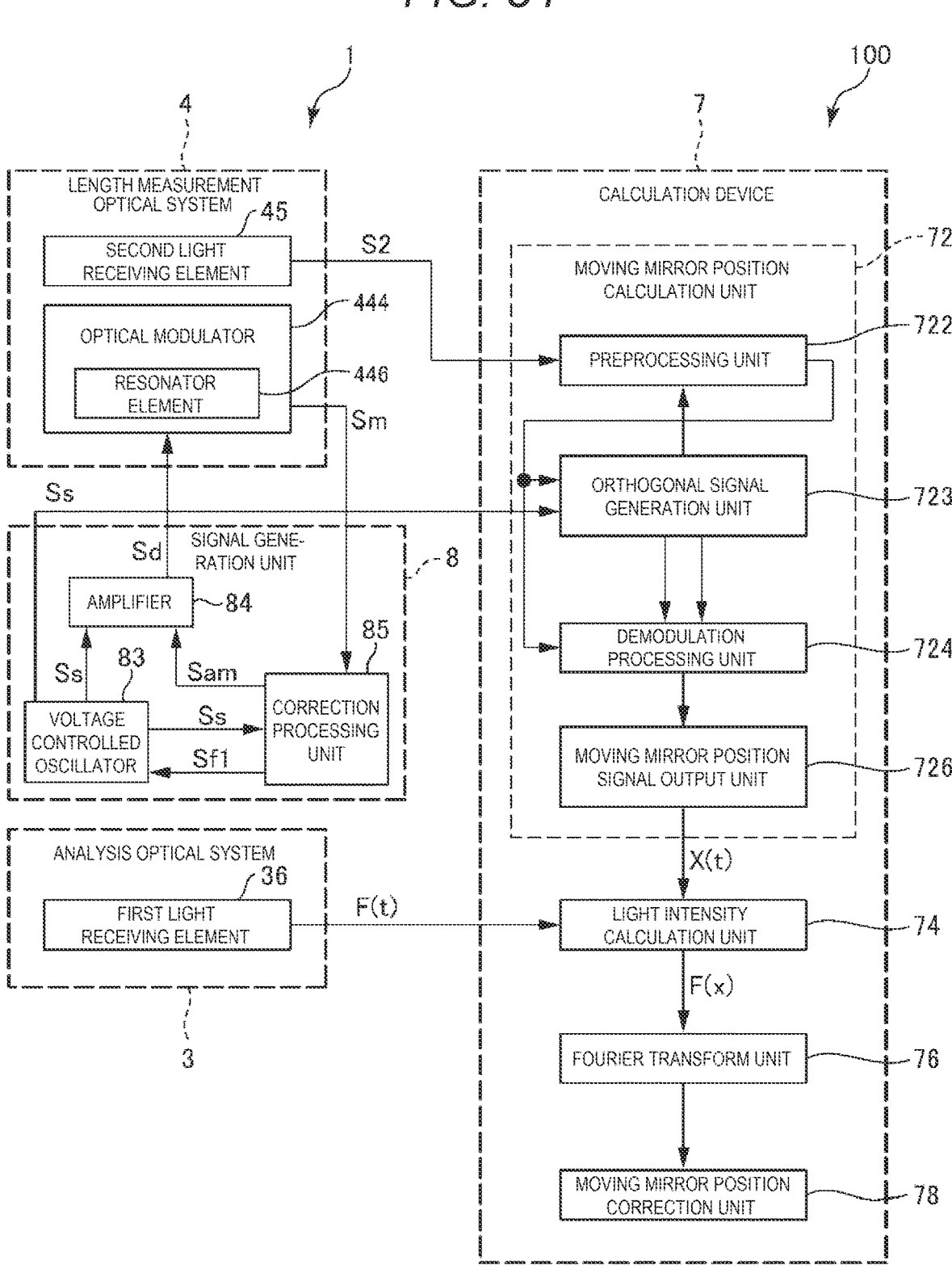
FIG. 34 is a schematic diagram showing main parts of an analysis optical system, a length measurement optical system, a signal generation unit, and a calculation device provided in a spectroscopic device according to a second modification of the sixth embodiment.

FIG. 34 is a schematic diagram showing main parts of the analysis optical system 3, the length measurement optical system 4, the signal generation unit 8, and the calculation device 7 provided in the spectroscopic device 100 according to the second modification of the sixth embodiment.

The spectroscopic device 100 shown in FIG. 34 is the same as the spectroscopic device 100 shown in FIG. 30 except that a configuration of the signal generation unit 8 and a configuration of the calculation device 7 are different.

The signal generation unit 8 shown in FIG. 34 includes a voltage controlled oscillator 83, an amplifier 84, and a correction processing unit 85. The moving mirror position calculation unit 72 shown in FIG. 34 further includes an orthogonal signal generation unit 723.

14.1. Signal Generation Unit

First, the signal generation unit 8 shown in FIG. 34 will be described.

14.1.1. Configuration of Signal Generation Unit

The voltage controlled oscillator 83 is a VCO, and has a function of controlling a frequency of an output periodic signal based on a received voltage signal. Accordingly, the voltage controlled oscillator 83 generates the reference signal Ss of a target frequency and outputs the reference signal Ss to the amplifier 84 and the calculation device 7. The voltage controlled oscillator 83 is not limited to the VCO as long as the voltage controlled oscillator 83 is an oscillator that can adjust the frequency of the output periodic signal.

The amplifier 84 has a function of controlling the amplitude of the output periodic signal based on a received control signal. Accordingly, the amplifier 84 amplifies the received reference signal Ss, generates the drive signal Sd of the target amplitude, and outputs the drive signal Sd to the optical modulator 444.

As shown in FIG. 34, the reference signal Ss output from the voltage controlled oscillator 83 and an output signal Sm output in response to driving of the optical modulator 444 are input to the correction processing unit 85. In addition, the correction processing unit 85 outputs a frequency control signal (correction signal) to the voltage controlled oscillator 83. Further, the correction processing unit 85 outputs an amplification factor control signal Sam (correction signal) to the amplifier 84.

The correction processing unit 85 is mounted on, for example, an FPGA, and is preferably disposed in the vicinity of the optical modulator 444. Accordingly, a physical distance between the optical modulator 444 and the correction processing unit 85 can be shortened, and a decrease in an S/N ratio of the output signal Sm due to the influence of, for example, electromagnetic noise, can be prevented.

Figure 35:
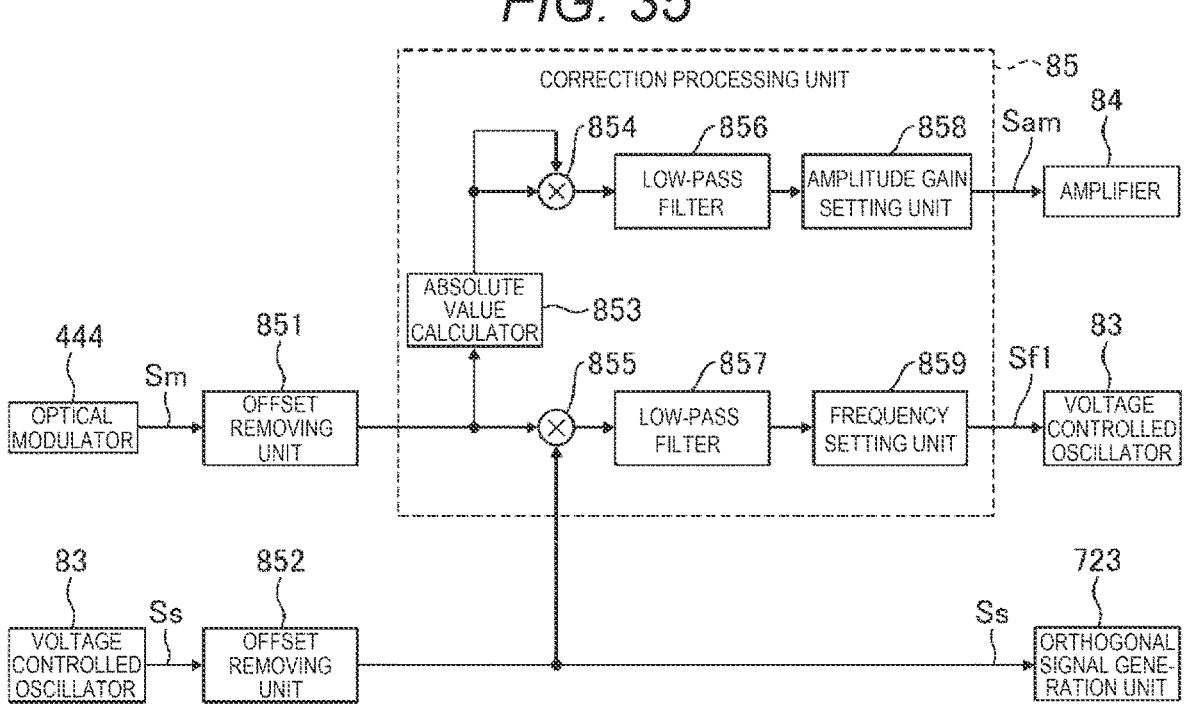
FIG. 35 is a diagram showing details of a correction processing unit in the schematic diagram shown in FIG. 34.

FIG. 35 is a diagram showing details of the correction processing unit 85 in the schematic diagram shown in FIG. 34. The output signal Sm from the optical modulator 444 is input to an offset removing unit 851 shown in FIG. 35. The offset removing unit 851 has a function of removing a direct current (DC) component and extracting an alternating current (AC) component. The output signal Sm passing through the offset removing unit 851 is input to the correction processing unit 85.

The reference signal Ss from the voltage controlled oscillator 83 is input to an offset removing unit 852 shown in FIG. 35. The offset removing unit 852 has a function of removing a direct current (DC) component and extracting an alternating current (AC) component. The reference signal Ss passing through the offset removing unit 852 is input to the correction processing unit 85 and the orthogonal signal generation unit 723.

The correction processing unit 85 shown in FIG. 35 includes an absolute value calculator 853, a multiplier 854, a multiplier 855, a low-pass filter 856, a low-pass filter 857, an amplitude gain setting unit 858, and a frequency setting unit 859.

The absolute value calculator 853 calculates an absolute value of the output signal Sm passing through the offset removing unit 851.

The multipliers 854 and 855 are circuits that output signals proportional to a product of the two input signals. Among these, in the multiplier 854, both of the two input signals are the output signal Sm. Therefore, the multiplier 854 outputs a signal proportional to the square of the output signal Sm. Meanwhile, in the multiplier 855, the two input signals are the output signal Sm and the reference signal Ss. Therefore, the multiplier 855 outputs a signal proportional to a product of the output signal Sm and the reference signal Ss.

Each of the multipliers 854 and 855 may be, for example, an element such as a Gilbert cell, or may be a circuit that performs logarithmic conversion on two input signals using an operational amplifier or the like, then performs addition and subtraction, and then performs inverse logarithmic conversion.

The low-pass filters 856 and 857 are filters that cut a signal in a high frequency band for the input signals. A transmission frequency band of the low-pass filters 856 and 857 may be a band that can remove a signal having a frequency twice or more the frequency of the drive signal Sd, and is preferably a band that can remove a signal having a frequency equal to or higher than the frequency of the drive signal Sd.

A signal output from the multiplier 854 and passing through the low-pass filter 856 is a signal having a value corresponding to the amplitude of the output signal Sm, as will be described later. The amplitude gain setting unit 858 has a function of determining, based on the signal, an amplitude (target amplitude) to be set in the drive signal Sd. Further, the amplitude gain setting unit 858 controls a gain (amplification factor) to be set in the amplifier 84 of the signal generation unit 8 such that the amplitude of the drive signal Sd is the target amplitude. Examples of a control logic include feedback control such as PI control and PID control. The amplitude gain setting unit 858 outputs, to the amplifier 84, the amplification factor control signal Sam corresponding to the gain to be set.

The amplifier 84 amplifies the amplitude of the drive signal Sd based on the amplification factor control signal Sam. Accordingly, the amplitude of the drive signal Sd is corrected.

The signal output from the multiplier 855 and input to the frequency setting unit 859 through the low-pass filter 857 is a signal having a value corresponding to a phase difference between the output signal Sm and the reference signal Ss, as will be described later. Here, a phase of the output signal Sm corresponds to a phase of the drive signal Sd. The phase of the drive signal Sd corresponds to the phase of the reference signal Ss. Therefore, the frequency setting unit 859 has a function of determining the frequency (target frequency) to be set in the reference signal Ss. Further, the frequency setting unit 859 controls a voltage to be set in the voltage controlled oscillator 83 of the signal generation unit 8 such that the frequency of the reference signal Ss is the target frequency. Examples of a control logic include feedback control such as PI control and PID control. The frequency setting unit 859 outputs, to the voltage controlled oscillator 83, the frequency control signal Sf1 corresponding to the frequency to be set.

The voltage controlled oscillator 83 generates the reference signal Ss having a frequency corresponding to the frequency control signal Sf1. Accordingly, the frequency of the reference signal Ss is corrected. Accordingly, the frequency of the drive signal Sd is also corrected.

14.1.2. Obtaining of Output Signal from Optical Modulator

Figure 36:
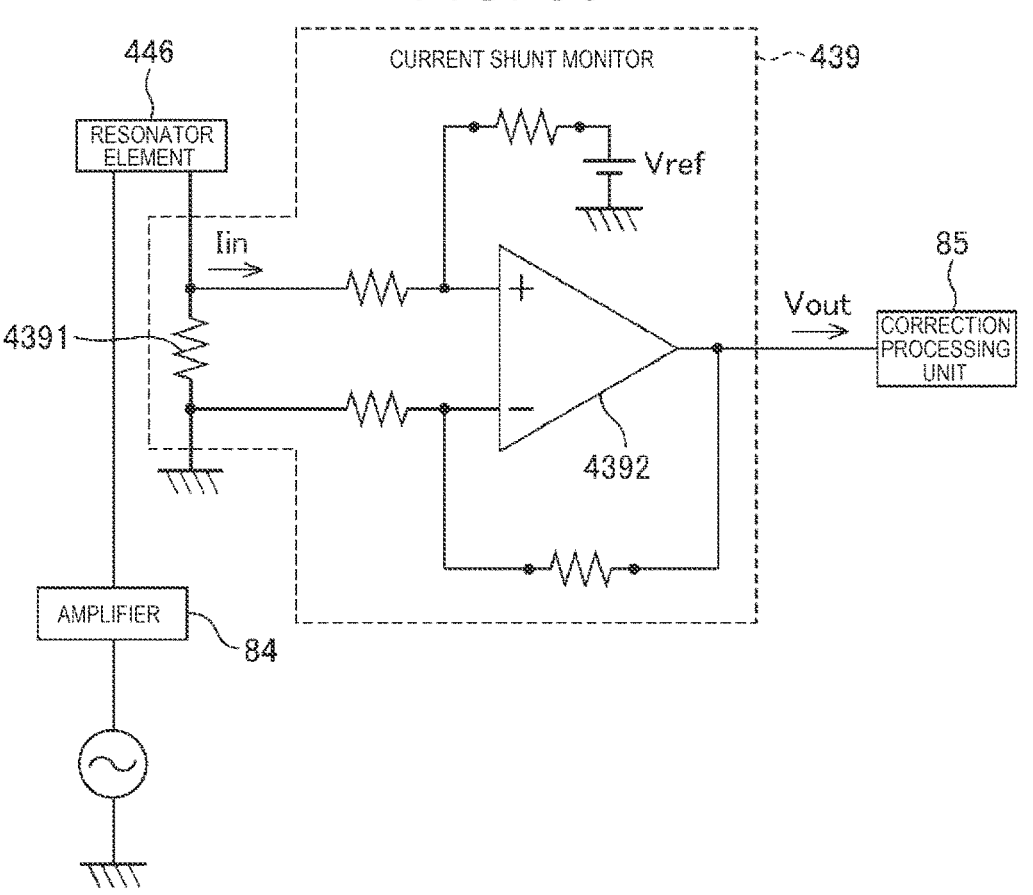
FIG. 36 is a diagram showing an example of a circuit that obtains an output signal from an optical modulator.

FIG. 36 is a diagram showing an example of a circuit that obtains the output signal Sm from the optical modulator 444.

The output signal Sm may be a signal obtained by detecting a current flowing through the resonator element 446 provided in the optical modulator 444, or may be a signal obtained by detecting a voltage applied to the resonator element 446. For example, when the signal obtained by detecting the current flowing through the resonator element 446 is the output signal Sm, as shown in FIG. 36, a value of a current flowing through the resonator element 446 is detected using a current shunt monitor 439. The current shunt monitor 439 shown in FIG. 36 includes a shunt resistor 4391 and an operational amplifier 4392, and converts the value of the current flowing through the resonator element 446 into a value of a voltage and detects the value of the voltage. Accordingly, the output signal Sm, which is a voltage signal, is obtained. The obtained output signal Sm is converted into a digital signal and output to the correction processing unit 85.

In addition to the above-described method, examples of a method of detecting the current flowing through the resonator element 446 include a method using a Hall element, and a method of winding coils around a current path and detecting an electromotive force.

14.1.3. Correction Processing

Next, correction processing performed by the correction processing unit 85 will be described. The correction processing is to correct the drive signal Sd and the reference signal Ss by changing setting values of the voltage controlled oscillator 83 and the amplifier 84 based on the correction signal output from the correction processing unit 85.

When the output signal Sm from the optical modulator 444 is, for example, a voltage signal, the output signal Sm before passing through the offset removing unit 851 is represented by the following formula (II).

$$V_{QOM} = A_m \sin(\omega_m t + \alpha_{m1}) + O_{QOM} \tag{II}$$

In the formula (II), $V_{QOM}$ is a voltage value of the output signal Sm. In addition, $A_m$ is a coefficient corresponding to the amplitude of the output signal Sm, and $\alpha_{m1}$ is a phase difference with respect to the reference signal Ss of the output signal Sm, and satisfies $-\pi/2 < \pi_{m1} < \pi/2$. Further, $O_{QOM}$ is a DC component of the output signal Sm.

The output signal Sm after passing through the offset removing unit 851 is represented by the following formula (II-1).

$$V_{QOM} = A_m \sin(\omega_m t + \alpha_{m1}) \tag{II-1}$$

Further, the reference signal Ss before passing through the offset removing unit 852 is represented by the following formula (III).

$$V_{OSC} = v_{OSC} \cos(\omega_m t) + O_{OSC} \tag{III}$$

In the above formula (III), $V_{OSC}$ is a voltage value of the reference signal Ss. In addition, $V_{OSC}$ is a coefficient corresponding to the amplitude of the reference signal Ss, and $O_{OSC}$ is a DC component of the reference signal Ss.

The reference signal Ss after passing through the offset removing unit 852 is represented by the following formula (III-1).

$$V_{OSC} = v_{OSC} \cos(\omega_m t) \tag{III-1}$$

The output signal Sm passing through the offset removing unit 851 is divided into two parts. Further, one part of the output signal Sm passes through the absolute value calculator 853, and is squared by the multiplier 854, and as a result, the result is represented by the following formula (II-2).

$$V_{QOM}^2 = \frac{A_m^2}{2}\{1 - \cos(2\omega_m t + 2\alpha_{m1})\} \tag{II-2}$$

Thereafter, by passing through the low-pass filter 856, only a first term on the right side of the above formula (II-2)

is extracted. Accordingly, the output signal Sm after passing through the low-pass filter 856 is represented by the following formula (II-3).

$$V_{QOM}^2 = \frac{A_m^2}{2} \qquad \text{(II-3)}$$

As represented by the above formula (II-3), an input signal $V_{QOM}^2$ input to the amplitude gain setting unit 858 is a signal with no time change. Therefore, the amplitude gain setting unit 858 performs feedback control on the output signal Sm represented by the above formula (II-3), using a value obtained by substituting the target coefficient $A_m$ into the above formula (II-3) as a control target value. The amplification factor control signal Sam corresponding to the control target value is output toward the amplifier 84 of the signal generation unit 8. Accordingly, by changing an amplitude gain in the amplifier 84, the amplitude of the drive signal Sd can be corrected to a target amplitude.

The other part of the output signal Sm that is divided into two parts is multiplied by the reference signal Ss by the multiplier 855. Accordingly, the signal output from the multiplier 855 is represented by the following formula (IV).

$$V_{QOM} \cdot V_{OSC} = \frac{A_m v_{OSC}}{2} \{\sin(\alpha_{m1}) + \sin(2\omega_m t + \alpha_{m1})\} \qquad \text{(IV)}$$

Thereafter, by passing through the low-pass filter 857, only a first term on the right side of the above formula (IV) is extracted. Accordingly, the output signal Sm after passing through the low-pass filter 857 is represented by the following formula (IV-2).

$$V_{QOM} \cdot V_{OSC} = \frac{A_m v_{OSC}}{2} \sin(\alpha_{m1}) \qquad \text{(IV-2)}$$

As represented by the above formula (IV-2), an input signal $V_{QOM} \cdot V_{OSC}$ input to the frequency setting unit 859 is a signal including the coefficient $A_m$, a coefficient $V_{OSC}$, and a phase difference $\alpha_{m1}$ on the right side. Among these, the coefficient $V_{OSC}$ is known. Meanwhile, the coefficient $A_m$ satisfies $0 < A_m$ and is controlled to be converged to the target coefficient $A_m$ as described above. Therefore, the input signal $V_{QOM} \cdot V_{OSC}$ is a signal with no time change. Therefore, the frequency setting unit 859 performs the feedback control using, for example, a value obtained by substituting the target phase difference $\alpha_{m1}$ into the above formula (IV-2) as the control target value. The frequency control signal Sf1 corresponding to the control target value is output toward the voltage controlled oscillator 83 of the signal generation unit 8. Accordingly, the frequency of the reference signal Ss output from the voltage controlled oscillator 83 can be changed, and the frequency of the reference signal Ss can be corrected to a target frequency. The frequency of the drive signal Sd can also be corrected to the target frequency.

The target phase difference $\alpha_{m1}$ can be determined based on, for example, a relationship of the phase difference between the drive signal Sd and the output signal Sm in the resonator element 446 that vibrates at a mechanical resonance frequency. Specifically, in such a resonator element 446, it is known that the phase of the output signal Sm is delayed by about 90 [deg] with respect to the received drive signal Sd. In addition, in a process until the output signal Sm is input to the correction processing unit 85, a phase delay δ [deg] may occur. Considering these, the target phase difference $\alpha_{m1}$ can be set to, for example, 90+δ[deg]. The phase delay δ can be determined by experiment or simulation.

When a temperature change or the like occurs, the mechanical resonance frequency changes, and efficiency of converting power, that is input to the resonator element 446, into a vibration may change. When the conversion efficiency changes, the amplitude of the vibration of the resonator element 446 changes. Therefore, in the correction processing, first, priority is given to correcting the frequency of the reference signal Ss and the frequency of the drive signal Sd. Thereafter, the amplitude of the drive signal Sd is corrected as necessary. By executing the correction processing in such an order, it is possible to efficiently control the frequency and the amplitude to target values.

In addition, based on the control by the frequency setting unit 859 described above, it is desirable that the control on the signal input to the amplitude gain setting unit 858 is converged earlier than the control on the signal input to the frequency setting unit 859. Accordingly, since a target control value in the frequency setting unit 859 is prevented from becoming unstable, it is possible to prevent the correction processing from becoming unstable.

The amplitude gain setting unit 858 and the frequency setting unit 859 are each constructed by combining operational amplifiers and the like to perform a feedback control operation such as PID control. In this case, in order to converge the control on the signal input to the amplitude gain setting unit 858 earlier than the control on the signal input to the frequency setting unit 859, a crossing frequency of an open loop transfer function of a control loop in an operation of the amplitude gain setting unit 858 may be set higher than a crossing frequency of an open loop transfer function of a control loop in an operation of the frequency setting unit 859.

By performing the above-described correction processing, the following effects can be obtained.

When the mechanical resonance frequency of the resonator element 446 changes under the influence of disturbances such as an ambient temperature change, a gravity change, a vibration, and noise, the frequency and the amplitude of the vibration of the resonator element 446 change, and the S/N ratio of the second modulation signal decreases. Accordingly, demodulation accuracy of the displacement signal of the moving mirror 33 may decrease.

In contrast, by performing the above-described correction processing, even when the disturbance such as the temperature change is applied, the frequency and the amplitude of the vibration of the resonator element 446 can be maintained constant. That is, even when the disturbance such as the temperature change is applied, the frequency and the amplitude of the vibration of the resonator element 446 can be corrected so as not to change. Accordingly, it is possible to prevent a decrease in the S/N ratio of the second modulation signal. As a result, even when the disturbance such as the temperature change is applied, it is possible to enhance accuracy of preprocessing and demodulation processing in the calculation device 7, and to prevent the measurement error Δd of the position of the moving mirror 33.

In addition, unlike the driving performed by the oscillation circuit, even when the disturbance such as the temperature change is applied to change the mechanical resonance frequency, the frequency of the drive signal Sd can be made to follow the change, and thus the resonator element 446 can be continuously driven in the vicinity of the mechanical resonance frequency of the resonator element 446. Accordingly, since driving efficiency of the resonator element 446 is enhanced, it is possible to reduce power consumption of the optical device 1.

14.2. Calculation Device

Next, the calculation device 7 shown in FIG. 34 will be described.

The calculation device 7 shown in FIG. 34 includes the moving mirror position calculation unit 72, the light intensity calculation unit 74, the Fourier transform unit 76, and the moving mirror position correction unit 78. Further, the moving mirror position calculation unit 72 includes the preprocessing unit 722, the orthogonal signal generation unit 723, the demodulation processing unit 724, and the moving mirror position signal output unit 726.

The orthogonal signal generation unit 723 has a function of generating, based on the reference signal Ss output from the signal generation unit 8 and the signal output from the preprocessing unit 722, a cosine wave signal and a sine wave signal, which are waveforms orthogonal to each other. In the following description, the cosine wave signal and the sine wave signal are also collectively referred to as orthogonal signals. In addition, the generated orthogonal signals are used for the demodulation processing in the demodulation processing unit 724. Further, the cosine wave signal is fed back to the preprocessing unit 722 to adjust a phase of the signal output from the preprocessing unit 722. Accordingly, a decrease in the accuracy of the demodulation processing caused by a phase shift is prevented, and the measurement error Δd of the position of the moving mirror 33 can be prevented.

The orthogonal signal generation unit 723 may be provided as necessary, and may be omitted. In this case, the reference signal Ss and a signal whose phase is shifted by n/2 may be used as the orthogonal signals.

15. Third Modification of Sixth Embodiment

Next, a spectroscopic device according to a third modification of the sixth embodiment will be described.

Figure 37:
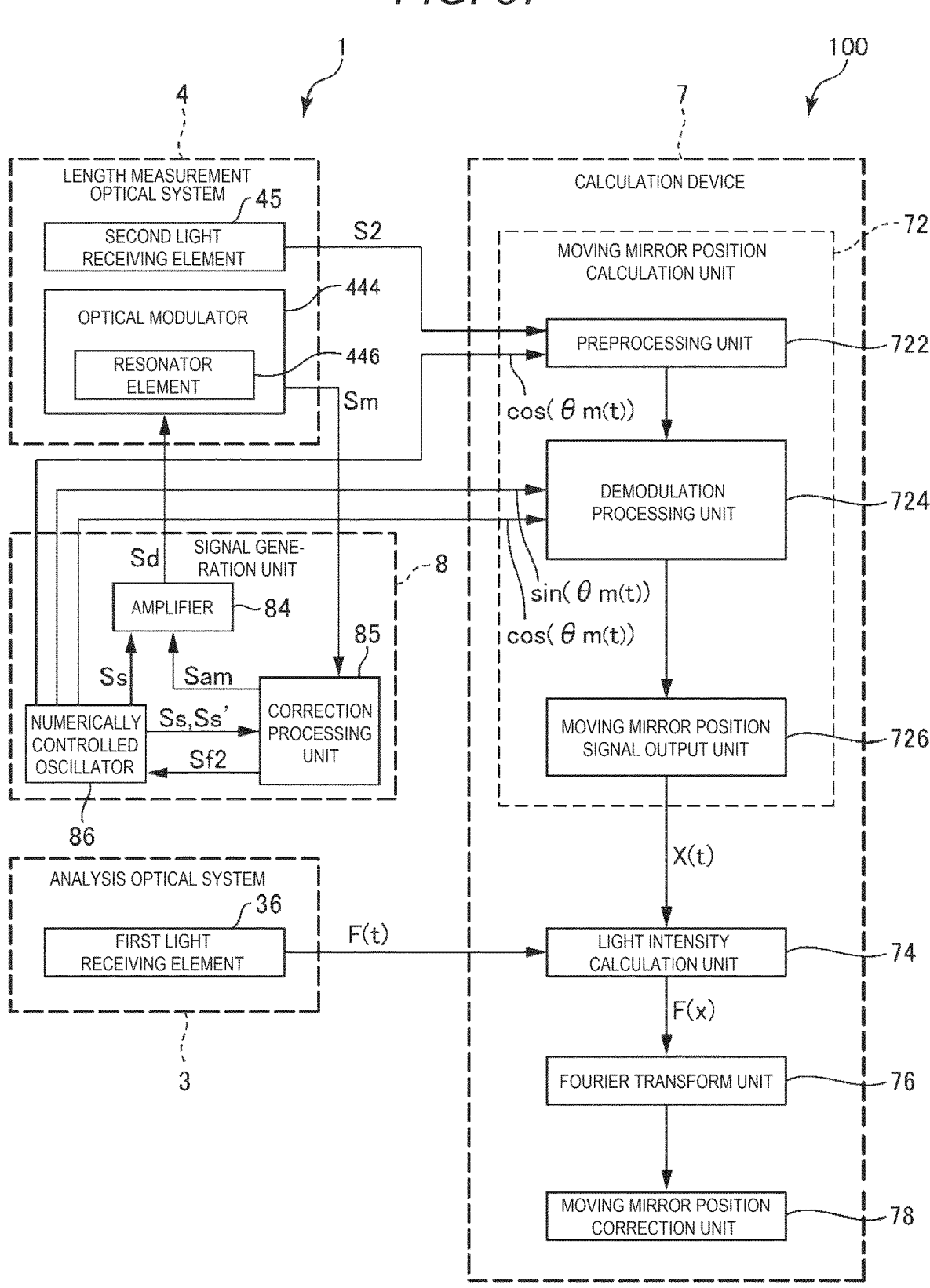
FIG. 37 is a schematic diagram showing main parts of an analysis optical system, a length measurement optical system, a signal generation unit, and a calculation device provided in a spectroscopic device according to a third modification of the sixth embodiment.
Figure 38:
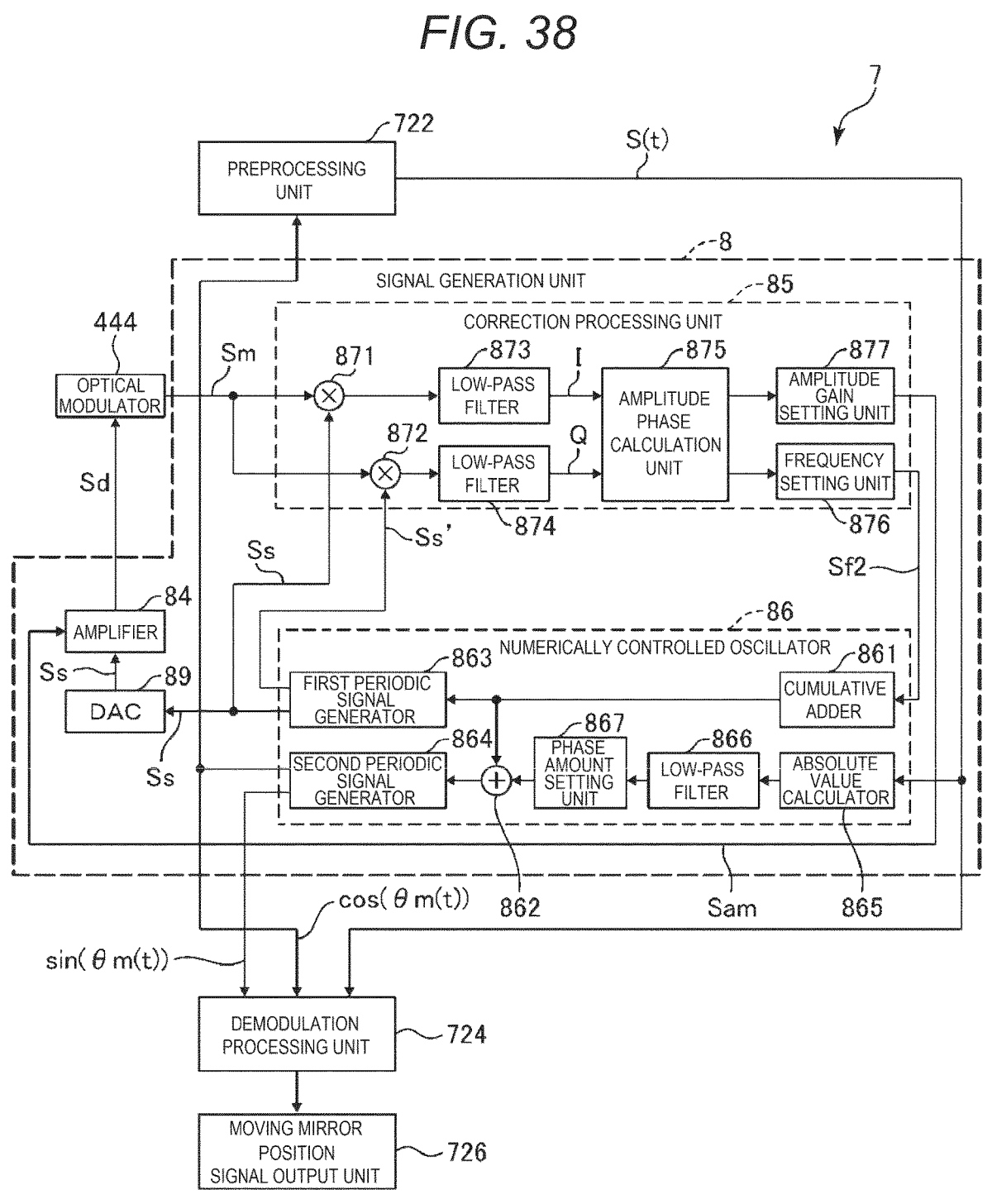

FIG. 37 is a schematic diagram showing main parts of the analysis optical system 3, the length measurement optical system 4, the signal generation unit 8, and the calculation device 7 provided in the spectroscopic device according to the third modification of the sixth embodiment. FIG. 38 is a diagram showing details of the signal generation unit 8 in the schematic diagram shown in FIG. 37.

The spectroscopic device 100 shown in FIG. 37 is the same as the spectroscopic device 100 shown in FIG. 30 except that a configuration of the signal generation unit 8 is different.

The signal generation unit 8 shown in FIG. 37 includes a numerically controlled oscillator 86, the amplifier 84, and the correction processing unit 85. Among these, as shown in FIG. 38, the correction processing unit 85 includes multipliers 871 and 872, a low-pass filter 873, a low-pass filter 874, an amplitude phase calculation unit 875, a frequency setting unit 876, and an amplitude gain setting unit 877.

15.1. Signal Generation Unit

The signal generation unit 8 shown in FIG. 38 will be described.

The numerically controlled oscillator 86 generates a periodic signal such as a sine wave or a cosine wave by reading data of an address, to be added at regular clock intervals, from a ROM table containing numerical values for one cycle of a sine wave and a cosine wave. Accordingly, the numerically controlled oscillator 86 generates the reference signal Ss of a target frequency with high accuracy and outputs the reference signal Ss to a DAC 89. The DAC 89 is a digital-analog converter, and generates the analog reference signal Ss based on the received digital reference signal Ss.

The numerically controlled oscillator 86 shown in FIG. 38 includes a cumulative adder 861, an absolute value calculator 865, a low-pass filter 866, a phase amount setting unit 867, an adder 862, a first periodic signal generator 863, and a second periodic signal generator 864.

The cumulative adder 861 cumulatively adds a frequency control signal Sf2 output from the frequency setting unit 876 of the correction processing unit 85. The frequency control signal Sf2 is a phase advance amount per unit time step corresponding to a frequency to be set to the reference signal Ss, which will be described later. The cumulative adder 861 cumulatively adds the phase advance amount to calculate a cumulative addition value. The obtained cumulative addition value is output to the first periodic signal generator 863.

The first periodic signal generator 863 includes a read only memory (ROM) containing numerical values for one cycle of a sine wave and a cosine wave. In the first periodic signal generator 863, a numerical value of an address corresponding to the cumulative addition value is read. Accordingly, a sine wave signal and a cosine wave signal having a frequency corresponding to the frequency control signal Sf2 can be generated. The cosine wave signal is output as the reference signal Ss to the DAC 89 and the multiplier 871 of the correction processing unit 85. The sine wave signal is output as a reference signal Ss' to the multiplier 872 of the correction processing unit 85.

The absolute value calculator 865 calculates an absolute value of a preprocessed signal S(t) output from the preprocessing unit 722. A calculation result is input to the phase amount setting unit 867 via the low-pass filter 866.

As described above, the phase amount setting unit 867 sets a phase amount a to be added to the cumulative addition value by the adder 862. The adder 862 calculates a sum of the cumulative addition value and the phase amount a. The obtained sum of the cumulative addition value and the phase amount a is output toward the second periodic signal generator 864.

The second periodic signal generator 864 reads a numerical value of an address corresponding to the sum of the cumulative addition value and the phase amount a from a read only memory (ROM) containing numerical values for one cycle of a sine wave and a cosine wave. Accordingly, a sine wave signal $\sin(\theta_m(t))$ and a cosine wave signal $\cos(\theta_m(t))$ to which a phase offset of the phase amount a is added can be generated at a frequency corresponding to the frequency control signal Sf2. The cosine wave signal $\cos(\theta_m(t))$ is output to the preprocessing unit 722 and the demodulation processing unit 724 to be described later, and the sine wave signal $\sin(\theta_m(t))$ is output to the demodulation processing unit 724.

Although a configuration example of the numerically controlled oscillator 86 is described above, the configuration of the numerically controlled oscillator 86 is not limited to the above.

15.2. Correction Processing Unit

As shown in FIG. 37, the output signal Sm that is output in response to driving of the optical modulator 444 is input to the correction processing unit 85. The correction processing unit 85 obtains, by quadrature detection, a phase difference between the output signal Sm and the reference signal Ss and an amplitude of the output signal Sm.

The correction processing unit 85 has a function of outputting the frequency control signal Sf2 (correction signal) to the numerically controlled oscillator 86 and a function of outputting the amplification factor control signal Sam (correction signal) to the amplifier 84.

The output signal Sm from the optical modulator 444 is converted into a digital signal and then divided into two parts, as shown in FIG. 38. Then, one part of the output signal Sm is multiplied by the reference signal Ss in the multiplier 871. The signal output from the multiplier 871 passes through the low-pass filter 873 and is input as a signal I to the amplitude phase calculation unit 875. The other output signal Sm is multiplied by the reference signal Ss' by the multiplier 872. The signal output from the multiplier 872 passes through the low-pass filter 874 and is input as a signal Q to the amplitude phase calculation unit 875.

A transmission frequency band of the low-pass filter 873 and the low-pass filter 874 is preferably a band that can remove a signal having a frequency equal to or higher than the frequency of the drive signal Sd.

The amplitude phase calculation unit 875 performs calculation of a tan (Q/I) to calculate the phase of the output signal Sm. The amplitude phase calculation unit 875 outputs the phase difference between the output signal Sm and the reference signal Ss to the frequency setting unit 876. The amplitude phase calculation unit 875 performs calculation of $(I^2+Q^2)^{1/2}$ to calculate the amplitude of the output signal Sm. The amplitude phase calculation unit 875 outputs the calculated amplitude to the amplitude gain setting unit 877. For example, a coordinate rotation digital computer (CORDIC) which is a demodulation circuit is used for the amplitude phase calculation unit 875, but the present disclosure is not limited thereto.

The frequency setting unit 876 has a function of determining the target frequency of the reference signal Ss. Further, the frequency setting unit 876 controls the frequency control signal Sf2 such that the frequency of the reference signal Ss is the target frequency, and outputs the frequency control signal Sf2 to the numerically controlled oscillator 86.

The numerically controlled oscillator 86 generates the reference signal Ss based on the frequency control signal Sf2. Accordingly, the frequency of the reference signal Ss is corrected.

The amplitude gain setting unit 877 has a function of determining the target amplitude of the drive signal Sd. Further, the amplitude gain setting unit 877 controls the amplification factor control signal Sam such that the amplitude of the drive signal Sd is the target amplitude, and outputs the amplification factor control signal Sam to the amplifier 84.

The amplifier 84 amplifies the amplitude of the drive signal Sd based on the amplification factor control signal Sam. Accordingly, the amplitude of the drive signal Sd is corrected.

By performing the above-described correction processing, the following effects can be obtained.

Even when the disturbance such as the temperature change is applied, the frequency and the amplitude of the drive signal Sd can follow changes in the mechanical resonance frequency and a vibration amplitude of the resonator element 446. Accordingly, the frequency and the amplitude of the vibration of the resonator element 446 can be maintained constant. As a result, it is possible to prevent a decrease in the S/N ratio of the second modulation signal. As a result, even when the disturbance is applied, the measurement error Δd of the position of the moving mirror 33 can be prevented.

In addition, unlike the driving performed by the oscillation circuit, the resonator element 446 can be driven in the vicinity of the mechanical resonance frequency of the resonator element 446, and thus the power consumption of the optical device 1 can be reduced.

In addition, the correction processing unit 85 obtains, by the quadrature detection, the phase difference between the output signal Sm and the reference signal Ss and the amplitude of the output signal Sm. According to the quadrature detection, the phase difference and the amplitude can be instantaneously obtained. Therefore, the correction processing can be performed in real time.

The numerically controlled oscillator 86 can generate a periodic signal based on the numerical value read from the ROM table. Therefore, the numerically controlled oscillator 86 can output highly accurate reference signals Ss and Ss' and a highly accurate cosine wave signal $\cos(\theta_m(t))$ and sine wave signal $\sin(\theta_m(t))$ without being affected by noise or the like. Accordingly, it is possible to particularly enhance accuracy of the preprocessing and the demodulation processing in the calculation device 7.

16. Effects of Embodiments

The optical device according to the embodiments includes the analysis optical system 3 and the length measurement optical system 4.

The analysis optical system 3 includes the moving mirror 33, the gas cell 6, and the first light receiving element 36. The moving mirror 33 reflects the analysis light L1 emitted from the first light source 51 to add a first modulation signal to the analysis light L1. In the gas cell 6, a gas that absorbs light of a predetermined wavelength is sealed, and a light absorption signal is added to the analysis light L1 when the analysis light L1 is incident on the gas cell 6. The first light receiving element 36 receives the analysis light L1 including the sample-derived signal generated by an action between the analysis light L1 and the sample 9, the first modulation signal, and the light absorption signal, and outputs the first light receiving signal F(t).

The length measurement optical system 4 includes the second light source 41 and the length measurement unit 40. The second light source 41 emits the length measurement light L2 which is laser light. The length measurement unit 40 obtains a displacement signal corresponding to the position of the moving mirror 33 using the length measurement light L2.

According to such a configuration, when the position of the moving mirror 33 is measured using the displacement signal, it is possible to calculate a correction value for correcting the measurement value based on the light absorption signal derived from the gas cell 6 by using the fact that accuracy and stability of energy between levels of atoms and molecules sealed in the gas cell 6 are extremely high. That is, the correction value for accurately measuring the position of the moving mirror 33 can be calculated. Therefore, even when wavelength stability of the length measurement light L2 emitted from the second light source 41 is low, accuracy on the wavenumber axis (wavelength axis) of the spectral pattern can be finally enhanced, and the optical device 1 capable of implementing the spectroscopic device 100 capable of performing particularly highly accurate spectroscopy on the sample 9 can be obtained.

In addition, in order to obtain the above-described effects, even when a small and inexpensive element such as a semiconductor laser element is adopted as the second light source 41, it is not necessary to provide additional equipment such as a light source thermostatic system. Accordingly, it is possible to reduce a size, a weight, power consumption, and cost of the optical device 1.

The analysis optical system 3 may include the first light source 51.

According to such a configuration, alignment accuracy of the first light source 51 can be particularly enhanced, and loss of the analysis light L1 caused by alignment failure can be reduced to the minimum.

The analysis optical system 3 may include the incidence switching unit 61 that switches between a state in which the analysis light L1 is incident on the gas cell 6 and is not incident on the sample 9 and a state in which the analysis light L1 is incident on the sample 9 and is not incident on the gas cell 6.

According to such a configuration, it is possible to correct the wavenumber axis (wavelength axis) using the gas cell 6 at a necessary timing. Meanwhile, when performing the spectroscopy on the sample 9, it is possible to avoid slight loss caused by irradiating the gas cell 6 with the analysis light L1.

The incidence switching unit 61 may include the insertion and removal mechanism 63 that switches between a state in which the gas cell 6 is inserted into the optical path of the analysis light L1 and a state in which the sample 9 is inserted into the optical path of the analysis light L1.

According to such a configuration, it is possible to correct the wavenumber axis (wavelength axis) using the gas cell 6 at a necessary timing. Meanwhile, when performing the spectroscopy on the sample 9, it is possible to avoid slight loss caused by irradiating the gas cell 6 with the analysis light L1.

The incidence switching unit 61 may include the light shielding unit 64 that switches between a state in which the analysis light L1 incident on the gas cell 6 is shielded and a state in which the analysis light L1 is not shielded.

According to such a configuration, it is possible to correct the wavenumber axis (wavelength axis) using the gas cell 6 at a necessary timing.

The analysis optical system 3 may include the wavelength conversion element 575. The wavelength conversion element 575 converts the wavelength of the analysis light L1 emitted therefrom with respect to the analysis light L1 incident thereon. Further, in this case, the analysis optical system 3 is configured to cause the analysis light L1 emitted from the wavelength conversion element 575 to be incident on the gas cell 6.

According to such a configuration, even when narrow band light such as laser light is incident on the wavelength conversion element 575, wide band light, that is, white light can be emitted. Therefore, even when a laser light source is used as the first light source 51, it is possible to obtain a spectral pattern including an absorption peak that is based on the gas cell 6.

The length measurement unit 40 may include the optical modulator 444. The optical modulator 444 adds a second modulation signal to the length measurement light L2 which is laser light.

According to such a configuration, phase information corresponding to the position of the moving mirror 33 can be obtained with higher accuracy by optical heterodyne interferometry. The position of the moving mirror 33 is determined with high accuracy based on the phase information. As a result, the interferogram F(x) can be generated at shorter intervals, and the spectroscopic device 100 capable of obtaining a spectral pattern with a high resolution can be finally implemented.

The second light source 41 may be a semiconductor laser element.

According to such a configuration, it is possible to reduce a size and a weight of the optical device 1 and the spectroscopic device 100.

The spectroscopic device 100 according to the embodiments includes the optical device 1 according to the embodiments, the moving mirror position calculation unit 72, the light intensity calculation unit 74, the Fourier transform unit 76, and the moving mirror position correction unit 78. The moving mirror position calculation unit 72 generates the moving mirror position signal X(t) based on the displacement signal obtained by the optical device 1. The light intensity calculation unit 74 generates, based on the first light receiving signal F(t) and the moving mirror position signal X(t), the interferogram F(x) (a waveform representing the intensity of the first light receiving signal F(t) at each position of the moving mirror 33). The Fourier transform unit 76 performs Fourier transform on the interferogram F(x) to generate a spectral pattern including a peak that is based on the light absorption signal. The moving mirror position correction unit 78 calculates a correction value for correcting the moving mirror position signal X(t) based on the position of the peak that is based on the light absorption signal.

According to such a configuration, even when wavelength stability of the length measurement light L2 emitted from the second light source 41 is low, it is possible to generate a spectral pattern with high accuracy on the wavenumber axis (wavelength axis). Accordingly, the spectroscopic device 100 capable of performing highly accurate spectroscopy on the sample 9 is obtained.

In addition, even when a small and inexpensive element such as a semiconductor laser element is adopted as the second light source 41, it is not necessary to provide additional equipment such as a light source thermostatic system. Therefore, it is possible to reduce the size, the weight, and the power consumption of the spectroscopic device 100.

The spectroscopic method according to the embodiments is a method of performing spectroscopy on the sample 9, and includes the mirror position measurement step S102, the analysis light irradiation step S104, the waveform generation step S106, the Fourier transform step S108, the correction value calculation step S110, and the spectrum information correction step S112.

In the mirror position measurement step S102, the position of the moving mirror 33 is measured based on the displacement signal obtained by the optical device 1. In the analysis light irradiation step S104, the gas cell 6 and the sample 9 are disposed on the optical path of the analysis light L1, the analysis light L1 is incident on the gas cell 6 and the sample 9 while changing the position of the moving mirror 33, the analysis light L1 emitted from the gas cell 6 and the sample 9 is received by the first light receiving element 36, and the first light receiving signal F(t) is output. In the waveform generation step S106, the interferogram F(x) (a waveform indicating the intensity of the first light receiving signal F(t) at each position of the moving mirror 33) is generated based on the first light receiving signal F(t) and a measurement value of the position of the moving mirror 33. In the Fourier transform step S108, Fourier transform is performed on the interferogram F(x) to generate a spectral pattern including information derived from the sample 9 and a peak that is based on the light absorption signal. In the correction value calculation step S110, a correction value for correcting the measurement value of the position of the moving mirror 33 is calculated based on the difference between a wavelength of the peak that is based on the light absorption signal and a fundamental wavelength of the gas cell 6. In the spectrum information correction step S112, the spectral pattern is corrected based on the correction value.

According to such a configuration, when the position of the moving mirror 33 is measured using the length measurement unit 40, it is possible to calculate a correction value for correcting the measurement value based on the light absorption signal derived from the gas cell 6 by using the fact that accuracy and stability of energy between levels of atoms and molecules sealed in the gas cell 6 are extremely high. That is, the correction value for accurately measuring the position of the moving mirror 33 can be calculated. By using the correction value, even when wavelength stability of the length measurement light L2 emitted from the second light source 41 is low, accuracy on the wavenumber axis (wavelength axis) of the spectral pattern can be enhanced, and particularly highly accurate spectroscopy can be performed on the sample 9.

In addition, in order to obtain the above-described effects, even when a small and inexpensive element such as a semiconductor laser element is adopted as the second light source 41, it is not necessary to provide additional equipment such as a light source thermostatic system. Accordingly, it is possible to reduce a size, a weight, power consumption, and cost of the optical device 1.

Further, by generating the spectral pattern including the peak that is based on the light absorption signal and the information derived from the sample 9, it is possible to perform the correction simultaneously with the spectroscopy, thereby enabling particularly highly accurate spectroscopy.

The spectroscopic method according to the embodiments is a method of performing spectroscopy on the sample 9, and includes the gas cell arrangement step S101, the mirror position measurement step S102, the analysis light irradiation step S104, the waveform generation step S106, the Fourier transform step S108, the correction value calculation step S110, the sample arrangement step S114, the mirror position measurement step S116, the analysis light irradiation step S118, the waveform generation step S120, and the Fourier transform step S122.

In the gas cell arrangement step S101, the gas cell 6 in the optical device 1 according to the embodiment is disposed on the optical path of the analysis light L1.

In the mirror position measurement step S102, the position of the moving mirror 33 is measured based on the displacement signal obtained by the optical device 1.

In the analysis light irradiation step S104, the analysis light L1 is incident on the gas cell 6 while changing the position of the moving mirror 33, the analysis light L1 emitted from the gas cell 6 is received by the first light receiving element 36, and the first light receiving signal F(t) derived from the gas cell 6 is output.

In the waveform generation step S106, the interferogram F(x) derived from the gas cell 6 (a waveform indicating the intensity of the first light receiving signal F(t) derived from the gas cell 6 at each position of the moving mirror 33) is generated based on the first light receiving signal F(t) derived from the gas cell 6 and the measurement value of the position of the moving mirror 33.

In the Fourier transform step S108, Fourier transform is performed on the interferogram F(x) derived from the gas cell 6 to generate a spectral pattern including a peak that is based on the light absorption signal.

In the correction value calculation step S110, a correction value for correcting the measurement value of the position of the moving mirror 33 is calculated based on the difference between a wavelength of the peak that is based on the light absorption signal and a fundamental wavelength of the gas cell 6.

In the sample arrangement step S114, the sample 9 is disposed on the optical path of the analysis light L1.

In the mirror position measurement step S116, the position of the moving mirror 33 is measured based on the displacement signal obtained by the optical device 1.

In the analysis light irradiation step S118, the analysis light L1 is incident on the sample 9 while changing the position of the moving mirror 33, the analysis light L1 emitted from the sample 9 is received by the first light receiving element 36, and the first light receiving signal F(t) derived from the sample 9 is output.

In the waveform generation step S120, the interferogram F(x) derived from the sample 9 (a waveform indicating the intensity of the first light receiving signal F(t) derived from the sample 9 at each position of the moving mirror 33) is generated based on the first light receiving signal F(t) derived from the sample 9, the measurement value of the position of the moving mirror 33, and the correction value.

In the Fourier transform step S122, the Fourier transform is performed on the interferogram F(x) derived from the sample 9 to obtain a spectral pattern including information derived from the sample 9.

According to such a configuration, when the position of the moving mirror 33 is measured using the length measurement unit 40, it is possible to calculate a correction value for correcting the measurement value based on the light absorption signal derived from the gas cell 6 by using the fact that accuracy and stability of energy between levels of atoms and molecules sealed in the gas cell 6 are extremely high. That is, the correction value for accurately measuring the position of the moving mirror 33 can be calculated. By using the correction value, even when wavelength stability of the length measurement light L2 emitted from the second light source 41 is low, accuracy on the wavenumber axis (wavelength axis) of the spectral pattern can be enhanced, and particularly highly accurate spectroscopy can be performed on the sample 9.

In addition, in order to obtain the above-described effects, even when a small and inexpensive element such as a semiconductor laser element is adopted as the second light source 41, it is not necessary to provide additional equipment such as a light source thermostatic system. Accordingly, it is possible to reduce a size, a weight, power consumption, and cost of the optical device 1.

As described above, the optical device, the spectroscopic device, and the spectroscopic method according to the present disclosure are described based on the illustrated embodiments, the optical device and spectroscopic device according to the present disclosure are not limited to the embodiments. The configuration of each unit may be replaced with any configuration having similar functions, or any other configuration may be added. The "embodiments" in the present specification also include modifications thereof.

The optical device and spectroscopic device according to the present disclosure may be a combination of two or more of the embodiments. Further, each functional unit provided in the spectroscopic device according to the present disclosure may be divided into a plurality of elements, or a plurality of functional units may be integrated into one.

The spectroscopic method according to the present disclosure may include any desired step added to the above embodiments.

Although a Michelson interference optical system is used in the above embodiments, other types of interference optical systems may be used.

Further, the arrangement of the sample is not limited to the shown arrangement. Since the sample-derived signal is generated by applying analysis light to the sample, the sample may be disposed at any position as long as the analysis light emitted from the sample is incident on the first light receiving element.

What is claimed is:

1. An optical device comprising:
an analysis optical system; and
a length measurement optical system, wherein
the analysis optical system includes
    a moving mirror configured to reflect analysis light emitted from a first light source to add a first modulation signal to the analysis light,
    a gas cell with a gas that absorbs light of a predetermined wavelength sealed therein and configured to add a light absorption signal to the analysis light, and
    a first light receiving element configured to receive the analysis light including a sample-derived signal generated by a sample, the first modulation signal, and the light absorption signal, and output a first light receiving signal, and
the length measurement optical system includes a second light source configured to emit laser light and obtains a displacement signal corresponding to a position of the moving mirror using the laser light.

2. The optical device according to claim 1, wherein the analysis optical system includes the first light source.

3. The optical device according to claim 1, wherein the analysis optical system includes an incidence switching unit configured to switch between a first state in which the analysis light is incident on the gas cell and is not incident on the sample and a second state in which the analysis light is incident on the sample and is not incident on the gas cell.

4. The optical device according to claim 3, wherein the incidence switching unit is configured to switch between the first state and the second state by inserting and removing the gas cell.

5. The optical device according to claim 3, wherein the incidence switching unit includes a light shield configured to switch between the first state and the second state by shielding the analysis light.

6. The optical device according to claim 1, wherein the analysis optical system includes a wavelength conversion element configured to convert a wavelength of the analysis light emitted therefrom with respect to the analysis light incident thereon.

7. The optical device according to claim 1, wherein the length measurement unit includes an optical modulator configured to add a second modulation signal to the laser light.

8. The optical device according to claim 1, wherein the second light source is a semiconductor laser element.

9. A spectroscopic device comprising:
the optical device according to claim 1;
a moving mirror position calculation unit configured to generate a moving mirror position signal based on the displacement signal;
a light intensity calculation unit configured to generate, based on the first light receiving signal and the moving mirror position signal, a waveform representing an intensity of the first light receiving signal at the position of the moving mirror;
a Fourier transform unit configured to perform Fourier transform on the waveform to generate a spectral pattern including a peak that is based on the light absorption signal; and
a moving mirror position correction unit configured to calculate, based on a position of the peak, a correction value for correcting the moving mirror position signal.

10. A spectroscopic method of performing spectroscopy on a sample comprising:
measuring a position of the moving mirror based on the displacement signal obtained by the optical device according to claim 1;
disposing the gas cell and the sample on an optical path of the analysis light, causing the analysis light to be incident on the gas cell and the sample while changing the position of the moving mirror, causing the first light receiver to receive the analysis light emitted from the gas cell and the sample, and outputting the first light receiving signal;
generating, based on the first light receiving signal and a measurement value of the position of the moving mirror, a waveform indicating an intensity of the first light receiving signal at the position of the moving mirror;
performing Fourier transform on the waveform to generate a spectral pattern including a peak, that is based on the light absorption signal, and information derived from the sample;
calculating, based on a difference between a wavelength of the peak and a fundamental wavelength of the gas cell, a correction value for correcting the measurement value of the position of the moving mirror; and
correcting the spectral pattern based on the correction value.

11. A spectroscopic method of performing spectroscopy on a sample comprising:
disposing the gas cell in the optical device according to claim 1 on an optical path of the analysis light;
measuring a position of the moving mirror based on the displacement signal obtained by the optical device;
causing the analysis light to be incident on the gas cell while changing the position of the moving mirror, causing the first light receiving element to receive the analysis light emitted from the gas cell, and outputting the first light receiving signal derived from the gas cell;
generating, based on the first light receiving signal derived from the gas cell and a measurement value of the position of the moving mirror, a waveform indicating an intensity of the first light receiving signal derived from the gas cell at the position of the moving mirror;
performing Fourier transform on the waveform derived from the gas cell to generate a spectral pattern including a peak that is based on the light absorption signal;
calculating, based on a difference between a wavelength of the peak and a fundamental wavelength of the gas cell, a correction value for correcting the measurement value of the position of the moving mirror;
disposing the sample on the optical path of the analysis light;
measuring the position of the moving mirror using the displacement signal obtained by the optical device;
causing the analysis light to be incident on the sample while changing the position of the moving mirror, causing the first light receiving element to receive the analysis light emitted from the sample, and outputting the first light receiving signal derived from the sample;

generating, based on the first light receiving signal derived from the sample, the measurement value of the position of the moving mirror, and the correction value, a waveform indicating an intensity of the first light receiving signal derived from the sample at the position of the moving mirror; and performing Fourier transform on the waveform derived from the sample to generate a spectral pattern including information derived from the sample.

* * * * *